(12) United States Patent
Prasanna

(10) Patent No.: US 7,733,050 B2
(45) Date of Patent: Jun. 8, 2010

(54) MOTION CONTROL USING ELECTROMAGNETIC FORCES

(75) Inventor: Gorur Narayana Srinivasa Prasanna, No. 7, Sri Rama Krupa, $2^{nd}$ Main, Srikantan Layout, High Grounds, Bangalore, 560 001 Karnataka State (IN)

(73) Assignee: Gorur Narayana Srinivasa Prasanna (IN)

( * ) Notice: Subject to any disclaimer, the term of this patent is extended or adjusted under 35 U.S.C. 154(b) by 22 days.

(21) Appl. No.: 11/960,172

(22) Filed: Dec. 19, 2007

(65) Prior Publication Data

US 2008/0211447 A1   Sep. 4, 2008

Related U.S. Application Data

(62) Division of application No. 10/552,379, filed as application No. PCT/US2004/010236 on Apr. 2, 2004, now Pat. No. 7,348,754.

(60) Provisional application No. 60/461,883, filed on Apr. 10, 2003.

(51) Int. Cl.
*H02P 25/08* (2006.01)
(52) U.S. Cl. .................. 318/539; 318/164; 318/558
(58) Field of Classification Search ......... 318/244–252, 318/538, 539, 558, 162–164, 135, 701; 310/156.01, 310/156.02, 156.03
See application file for complete search history.

(56) References Cited

U.S. PATENT DOCUMENTS

| | | | |
|---|---|---|---|
| 727,276 A * | 5/1903 | Boyle | .................. 318/246 |
| 2,642,274 A | 6/1953 | Andresen | |
| 3,493,905 A | 2/1970 | Foulke et al. | |
| 3,510,705 A | 5/1970 | O'neill et al. | |
| 3,675,506 A | 7/1972 | Leone | |
| 4,168,048 A | 9/1979 | Renner et al. | |
| 4,706,055 A | 11/1987 | Uetsuhara et al. | |
| 5,349,276 A | 9/1994 | Mezzatesta, Jr. et al. | |
| 5,586,636 A | 12/1996 | Linnig et al. | |
| 6,062,350 A | 5/2000 | Spieldiener et al. | |
| 6,157,147 A | 12/2000 | Lin et al. | |
| 6,185,373 B1 | 2/2001 | Morishita et al. | |
| 6,340,873 B2 | 1/2002 | Seki et al. | |
| 6,344,721 B2 | 2/2002 | Seki et al. | |
| 6,346,784 B1 | 2/2002 | Lin et al. | |
| 6,359,410 B1 | 3/2002 | Randolph | |
| 6,380,709 B2 | 4/2002 | Nishimura et al. | |
| 6,460,828 B1 | 10/2002 | Gersemsky et al. | |
| 6,532,136 B2 | 3/2003 | Bae et al. | |
| 6,538,541 B1 | 3/2003 | Kralik et al. | |

FOREIGN PATENT DOCUMENTS

DE    4236428    5/1993

OTHER PUBLICATIONS

International Search Report, PCT/US2004/010236, mailed on Feb. 28, 2005.

* cited by examiner

*Primary Examiner*—Bentsu Ro
(74) *Attorney, Agent, or Firm*—Choate Hall & Stewart LLP; Andrea L.C. Robidoux

(57) ABSTRACT

Motion control using electromagnetic forces. The control of motion in unpowered apparatus and an apparatus driven by electric motors and/or other prime movers utilizes electromagnetic force/torque for control of motion. One objective is to extend the domain of electric motor speed control, traditionally characterized by electronic techniques, to small apparatus such as bubble vibration toys, paper dispensers, toothbrushes and other appliances.

1 Claim, 47 Drawing Sheets

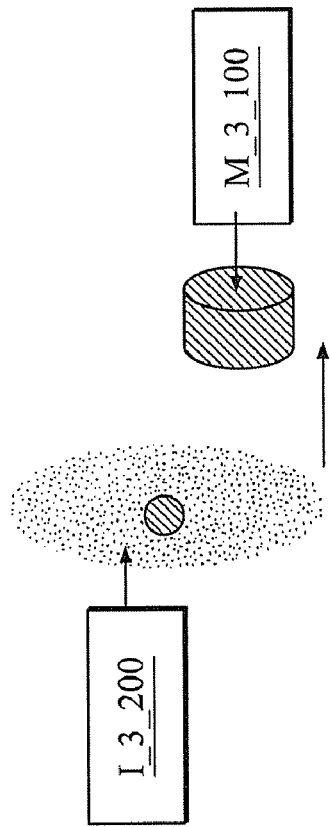
FIG. 3b
FIG. 3a
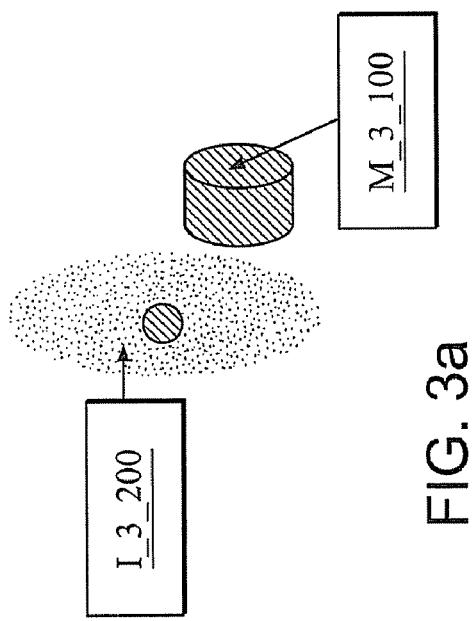
FIG. 4b
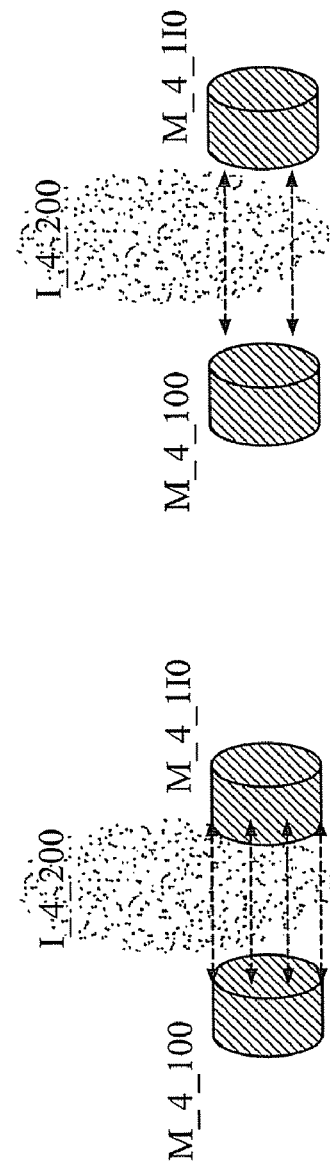
FIG. 4a

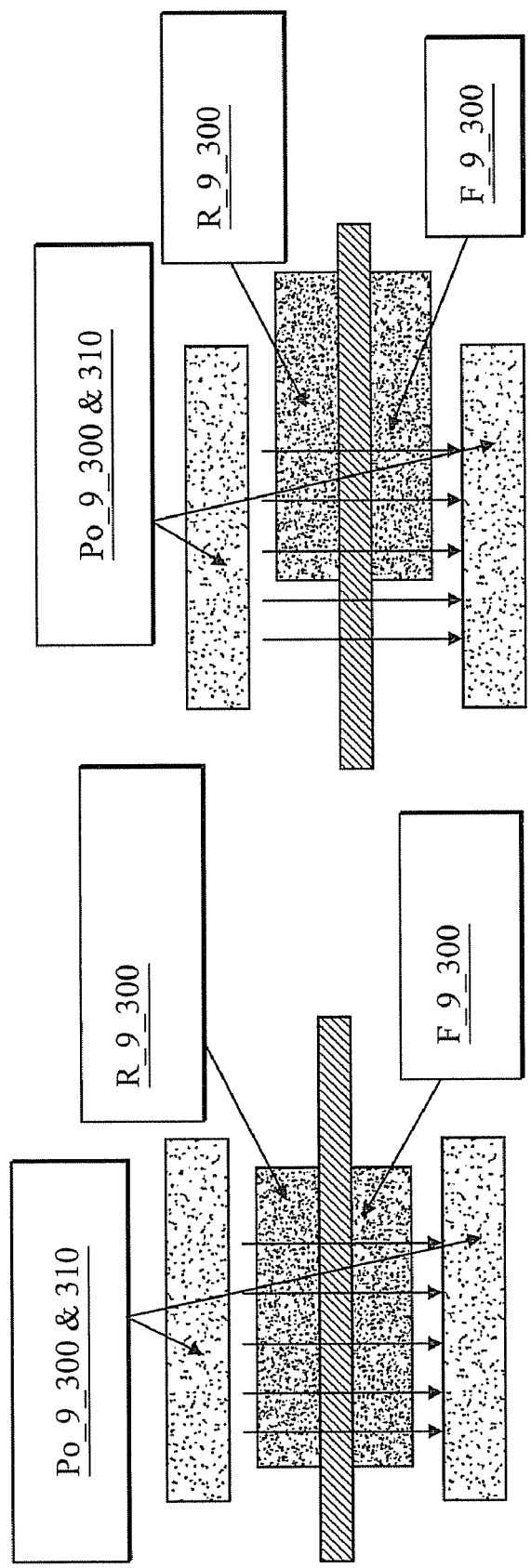

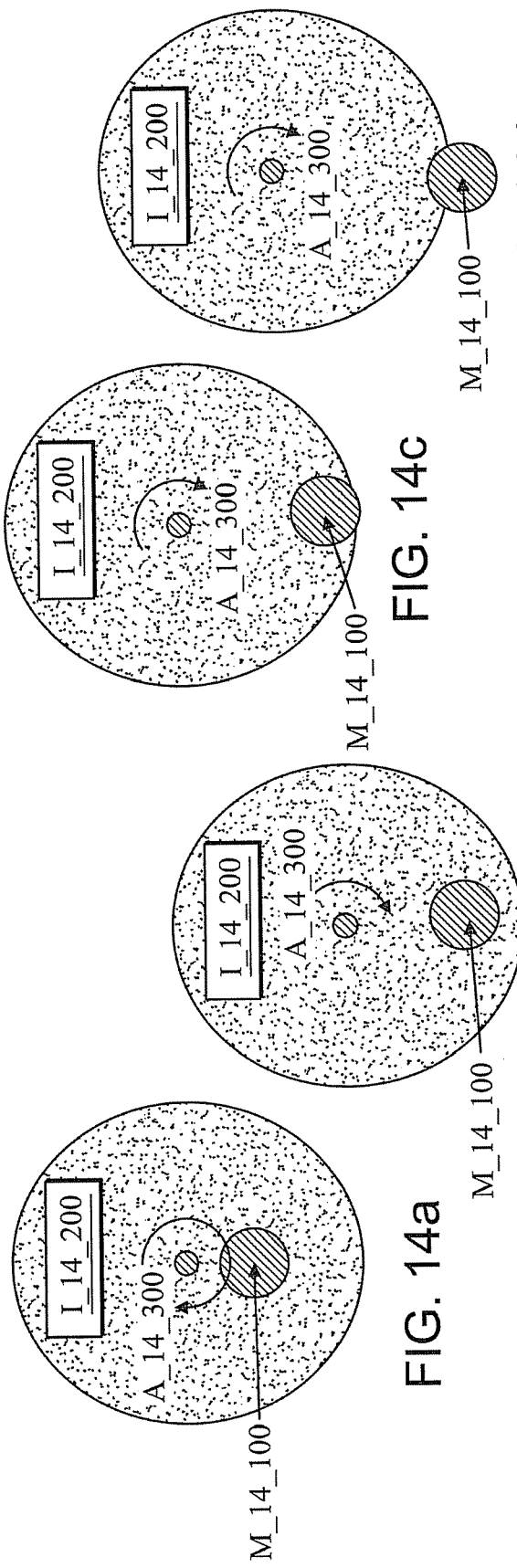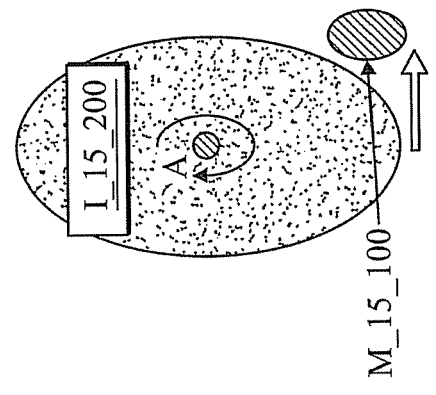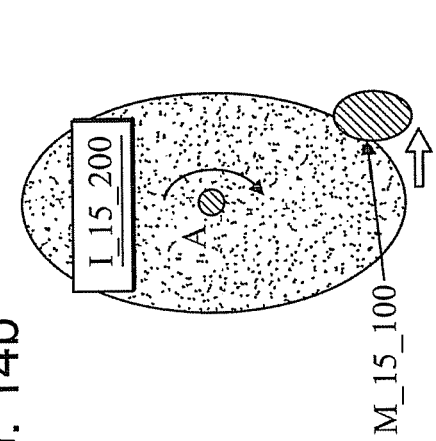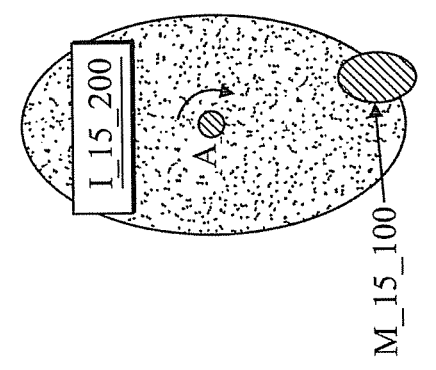

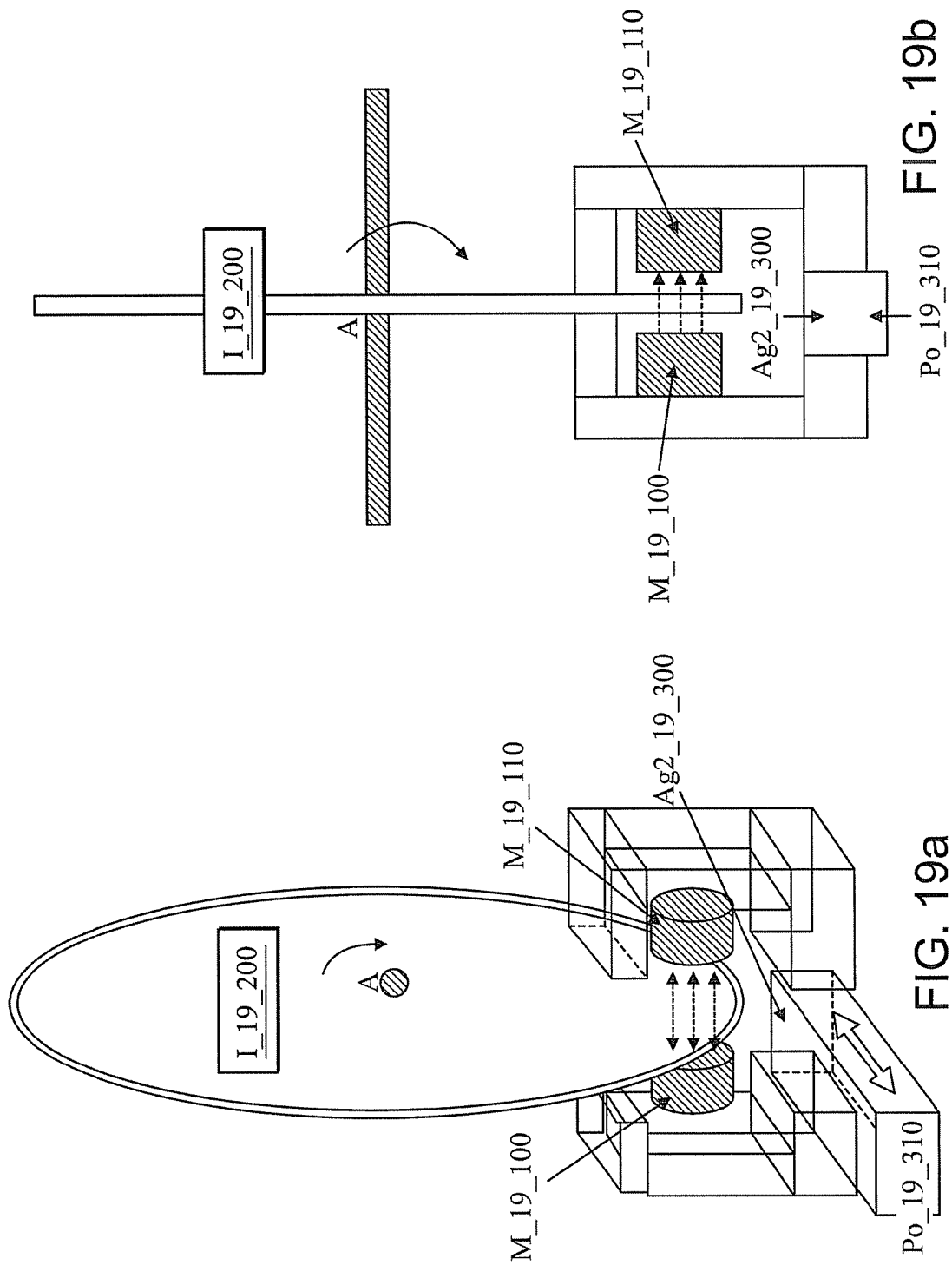

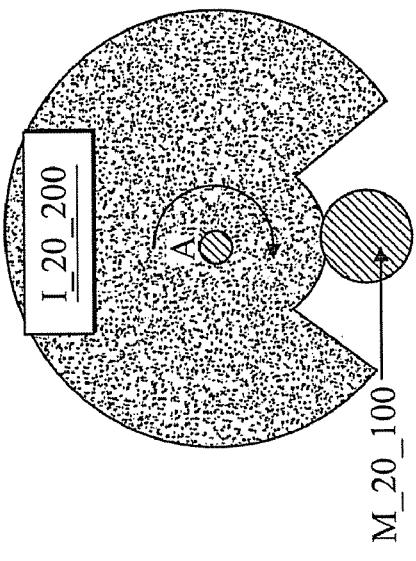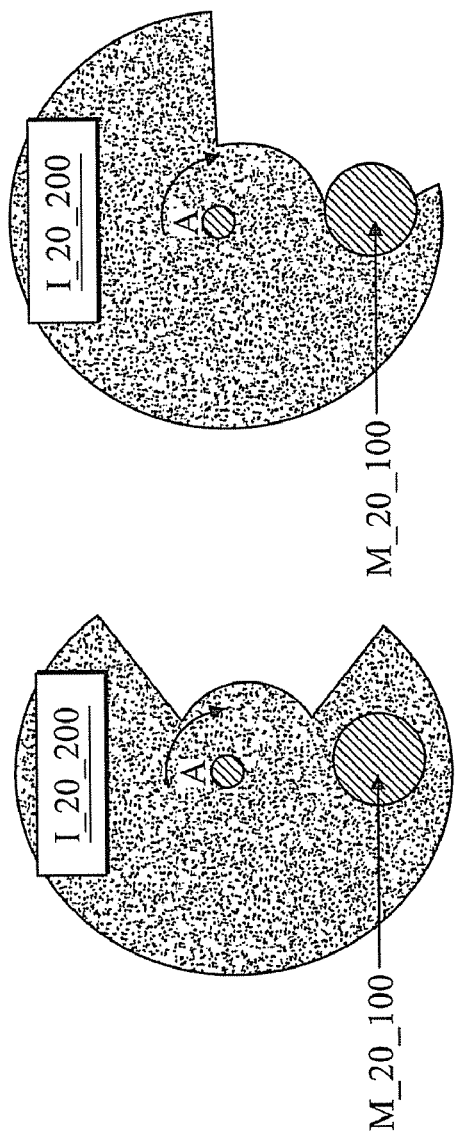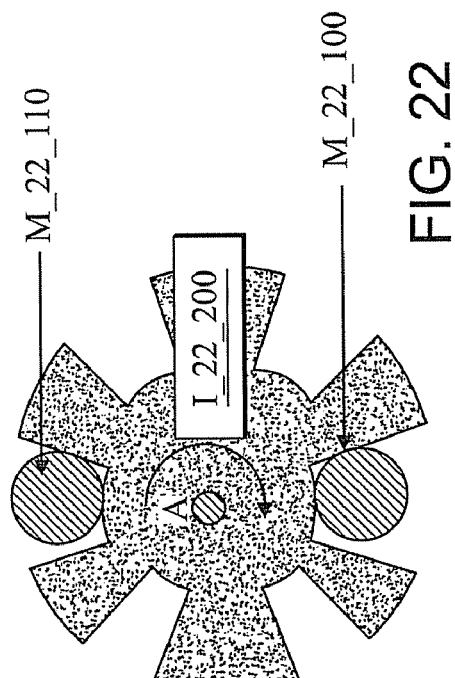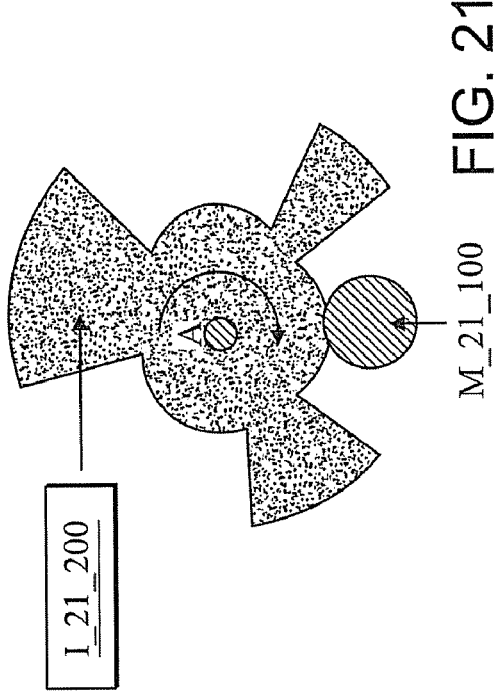

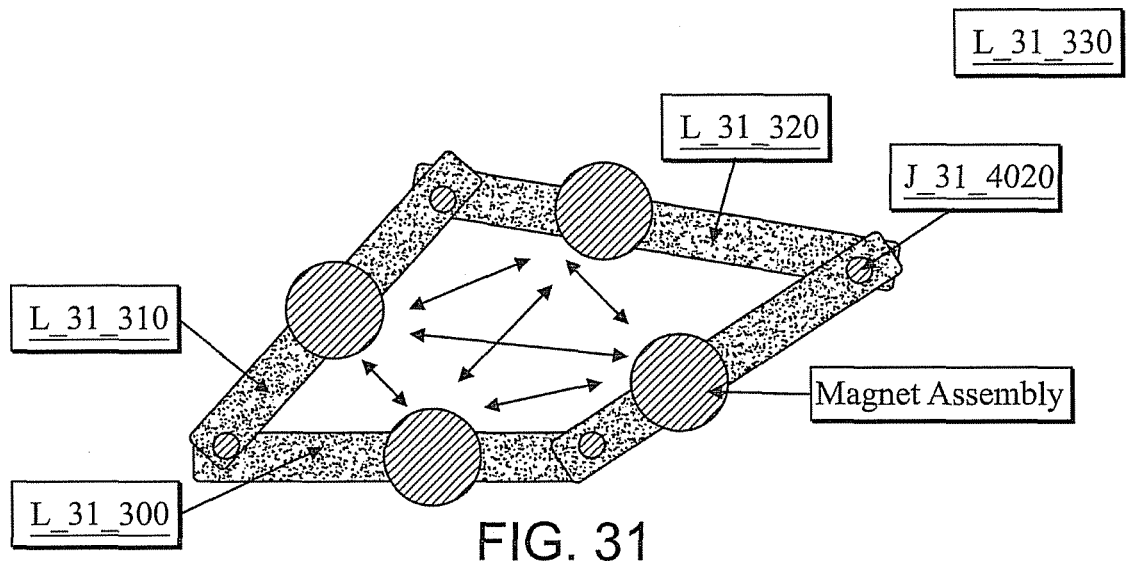
FIG. 31
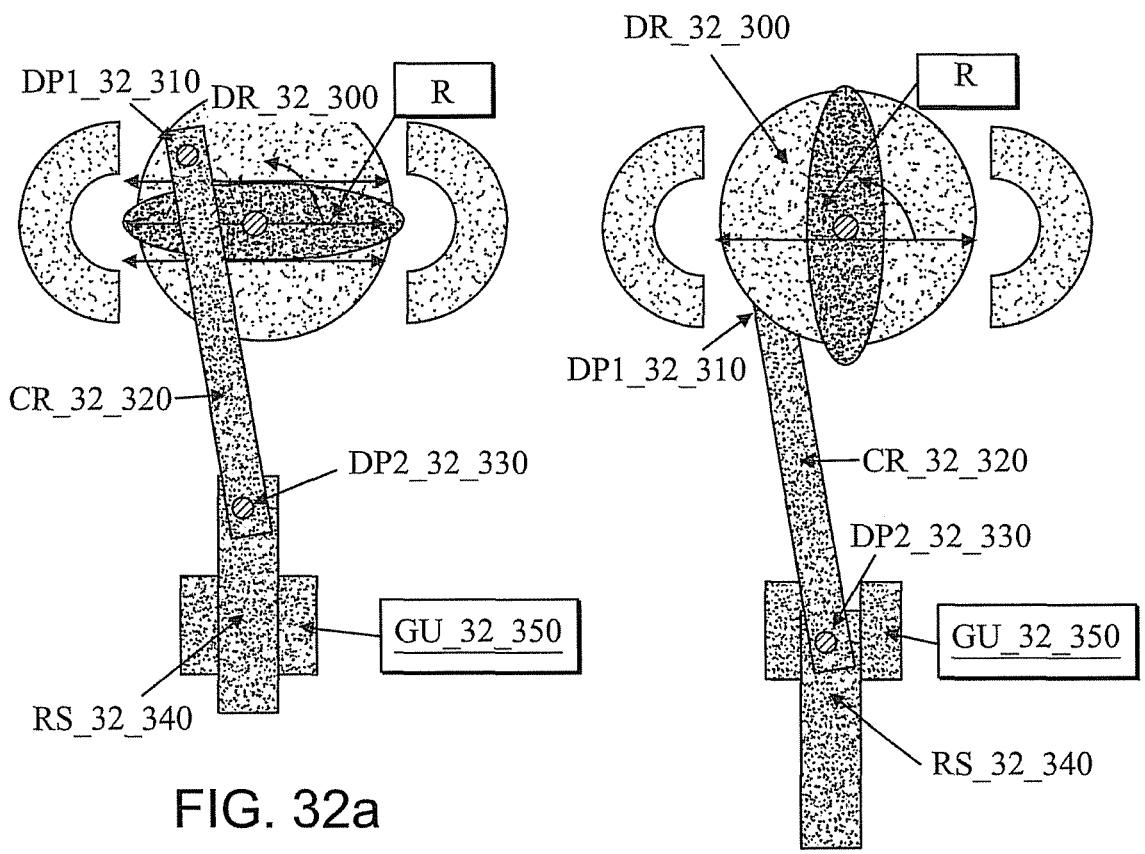
FIG. 32a
FIG. 32b

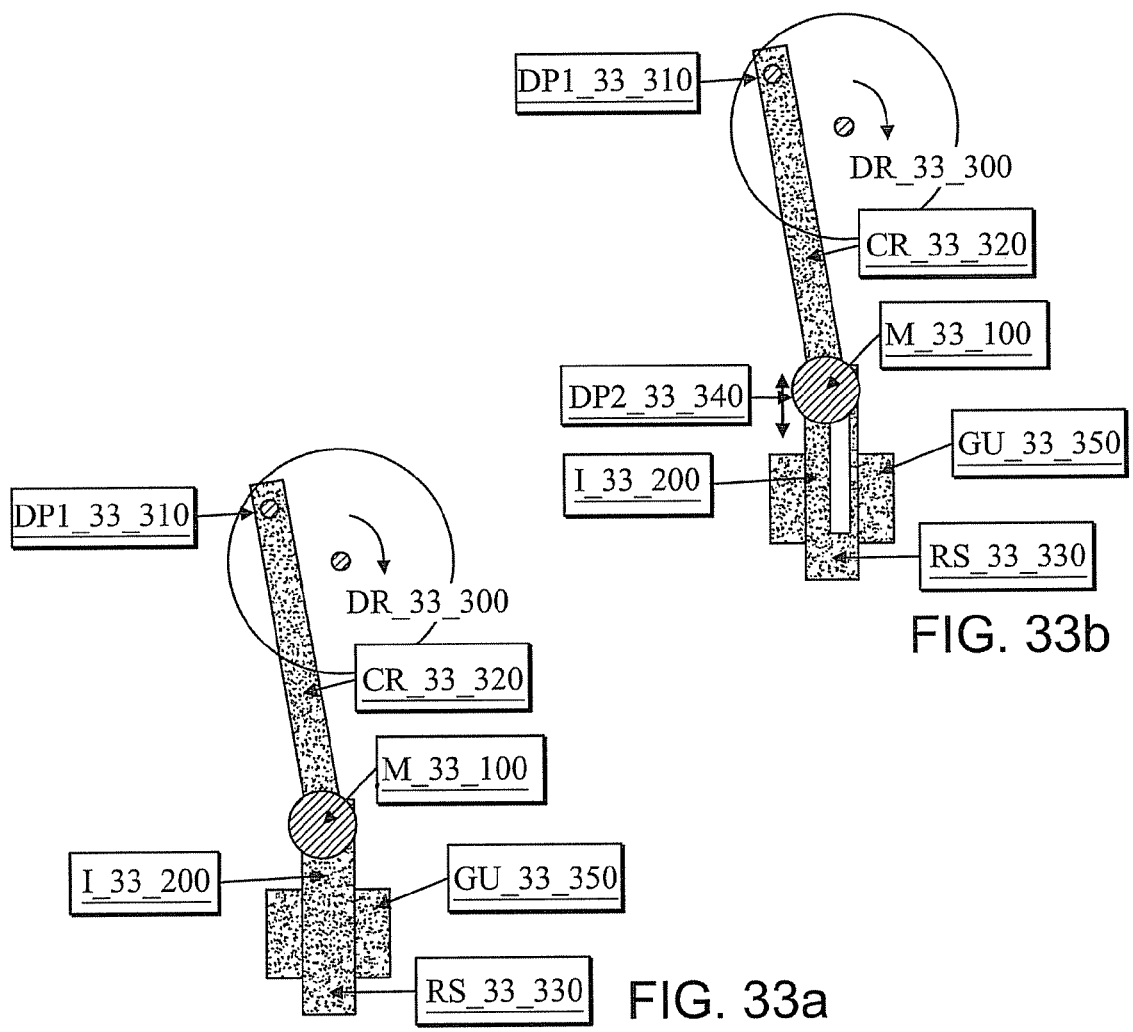
FIG. 33b
FIG. 33a
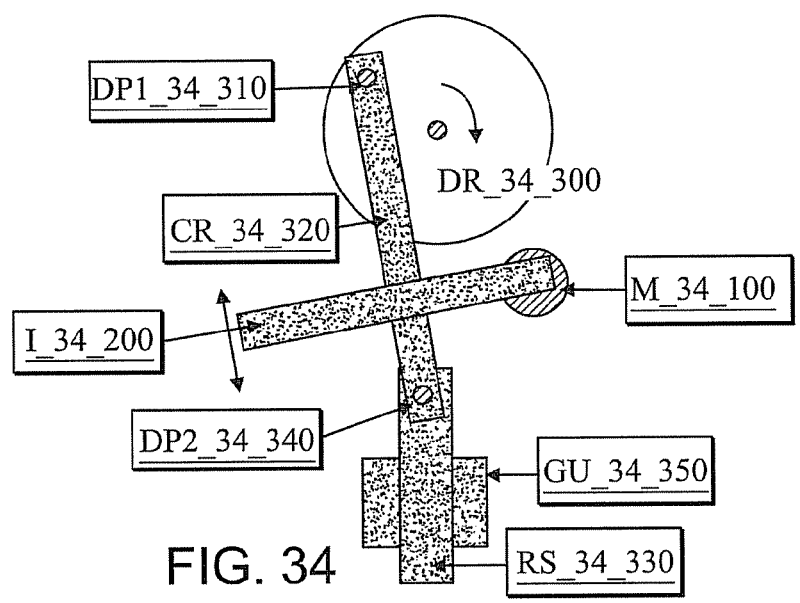
FIG. 34

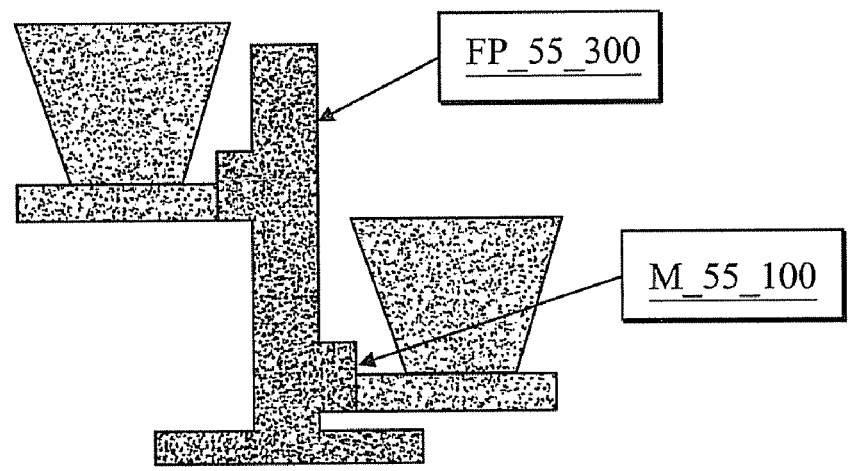
FIG. 55
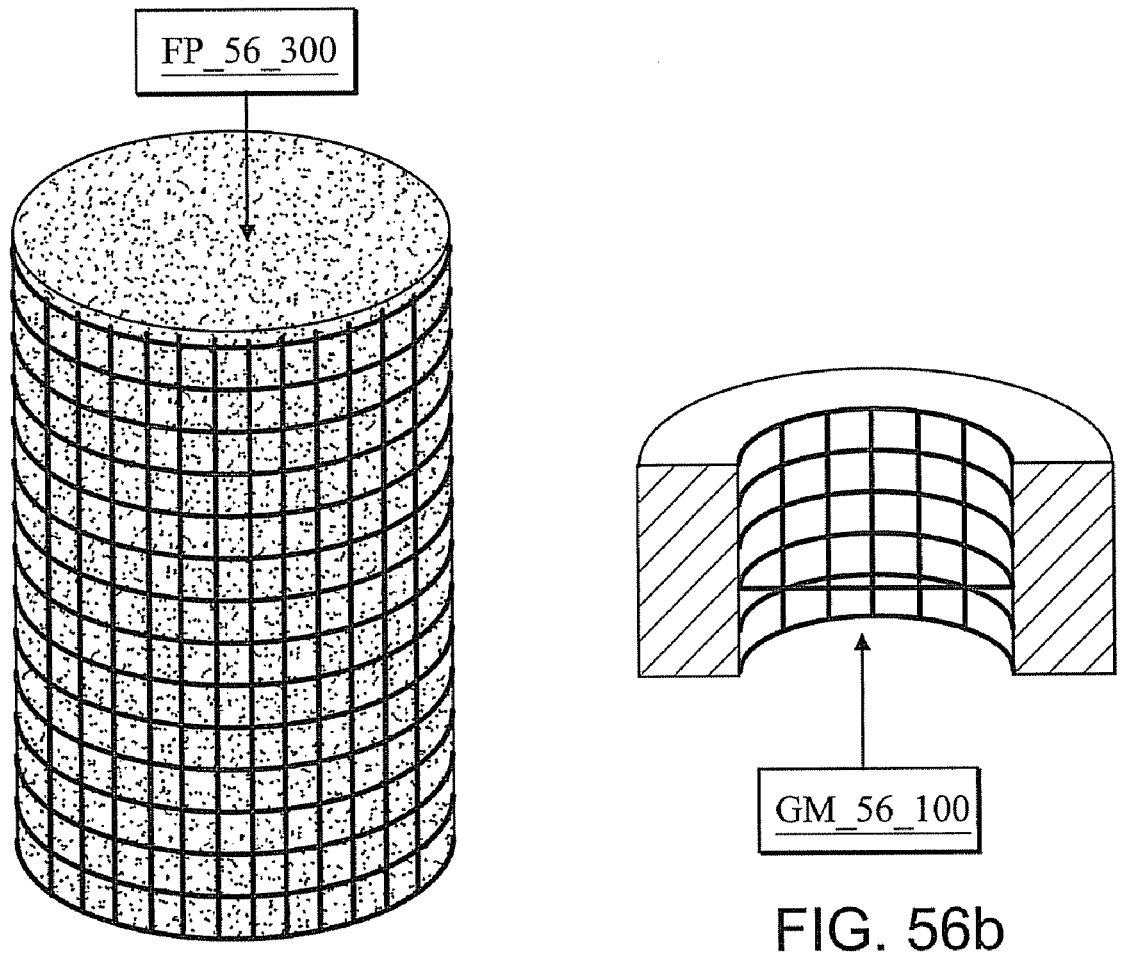
FIG. 56a
FIG. 56b

MOTION CONTROL USING ELECTROMAGNETIC FORCES

CROSS-REFERENCE TO RELATED APPLICATIONS

This application is a divisional application of U.S. application Ser. No. 10/552,379, filed Jun. 29, 2006, now U.S. Pat. No. 7,348,754 which is a National Stage application of International Application No. PCT/US2004/010236, filed Apr. 2, 2004, which claims the benefit of the filing date of U.S. provisional application No. 60/461,883, filed on Apr. 10, 2003, the teachings of which are incorporated herein by reference.

BACKGROUND OF THE INVENTION

1. Field of the Invention

This invention pertains to the use of electromagnetic force/torque for control of motion in unpowered apparatus and apparatus driven by electric motors and/or other prime movers.

2. Description of the Related Art

Power control (PC) refers to control over the power generated at one or more input to an electromechanical apparatus. Prior-art power control mainly deals with relatively large apparatus. U.S. Pat. No. 6,380,709 (Nishimura et al.) teaches an improved means of driving a motor, using controlled switching of power transistors, to obtain better rotation characteristics. U.S. Pat. No. 6,359,410 (Randolph et al.) teaches the use of resistive sensing to better control the maximum current applied to the motor, U.S. Pat. No. 5,349,276 (Mezzatesta et al.) utilizes an electronic tachometer to monitor motor speed accurately, and feed this information to a control system for controlling speed reliably, in a safe operating regime. U.S. Pat. No. 6,344,721 (Seki et al.) and U.S. Pat. No. 6,340,873 (Seki et al.) describe a semiconductor integrated circuit for brushless motor drive control.

Power transmission control (FTC) refers to control over the power transmitted to an electromechanical apparatus. Prior-art power transmission control is also primarily targeted at relatively large industrial applications. U.S. Pat. No. 6,157,147 (Lin et al.) and U.S. Pat. No. 6,346,784 Lin et al.) teach the use of an eddy-current clutch to transmit power, after suitable speed translation. U.S. Pat. No. 5,586,636 (Linn et al.) teaches the use of an eddy-current clutch in conjunction with a friction clutch, to transmit power for the fan wheel of an internal/external combustion (IC/EC) engine.

Load control (LC) refers to control over the total resistive force presented by an electro-mechanical apparatus. Prior-art load control includes eddy-current and hysteresis brakes. U.S. Pat. No. 6,460,828 (Gersemsky et al.) describes an eddy-current brake for a hoist, where a set of permanent magnets is selectively positioned to generate variable eddy-current force in an induction member, thus braking the hoist. The magnets move radially outwards to increase the braking force and reduce the speed. The use of controllable braking torque by moving an induction disk has been used in Ferraris meters to measure power. U.S. Pat. No. 6,062,350 mentions the use of conductors of varying thickness, conductivity, etc. for braking an amusement car on a track. U.S. Pat. No. 6,185,373 describes a camera with an induction brake. Here, the device is used to apply braking force, to stop the motion of the camera shutter, under control of the control circuitry.

Apparatus having rest states have been described in U.S. Pat. No. 6,538,541 (Kralik), where a two-position switch is described, using a coil to move an armature between the two positions. U.S. Pat. No. 6,532,136 (Rae et al.) describes a hard-disk drive magnetic latch, with a coil that is energized for normal operation and de-energized for parking. U.S. Pat. No. 4,706,055 (Uetsuhara) describes an electromagnetic actuator having a member with a multiplicity of poles, in proximity with a magnet whose flux is modulated by a coil.

In various scientific demonstrations in which inductive force is used, the single mention of timing control is dropping a neodymium magnet down an inclined plane with a conductive member embedded in the plane, and slowing down of the magnet when it goes over the conductive member. Other prior art involves a pendulum consisting of a solid or slotted conducting member oscillating near a magnet, where slotting the conducting member greatly increases the stopping time.

SUMMARY OF THE INVENTION

This invention pertains to the use of electromagnetic force/torque, using possibly induction and/or hysteresis, for control of motion in unpowered (e.g., human powered) apparatus and in apparatus driven by electric motors and/or other prime movers. The apparatus may, in general, incorporate complex mechanisms. By control of motion, we mean control of speed of operation of an apparatus (speed), time taken by the apparatus (timing) to reach one or more significant positions (possibly but not exclusively low-energy rest states), and forces/torques exerted on one or more sources of power to the apparatus, one or more external loads, and/or internally between various pieces of the apparatus. The control of motion enables control of position of the apparatus. In certain embodiments of the invention, one or more positions of the apparatus may be stable low-energy states to which the apparatus has a tendency to move, which we shall refer to as rest states.

One objective of certain embodiments of the present invention is to extend the domain of electric motor speed control (and general motion control—possibly unpowered or utilizing other prime movers), traditionally characterized by electronic techniques, to small apparatus, like bubble vibration toys, paper dispensers, well pulleys, toothbrushes, display turntables, rotating lollipops, (very-low-cost) timing cams, toy racing cars, drawers, hinged objects, etc. These apparatus will be hereafter collectively referred to as small apparatus (SAs). These apparatus are either unpowered (e.g., human powered) or typically but not exclusively run on one or two AA/AAA batteries, generating, e.g., a maximum of 3V initially, and less after a little use. This voltage is too low for cost-effective electronic control of motion. Indeed, at these voltages (e.g., 1.5V), even simple resistive motor speed control techniques can become ineffective. One object of certain embodiments of the present invention is to achieve such control, possibly in a user-customizable fashion, at low cost. While the invention is primarily targeted at low-cost mass-market applications, this does not limit its use in other contexts, e.g., in high-reliability environments due to simplicity of design, very high-performance apparatus due to easy modification of apparatus static and dynamic behavior to simplify control, design, simplification of existing apparatus, etc.

Prior art in motion control, either for apparatus driven by traditional rotating motors, linear motors, or even non-electrical prime movers like internal/external combustion engines (hereafter referred to as IC/EC engines), have relied primarily on a combination of (1) Design of the apparatus: The intrinsic design of the apparatus—the characteristics of the prime mover, any power-transmitting devices, any loads, and the number and positioning of any rest states, if present, all influence the motion of the apparatus.

(2) Power Control (referred to as PC): The power generated at one or more inputs to the apparatus is modulated as desired. Examples include pulse-width modulation/resistive control for motors, and/or gasoline/fuel injection control for IC/EC engines. These methods may or may not involve closed-loop feedback, using possibly back-emf sensing techniques, speed tachometers, etc.

(3) Power Transmission Control (referred to as PC): The power transmitted to the apparatus is modulated as required. Clutches (friction, hydraulic, eddy-current/hysteresis, magnetic particle) are examples. The amount of power transmitted to the load can be modulated within limits.

(4) Load Control (referred to as LC): The total resistive force presented by the apparatus is modulated as desired. Friction/induction brakes have been primarily used for completely stopping, or aiding the stopping process of a prime mover, but typically have not been used for controlling speed, during normal running of the prime mover. The primary reason being that these embodiments of load control are dissipative methods, and friction brakes are prone to stick-slip.

These techniques are generally applicable. They can be applied to apparatus having no preferred position (no rest state), as well as apparatus that have preferred positions (rest states). Mechanical ratcheting devices, electromagnetic relays, latches, actuators, etc. are examples of apparatus having rest states.

The present invention can be embodied with one or both of the following:

(I) Techniques to achieve motion control (possibly with rest states) using electromagnetic force, possibly using induction and/or hysteresis, in various apparatus. These techniques are based on the interaction amongst one or more magnets (primarily permanent but can be electromagnets also), and/or conductive or ferromagnetic strips, sheets, rods, etc. (hereafter referred to as induction/hysteresis members), generating the electromagnetic force. These magnets and induction/hysteresis members can be solid, slotted, or perforated, can have various geometries, various dimensions (length, width, height/thickness), and be of various conductive, ferromagnetic, partially conductive, partially ferromagnetic, or composite materials. The three forms of these techniques, which can be used in conjunction, are:

(a) Power Control: This refers to control at the source of the power. In motors, the magnetic flux path geometry or properties of the induction/hysteresis interaction members are physically changed, achieving modulation of the magnetic, field and/or inducted currents and/or forces/torques inside the machine. In general mechanisms, additionally, multiple powering sources (rotary or linear motors) are present, which are controlled in a co-operative manner to achieve desired motion. The state-of-art in field control, typically changes the current exciting a field coil. The state-of-art of modulation of permanent magnetic field has not been applied to a low-cost electric motor for controlling speed. One key idea, here is varying the design parameters of the machine to achieve motion control, and can be applied to all kinds of prime movers. For example, an IC petrol engine can be controlled by varying the length of the stroke, using an appropriate mechanism.

(b) Power Transmission Control: This refers to control in the power transmission chain. In rotating systems, the electromagnetic force transmission is controlled by varying the magnetic, flux path and/or induction/hysteresis member geometry, and is a generalization of electromagnetic clutches. In general mechanisms, additionally, force/torque can be transmitted through multiple portions of the mechanism, and the mechanism is designed to make these multiple transmitted force/torques to be complementary.

(c) Load Control: Control of electromagnetic load here is also primarily based on the geometry and relative positioning of magnets and/or induction/hysteresis members. Both the geometry and the relative positioning of the magnet or magnets and/or the induction/hysteresis members can optionally be changed. In general mechanisms, additionally, multiple loading elements can be present, which are designed to jointly meet a desired loading criterion.

The amount of control exerted on the apparatus by the three techniques can be constant with time, periodically varying, or aperiodically varying, as desired by the user, and possibly changeable at the time of usage of the apparatus. The invention can be used in conjunction with all existing methods of motion control also. The invention is excellently suited for applications wherein low cost is primary, as it is, in a major embodiment primarily but not exclusively, a passive method, and does not require expensive powered microprocessor+ servo/similar devices.

(II) Application of aforesaid motion control technique to apparatus that have hitherto not used even existing techniques of motion control, and the realization of new functionality in the aforesaid apparatus, as well as realization of new apparatus utilizing our techniques.

While the invention is primarily targeted at low-cost mass-market applications, this does not limit its use in other contexts, e.g., in high-reliability environments due to simplicity of design, very high-performance apparatus due to easy modification of apparatus static and dynamic behavior to simplify control, design simplification of existing apparatus, etc.

According to certain embodiments, the present invention is an apparatus comprising (a) a first component having one or more electromagnetic elements and (b) a second component having one or more electromagnetic elements and movably coupled to the first component. The second component is adapted to move with respect to the first component in a cyclical manner. The one or more electromagnetic elements of the first component are adapted to interact with the one or more electromagnetic elements of the second component during each of one or more cycles emotion of the second component with respect to the first component such that, when a constant force profile is applied to move the second component with respect to the first component, the speed of motion increases and decreases one or more times during each cycle of motion due to different levels of electromagnetic interaction between the electromagnetic elements within each cycle of motion. As used in this specification, the term "force profile" is intend to refer to either force or energy (e.g., for certain powered applications).

As used in this specification, the term "cycle" can refer to a "unit" of motion of the apparatus. For example, in an embodiment where the second component rotates with respect to the first component, a cycle can refer to a 360-degree rotation. Note that, in some applications, such as those involving a screw, a 360-degree rotation of the screw is accompanied by a translation of the second component (e.g., the screw) with respect to the first component. Thus, in general, a cycle of motion can but need not return the two components to their exact same relative positions. In an embodiment primarily involving translational motion, such as a drawer, depending an the context, a cycle could refer to moving the second component from a start position to an end position (e.g., from the drawer in its closed position to the drawer in its open position), or a cycle could refer to moving the second component from a start position to an end position and then back to the start position (e.g., opening and then closing the drawer).

In at least one embodiment, the levels of electromagnetic interaction are dependent on the direction of the motion of the second component with respect to the first component. For example, the levels of electromagnetic interaction associated with a forward cycle of the motion may be different from the levels of electromagnetic interaction associated with a reverse cycle of the motion.

In at least one embodiment, there exists at least one non-constant force profile, such that, when the at least one non-constant force profile is applied to move the second component with respect to the first component, the speed of motion is constant during each cycle of motion due to the different levels of electromagnetic interaction between the electromagnetic elements within each cycle of motion.

In at least one embodiment, when an impulse force is applied to move the second component with respect to the first component, the speed of motion increases and decreases one or more times during a first cycle of motion due to the different levels of electromagnetic interaction between the electromagnetic' elements within the first cycle of motion. For example, when the impulse force is applied to move the second component with respect to the first component, the second component may move with respect to the first component in two or more contiguous cycles of motion, wherein the speed of motion increases and decreases one or more times during each cycle of motion due to the different levels of electromagnetic interaction between the electromagnetic elements within each cycle of motion.

In at least one embodiment, at least one electromagnetic element has a non-uniform surface texture that is matched to a surface to which it is attached.

In at least one embodiment, the electromagnetic elements are all passive electromagnetic elements, and at least one electromagnetic element is a permanent magnet. As used in this specification, the term "passive electromagnetic element" refers to an element exhibiting one or more of permanent magnetism, electrical conduction, and magnetic hysteresis. Magnetic hysteresis refers to the ability of an element to exert forces on other electromagnetic elements in time-varying magnetic fields, e.g., due to the creation of induced magnetism within the hysteresis element. Hard iron is an example of a material that exhibits magnetic hysteresis. In theory, a passive electromagnetic element can exhibit any combination of these three properties. For example, in addition to magnetic hysteresis, hard iron exhibits electrical conduction and, in certain circumstances, permanent magnetism.

In at least one embodiment, at least one electromagnetic element is an electromagnet.

In at least one embodiment, the second component has one or more low-energy positions during each repetition, of motion relative to the first component, wherein each low-energy position corresponds to a peak in overall attractive interaction level between the electromagnetic elements. For example, the second component may have two or more low-energy positions that are not equally spaced within each cycle of motion. For applications where the motion is rotation, the spacing of low-energy positions relates to angular distance between low-energy positions. For applications where the motion is translation, the spacing relates to linear distance between low-energy positions along the path of motion between the components. Note that, depending on the particular application, the path of motion may be straight or curved.

In at least one embodiment, the apparatus further comprises one or more prime movers adapted to cause the second component to move with respect to the first component. At least one prime mover may be an electromechanical motor. For example, the motor may be driven by a DC voltage of about 3V or less, such as a battery-powered motor.

In at least one embodiment, the at least one prime mover is adapted to cause multiple contiguous cycles of motion having a substantially constant steady-state period emotion for each cycle of motion, during which a profile of the speed of motion within each cycle of motion repeats from cycle to cycle. The profile oldie speed of motion may involve the speed of the second component increasing and decreasing with respect to the first component within each cycle. Electromagnetic interaction between the first and second components may reduce variations of speed within the profile of the speed of motion otherwise caused by the prime mover.

In at least one embodiment, the apparatus has only one prime mover.

In at least one embodiment the apparatus has two or more prime movers.

In at least one embodiment, each prime mover is adapted to move a different component with respect to the first component. Each prime mover may be adapted to move the second component over a different portion of each cycle of motion.

In at least one embodiment, the first and second components are part of a prime mover, wherein the prime mover is adapted to move the second component with respect to the first component.

In at least one embodiment, the second component is adapted to move with respect to the first component as a result of external force applied to the second component by a user of the apparatus. The second component may be adapted to continue to move with respect to the first component after the external force has been removed.

In at least one embodiment, the apparatus is adapted to enable a user of the apparatus to alter the interaction levels between the first and second components. At least one of the electromagnetic elements may be adapted to be removed from the apparatus by the user to alter the interaction levels between the first and second components. The apparatus may enable the user to change the distance between the first and second components to alter the interaction levels between the first and second components.

In at least one embodiment, at least one of the electromagnetic elements in one of the components is a magnet, and at least one of the electromagnetic elements in the other component is an interaction element. The interaction element has a material that exhibits at least one of electrical conductivity and magnetic hysteresis. The electrical conductivity or magnetic hysteresis or both of the material varies with position over the interaction element, such that, as the second component moves with respect to the first component, the magnet induces at least one of eddy currents and hysteresis forces in the interaction element that vary in intensity during each cycle of motion.

In at least one embodiment, the interaction element has one or more cutouts, each cutout corresponding to a position of local minimum interaction level between the electromagnetic elements. For example, the interaction element may have a plurality of cutouts, wherein at least two of the cutouts have different dimensions resulting in different local minimum interaction levels and different speeds of motion over each cycle of motion.

In at least one embodiment, the motion is rotation of the second component relative to the first component, and the variation in the electrical conductivity or magnetic hysteresis or both of the material results from the interaction element having a non-circular cross-section with respect to a plane perpendicular to the axis of rotation of the second component with respect to the first component, such that the interaction level between the magnet and the interaction element varies over each cycle of rotation.

In at least one embodiment, the composition of the interaction material varies with position within the interaction element.

In at least one embodiment, each component has one or more magnets whose interaction levels vary over each cycle of motion.

In at least one embodiment, the second component is rotatably coupled to the first component such that the cycle of motion corresponds to a complete rotation of the second component with respect to the first component.

In at least one embodiment, the second component is rotatably coupled to the first component such that the cycle of motion corresponds to a partial rotation of the second component with respect to the first component.

In at least one embodiment, the second component is slidably coupled to the first component such that the cycle of motion corresponds to a complete reciprocation of the second component with respect to the first component, where the sliding motion may be along a substantially straight line or along a curved path, e.g., that lies substantially within a plane.

In at least one embodiment, the second component is slidably coupled to the first component such that the cycle of motion corresponds to a partial reciprocation of the second component with respect to the first component.

In at least one embodiment, the apparatus further comprises at least one more component, wherein the first, second, and at least one more components form at least two pairs of corresponding components, wherein, within each pair, one component is adapted to move with respect to the other component.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 3: (a) Magnet M_3_100 near Induction/Hysteresis Member 1_3_200 (b) Magnet M_3_100 farther away, reducing field.

FIG. 4: (a) Magnets close to each other (b) Magnets farther away, 'reducing field.

FIG. 9: Changing interaction between field and rotor (a) Full interaction (b) Partial interaction. The figure shows axial cross section of the rotor and stator.

FIG. 14: Basic Motion Control using controllable induction (a) High Speed (b) Medium Speed (c) Low Speed. (d) Magnet M partially outside disk, reducing induction and causing speed increase. Speed is controlled by varying the position of a field generating device (magnet M_14_100), with respect to axis of rotation A. Alternative structures can be used for magnet M (Section A).

FIG. 15: (a) Low Speed, with M_15_100 close to disk (b) Higher speed with M_15_100 far from disk. (c) Highest speed with M_15_100 farthest from disk.

FIG. 19: (a) Alternative Structure corresponding to FIG. 17 showing bearing supporting disk, with magnets part of bearing structure. (b) Cross Section View of (a).

FIG. 20: (a) Magnet assembly M_20_100 over conducting/ferromagnetic disk sector, maximum torque (b) M_20_100 at periphery of conducting/ferromagnetic sector, lower torque (c) M_20_100 over cutout sector, close-to-zero inductive/hysteresis torque.

FIG. 21: Timing Control Induction Disk with three cutouts.

FIG. 22: Timing Control induction Disk, with symmetric cutouts, and multiple magnets, to yield zero net force, but nonzero torque.

FIG. 31: 4-bar linkage with magnetic/induction/hysteresis interaction between links, with capability to form mechanical logic. R_31_300 is the fixed link, R_31_310 is the input link, and R_31_320 is the output link. Prismatic Pair P_31_400 may include induction members and magnets not shown.

FIG. 32: Power Control for a Reciprocating Mechanism (a) Maximum Force/Torque position (b) Minimum Force/Torque Position.

FIG. 33: Power Transmission Control for a Reciprocating Mechanism: (a) The drive pin DP2 is omitted (or modified), and auxiliary constraints keeping connecting rod CR_33_320 in the vicinity of reciprocating shaft RS_33_330 are present. Magnet M_33_100 (or Magnets M_33_100) are attached to CR_33_320. Inductive force is produced in RS_33_330, due to slip between CR_33_320 and RS_33_330. (b) Modification-of drive pin DP2_33_340. A slot is cutout in RS_33_330, in which DP2_33_340 can slide. The slot serves to constrain CR33_320 to be in proximity with RS_33_330. No vertical force is transmitted through the slot. Vertical force is due to induction in RS_33_330 due to field from magnet M_33_100 (or magnets M_33_100).

FIG. 34: Reciprocating mechanism with Load control.

FIG. 55: Magnetically Adjustable Pedestal, showing two pot platforms, whose height/angular position can be adjusted.

FIG. 56: (a) Ferromagnetic Grooved pedestal, and (b) Matching projections on magnet/magnets attaching the platform(s) to the pedestal. The matched grooves and projections enhance holding force, and prevent motion in any direction. The ferromagnetic pedestal can be spherical, or any other shape, with grooves on its surface. Magnet/magnets holding the platforms to the pedestal, have matching projections on their surface.

DETAILED DESCRIPTION

Figure 1:
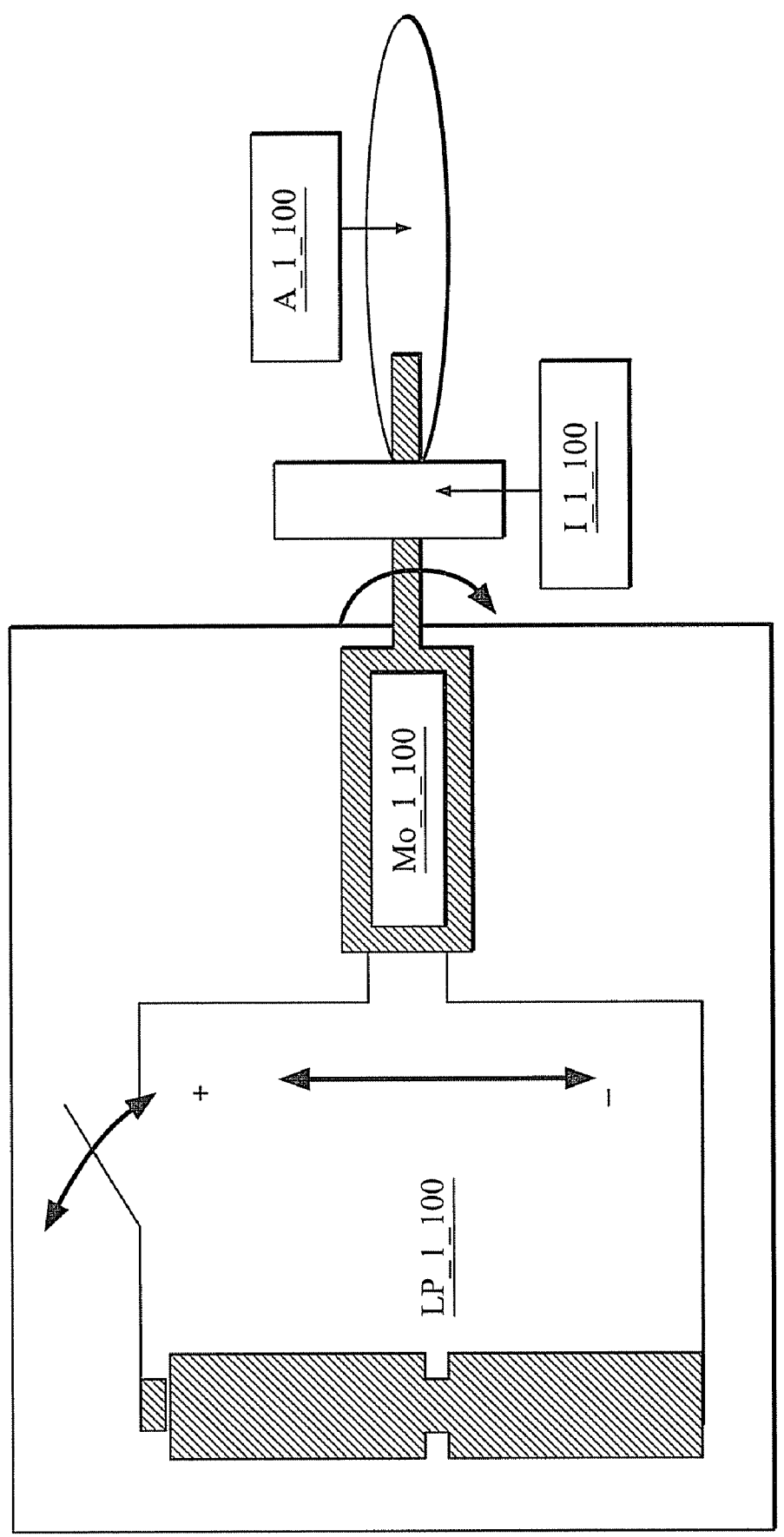
FIG. 1: Key challenge in certain embodiments of the invention: apparatus driven by slowly varying source of low-voltage power (about 1-3V) energizing an electric motor, or apparatus driven by human power (unpowered apparatus), where invention controls motion of apparatus.
Figure 2A:
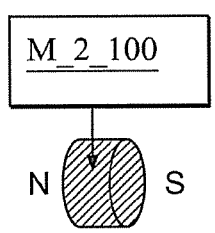
FIG. 2: (a) Magnet Monopole (b) Magnet Dipole inducing closed eddy-current loop E_2_300 (top view) (c) Eddy loop closed through diode (nonlinear device) Di_2_110 (d) Showing multiplication of induced voltages by series connection of voltages induced in insulated parts.
Figure 2B:
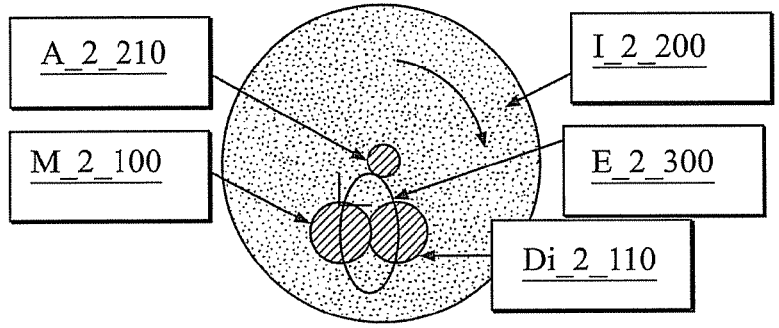
Figure 2C:
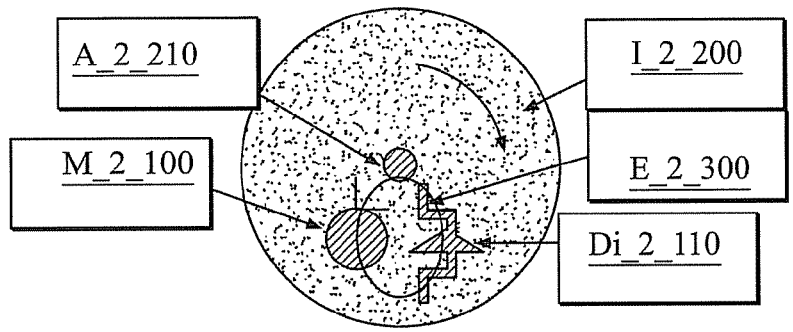
Figure 2D:
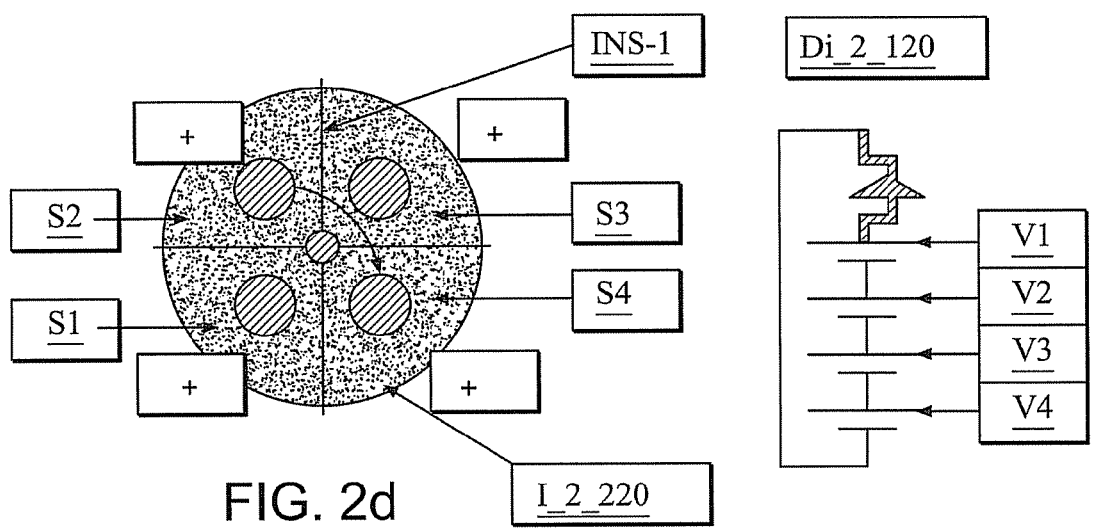

The present invention extends the domain of electric motor speed control (and general motion control using possibly other prime movers or unpowered motion), traditionally characterized by electronic techniques, to small apparatus (SAs). Primarily but not exclusively, physical motion of appropriately shaped, magnetic flux-producing devices, and appropriately shaped, interacting devices (primarily but not exclusively magnets and/or conductive and/or ferromagnetic portions of the apparatus) is used for the control. In particular, we describe modifications of electric motors, induction clutches and brakes, and electromagnetic actuators, yielding new devices, which can be used for controlling motion of a large variety of apparatus.

Our techniques offer the ability to perform detailed control of motion timing in mechanisms, and arbitrary timing functions can be generated. We also describe new application of our devices in existing apparatus, as well as new kinds of apparatus, yielding hitherto unrealized benefits.

Certain embodiments of the invention use a combination of Power Control (PC), Power Transmission Control (PTC), and Load Control (LC). Existing implementations of these techniques are in general too expensive and unsuited (due to power requirements, etc.) for the targeted applications. The invention offers new implementations of PC, PTC, and LC overcoming these limitations. Even in applications where the existing techniques are suitable, our invention, whether used singly or in conjunction with existing techniques, can offer benefits in terms of simplicity of operation, high reliability, fail-safeness, etc.

Power control is realized typically by pulse-width-modulation systems in the state-of-art, and the invention realizes many of the benefits of pulse-width-modulation, without using electronics. This is done by generalizing the geometry of electrical prime movers to include possibly multiple non-cylindrical power generating sections, connected together by arbitrary mechanisms, with arbitrary rest states. The techniques of achieving motion control without using electronic control can be directly applied to other prime movers also. For example, an IC/EC engine can achieve speed control without fuel injection control by changing the stroke of the engine, using an appropriate mechanism.

Power transmission control is realized by electromagnetic clutches in the state-of-art, and the invention in certain embodiments is a generalization of electromagnetic clutches. Even when certain embodiments of the invention can be directly classified as electromagnetic clutches (eddy-current and/or hysteresis clutches), the invention distinguishes itself from the state-of-art in (a) the novel geometry of the clutch, (b) the novel (very low cost) programmability of transmitted force/torque, and (c) the application to low-cost apparatus, which traditionally have not used them.

Load control is realized in the state-of-art using induction/hysteresis brakes, and the invention in certain embodiments is a generalization of induction/hysteresis brakes. Even when, certain embodiments of the invention are directly classifiable as induction brakes, the invention differentiates itself from the state-of-art in (a) the duration of application of the induction force/torque, which is typically held on during the normal operation of the apparatus, and changing the magnitude of the induction force/torque changes the apparatus/prime mover speed, (b) the new methods of generating the controllable induction force/torque, (c) the utilization of these new methods to change the speed/timing/forces/torques, in a single cycle of apparatus operation, possibly in a programmable fashion, (d) the exploitation of the property that the induction force is velocity dependent, to provide automatic speed control feedback, and (e) the application to low-cost apparatus, which traditionally have not used them.

The invention has broad applicability in the field of design of general mechanisms. The current state-of-art requires close attention to be paid to the interaction of kinematics (path generation, etc.) and dynamics (velocity/timing/force) in mechanism design.

The invention can substantially decouple these two problems. An additional novel feature of certain embodiments of the invention is the systematic exploitation of rest states, appearing when multiple parts of the apparatus are magnets or ferromagnetic material. From one point of view, our work can be regarded as generalizations of both electric machines and general mechanisms, to yield a new class of devices, hereafter called electrical mechanisms.

While the invention may be targeted at low-cost mass-market applications, this does not limit its use in other contexts, e.g., in high-reliability environments due to simplicity of design, very high-performance apparatus due to easy modification of apparatus static and dynamic behavior to simplify control, design simplification of existing apparatus, etc.

We shall first describe the techniques of the invention in the order of Power Control (PC), Power Transmission Control (PTC), and then Load Control (LC), for rotating apparatus powered by electric motors. Then, we shall generalize our techniques to general mechanisms. We describe our techniques with reference to both apparatus without rest states, and those with rest states. Finally, we describe apparatus in which our techniques have been applied, and the resultant novel functionality Much of the discussion will center on Load Control (it can be applied to unpowered devices also), but the ideas are equally applicable to Power Control and Power Transmission Control.

We shall primarily discuss electromagnetic induction-based techniques, but the techniques can be directly translated into hysteresis-based techniques, as well as techniques based on magnetic attraction/repulsion, and are additionally stated by implication of this statement here. Where appropriate, we shall mention differences (Sections A[4] and A[5]). We describe our techniques primarily in terms of fixed magnets (permanent or electromagnets) inducing currents in moving induction members, but our methods are equally applicable when the magnets move and the induction members are stationary, or both move relative to each other. Applicability of our techniques to these cases is stated by implication of this statement here. In passing, we note that any electromagnetic interference (EMI) generated by the apparatus can be handled by methods well known in the state-of-art.

To begin, we briefly indicate the challenges in motion control in the targeted apparatus, followed by some generic issues in controlling magnetic flux.

Motion Control for Battery-Operated & Unpowered Devices

The invention can be (but is not exclusively) targeted at low-cost applications like bubble vibration toys, paper dispensers, display turntables, rotating dolls, rotating lollipops, toothbrushes, racing cars, drawers, etc. Speed control in these devices should typically be smooth, but not necessarily set to an accurate value.

In certain embodiments of these applications, the apparatus is either unpowered (e.g., paper dispensers, drawers) or uses an, electric motor running off one or two (or a few) 1.5V AA or AAA batteries, as in FIG. 1. The available power hence ranges from 1V to 3V (or a few volts), precluding any cost-effective' electronic control of motion. Note that power MOSFETs do not even turn on at these voltages. Electrical control is limited to mechanical on-off switching. Speed control using resistors reduces the available motor power, requires one or more power resistors, and is especially prone to stick-slip at low speeds. In principle, winding current control using transistors driven by varying base drive can be attempted, but is susceptible to varying transistor current gain and is again prone to stick-slip at low speeds. In contrast, our passive method consisting of application of controllable electromagnetic force/torque does not require any electronics, has no stick-slip in certain embodiments, can be implemented with low dissipation by a proper choice of motor impedance, works equally well in unpowered applications, and can be implemented at very low cost. The method is quite general and can be equally applied to apparatus utilizing other control techniques like pulse-width-modulation, to systems using higher voltage than previously described, to systems using other prime movers like 1C/EC engines, and to systems where lowering of cost is not necessarily a major objective. The method works using a combination of Power Control, Power Transmission Control, and Load Control.

Additionally, the use of motion control itself, and particularly magnetic/induction/hysteresis motion control in unpowered apparatus is new.

A. A. Generic Methods of Controlling Magnetic Flux, Induced Currents, Hysteresis and Force/Torque This invention generates controlled forces/torques, by controlling one or more of (a) the magnetic flux in a desired region and (b) the induced currents/field hysteresis due to the flux interacting with induction/hysteresis members (conductors/ferromagnetic material) in any desired region. Changing either the flux and/or induced current/hysteresis changes the force/torque. In all that follows, mechanical means (e.g., screws, sliders, etc.) of performing any desired motions of either the flux-generating or the induction/hysteresis members, are assumed to be available and will not be described. We first consider induction methods, and then outline differences between the use of induction members and hysteresis members, and multiple flux sources.

[1] Control of Magnetic Flux

A first approximation for the magnetic flux in a region is given by the magneto-motive-force (mmf) divided by the reluctance of the paths traversed by the magnetic flux. Changing either the mmf or the reluctance will change the magnetic flux. In apparatus we consider, the magnetic flux is predominantly but not exclusively produced by permanent magnets (typically high-strength neodymium magnets). In this case, the mmf in a given apparatus is fixed by the geometry, size, and strength of the permanent magnets used. If electromagnets are used, then the mmf and hence the flux can be changed by changing the current in the coils. This method can be used in conjunction with all the techniques mentioned here. The reluctance of the flux path, however, can be changed, by changing any air-gaps present. Additionally, in regions of non-uniform magnetic fields, changing the position of the region will change the flux and/or the induced currents and forces due to it. The embodiments are classified according to (1) the number of magnets, (2) the presence of flux return path (back-iron), and (3) the presence of conductive material (induction members) in which eddy-currents leading to inductive forces are generated.

Unless otherwise mentioned, for simplicity of illustration, we chose a cylindrical disk magnet structure, axially magnetized (one circular face is north, the other south), in all that follows (see $M\_2\_100$ in FIG. 2($a$)). In many embodiments, the magnet's poles and flux paths are designed as dipoles (i.e., a structure with unlike poles facing the same face of an induction/hysteresis member), to force the induced currents to follow tight dosed loops. In FIG. 2($b$), magnet $M\_2\_100$ has north pole facing up, and magnet $M\_2\_110$ has south pole facing up, causing eddy loop $E\_2\_300$ due to rotation of nearby induction disc $I\_2\_200$ around axle $A\_2\_210$). Eddy loops can be created using separate current return paths. If the current return paths are non-linear, then the force/torque exhibits non-linear characteristics. For example, the stationary diode $Di\_2\_110$ in FIG. 2($c$) is arranged with its terminals contacting the surface of induction disc I 2 200 (e.g., through brushes), to provide a current return path near magnet $M\_2\_100$. $Di\_2\_110$ can also be on induction disk $I\_2\_200$, and in this case is arranged to avoid canceling electromotive force being induced in it. In this case, the force becomes direction-dependent. In the direction of rotation where the voltage is opposed by the diode, current cannot flow through a closed path, and induced force/torque is low. In the other direction, at low speeds, the induced voltage is too small to fire the diode, resulting in a low current. As speed increases, the induced voltage fires the diode, closing the eddy-loop, resulting in a large current/force/torque. This results in a force/torque characteristic that exhibits a "diode-like" non-linearity. The "breakpoints" can be changed by using diodes of different bandgap (germanium, silicon, etc.). Even for the same diode, the breakpoint can be modulated by series/parallel connecting the induced voltages at multiple locations—insulated from each other (FIG. 2(d)). In FIG. 2(d), the induction disk I_2_210 is divided into four insulated sectors S1 to S4, and voltages are induced in each sector by four magnet assemblies. These four voltages are picked up by brushes well known in the state-of-art (not shown for clarity) and series connected before being connected to diode Di_2_120. Thus, the voltage across the diode terminals is four times the voltage induced by any one magnet, causing it to fire at a lower speed. The use of two diodes oppositely oriented offers low force in either direction. before either diode fires, and high force as speed is further increased in either direction. Series connection of voltages in different sectors may be different for the forward and reverse directions, offering even more control of current/force/torque with respect to speed. The invention is equally valid for such magnets as well as for arbitrary magnet structures and current loop paths.

1. Single magnet, no flux return path: In FIG. 3, the field/flux is controlled by varying the position of the magnet M_3_100 relative to the desired region (of interaction), which exemplarily can be an induction/hysteresis member, e.g., I_3_200. M_3_100 is further from I_3_200 in FIG. 3(b) than in FIG. 3(a).

2. Multiple Magnets, no flux return path: Here, in addition to changing the position of the magnets relative to the desired region (containing induction members/rotors, etc.), the positioning of the magnets relative to one another, can change the field and hence the flux (FIG. 4). For example, magnets M_4_100 and M_4_110 are further away in FIG. 4(b) than in FIG. 4(a), reducing the field in the induction/hysteresis member I_4_200.

Figure 5B:
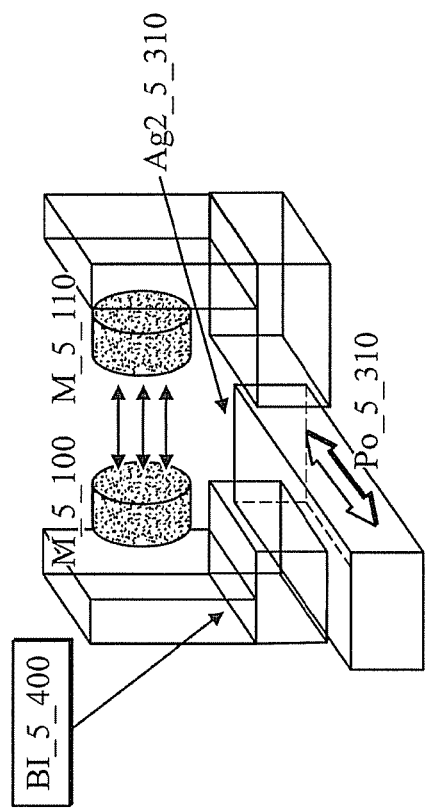
FIG. 5: (a) Air-Gap Ag1_5_300 modulation by moving magnets M_5_100 and M_5_200 and back-iron further away (b) Air-gap modulation by changing reluctance of auxiliary Air-Gap Ag2_5_310, by moving pole piece P_5_310.
Figure 5A:
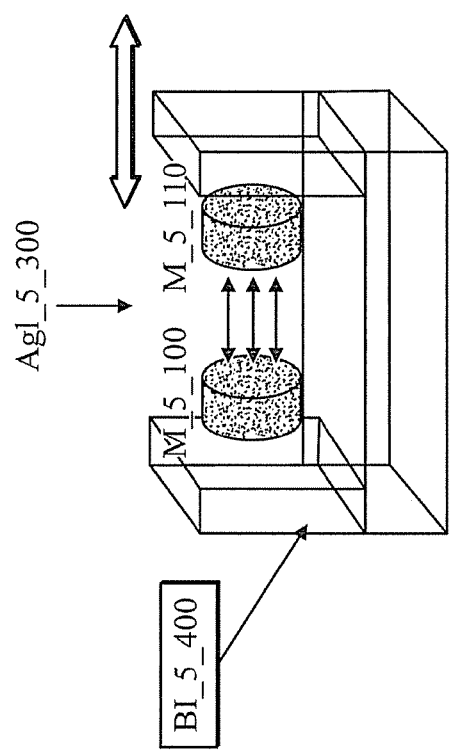

3. One or more magnets with Flux Return Path: Here, additionally to a and 2 above, any means of changing the effective reluctance of any flux return path will cause modulation of the field. FIG. 5 illustrates this for the case of two magnets M_5_100 and M_5_110, with flux return paths using ferromagnetic material (back-iron BI_5_400). Flux can be changed by moving two magnets further away, increasing air-gap Ag1_5_300 (FIG. 5(a)), or keeping the magnets stationary, but changing the size of an auxiliary air-gap Ag2_5_310 in the magnetic circuit by moving a ferromagnetic insert P_5_310 (FIG. 5(b)), or any similar means, where the flux path reluctance is changed by mechanical motion of one or more of its constituents.

In all that follows, for simplicity, we shall often depict a single magnet inducing currents/force in an induction member. It should be understood that the single magnet can be replaced by any of the assemblies described above and similar variants.

[2} Control of Induced Force/Current 12y Changing Induction/Hysteresis Member & Magnet Properties The induced current, and hence induced force, is dependent both on the flux and on the geometry of the induction member, its dimensions (length, width, thickness), and its effective conductivity. The effective conductivity depends on the material, its texture, e.g., whether it is solid, slotted, perforated, etc. Changing any of these parameters changes the induced current, and hence the induced force/torque. The induction members may be merged with other materials to achieve properties other than conductivity. Exemplarily, they could be part of multi-layer assemblies, satisfying desired mechanical strength properties in addition to conductivity etc. Alternatively, they could be coated for corrosion resistance, etc. We additionally note that the same applies to the magnets, whose geometry, dimensions, material, number, etc., can be analogously chosen to suit.

Figure 6:
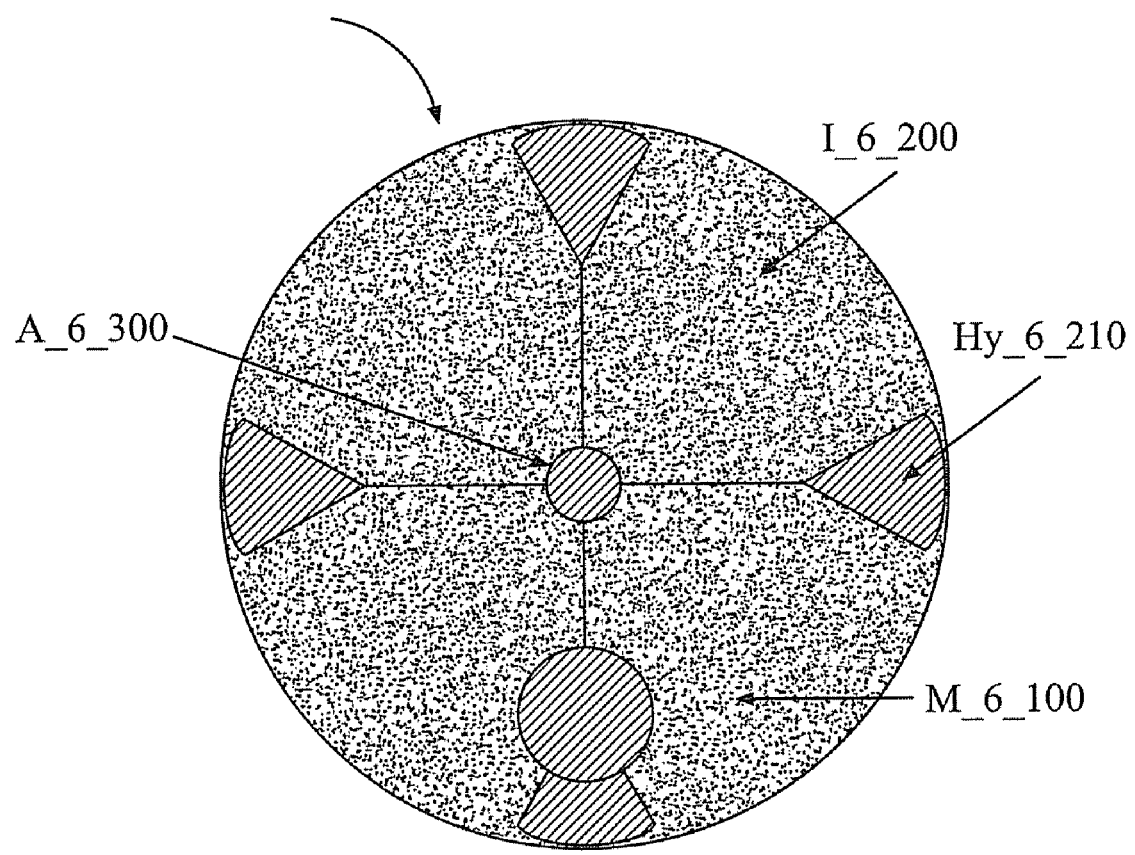
FIG. 6: Combined Induction/Hysteresis Member (Copper Disk I_6_200 with four steel inserts—one is H_6_210) in the vicinity of stationary magnet assembly M_6_100. Some/all of the steel inserts can be replaced by magnets (not shown).

[3] Dynamically Controlling Force by Changing Flux and Induction Member Properties During Operation of Apparatus This pertains to the use of our techniques to control non-uniform motion in apparatus incorporating general mechanisms. Flux changes can be made in a dynamic manner as a part of the regular operation of the apparatus. Exemplarily, the flux path can be made to periodically change reluctance by the techniques outlined above. Additionally, the use of ferromagnetic hysteresis members automatically results in change in flux path reluctance whenever there (see Section A[4] and FIG. 6 below) is relative motion of one or more hysteresis members in the magnetic field. This flux path change can be automatically driven by the operation of the apparatus itself. Flux changes can also be made by dynamically changing the shape of the magnets themselves.

Even for a given fixed flux, the strength of the induced current, and hence the induced force/torque, can be modulated by:

1. Changing the induction member thickness, with maximum thickness at those positions where maximum force is desired. In positions where zero force is desired, the thickness can be zero, e.g., the conductive material is cut out at those positions.

2. Using higher conductivity material at positions where more inductive force is desired (e.g., a copper sector in an aluminum disk, etc.).

3. Using an induction member with varying degrees of material thickness, slottedness, perforatedness, etc., or any means that effectively modulates conductivity.

4. Using induction members of different geometry, e.g., induction drums and members of other geometry well-known in the state-of-art. The induction member geometry can change in different positions, e.g., a disk having a raised cylindrical flange, which occupies only part of the disk circumference.

5. Using multiple induction members, possibly of different geometry, dimensions, and material properties with one or more magnets.

Figure 24:
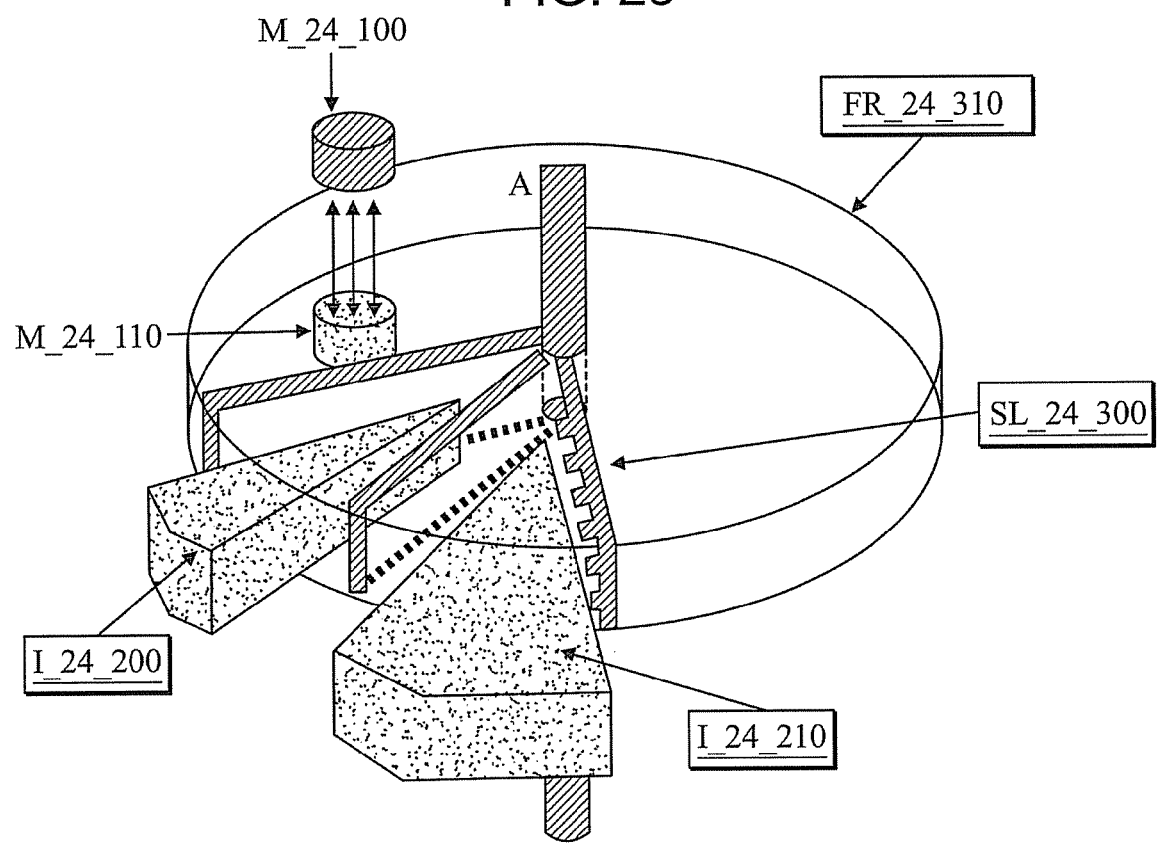
FIG. 24: Programmable Timing Control Disk showing placement of slots SL_24_300 and induction members IM_24_200 and IM_24_210 (conductive disk sectors), which can be selectively inserted into slots to programmably control timing, using induction from the field of magnet assembly M_24_100/M_24_110. The proper fastening of conductive disk sectors to the frame, in a removable fashion, can be done by a variety of means well known in the art. The slot and conductive disk sector pattern is repeated (possibly with changes) on frame FR_24_310 as desired.

All these modifications to the inductive strength can either be made during the manufacture of the apparatus or customizable at the time of use of the apparatus, e.g., by slots being provided for attaching modifications to induction members, magnets, etc. (FIG. 24).

[4] Differences Between Force/Torque Control Using Induction and Using Hysteresis Hysteresis effects can be used instead of induction effects to generate controllable force/torque. Hysteresis members of various materials, sizes, shapes, etc., can be designed to apply a desired force/torque, analogous to the design of the induction members above. The major difference is that hysteresis forces/torques are independent (to a first approximation) of speed, while induction forces/torques are proportional to speed (at speeds where the skin effect is not significant). Induction members provide automatic self-limiting by increasing force/torque as speed increases, and can also be used without stick-slip at very low speeds. If hysteresis members are used, then the forces/torques are constant with speed. Control of force/torque using fixed hysteresis members can be achieved by changing the flux, thus changing the strength of the hysteresis effect, or by changing the radial position of the hysteresis effect, thus increasing torque while the force is kept constant.

Hysteresis and induction members can be used in conjunction with each other, to provide force characteristics having a fixed force component independent of speed, and a variable component linearly proportional to speed. Separate induction and hysteresis members, or members having a combination of hysteresis and induction material, can be used for this purpose (for example, copper inserts in a steel disc, or use of a copper-iron alloy possibly made using power metallurgy). The force production may be changed as desired with time, exemplarily alternating induction, hysteresis, etc. For example, in FIG. 6, the mixed induction/hysteresis disk I_6_200 is rotating about axle A_6_100 in the proximity of stationary magnet M_6_100. The aforesaid mixed induction/hysteresis disk has four steel hysteresis inserts (one is H_6_210) in a copper induction disk, and can be used for sophisticated timing control. One important feature of hysteresis members, shared with magnetic members, when the motion is non-uniform, is that hysteresis members, being ferromagnetic, are attracted to the magnets. This introduces rest positions (low-energy stable states) for the apparatus, which can provide latching behavior (monostable, bistable, etc.). Typical induction members made of copper/aluminum do not introduce preferred rest positions. The use of nonlinear unidirectional elements like diodes offers nonlinear force vs., speed behavior, with breakpoints being settable in either direction, as described above (FIG. 2(*d*)).

[5] Issues when Both Interacting Members have Independently Produced Magnetic Fields This issue arises when magnets are used both to generate the flux, as well as to interact with the flux to modulate motion (e.g., a magnet on the moving induction/hysteresis member itself). Such autonomously magnetic interacting members introduce one major new issue, in that now, because of the presence of both magnets, there may be preferred rest positions (energy minima) for the apparatus, keeping like poles as far apart as possible, and unlike poles as near as possible. Mechanical monostables, bistables, and a stables can be thus designed and cascaded to perform mechanical logic. Design using such devices can be carried out by techniques similar to induction/hysteresis members, together with well known electromagnetic field interaction equations, using possibly principles of virtual work.

Induction forces, hysteresis forces, and forces produced using autonomously magnetic interacting members can be used solely or in any combination. An example would be a modification of the mixed induction/hysteresis disk in FIG. 6, to replace two out of four steel hysteresis inserts by magnets, with like/unlike poles facing the stationary magnet M_6_100.

[6] Reduction of Random Disturbances to the Induced Force/Torque

The force/torque exerted on the apparatus depends on the relative position of the induction/hysteresis member, and the magnet or magnets generating the flux (in addition to other factors like geometry, size, speed). Random disturbances encountered during motion can cause the relative position of the induction/hysteresis member and magnet/magnets to change, causing the force/torque to vary randomly and disturbing the resulting motion. Various mechanical means of minimizing the random disturbances are known, including damping, constraining the relative motion of the magnet or magnets, and induction members, using bearings, etc.

Figures 7A, 7B:
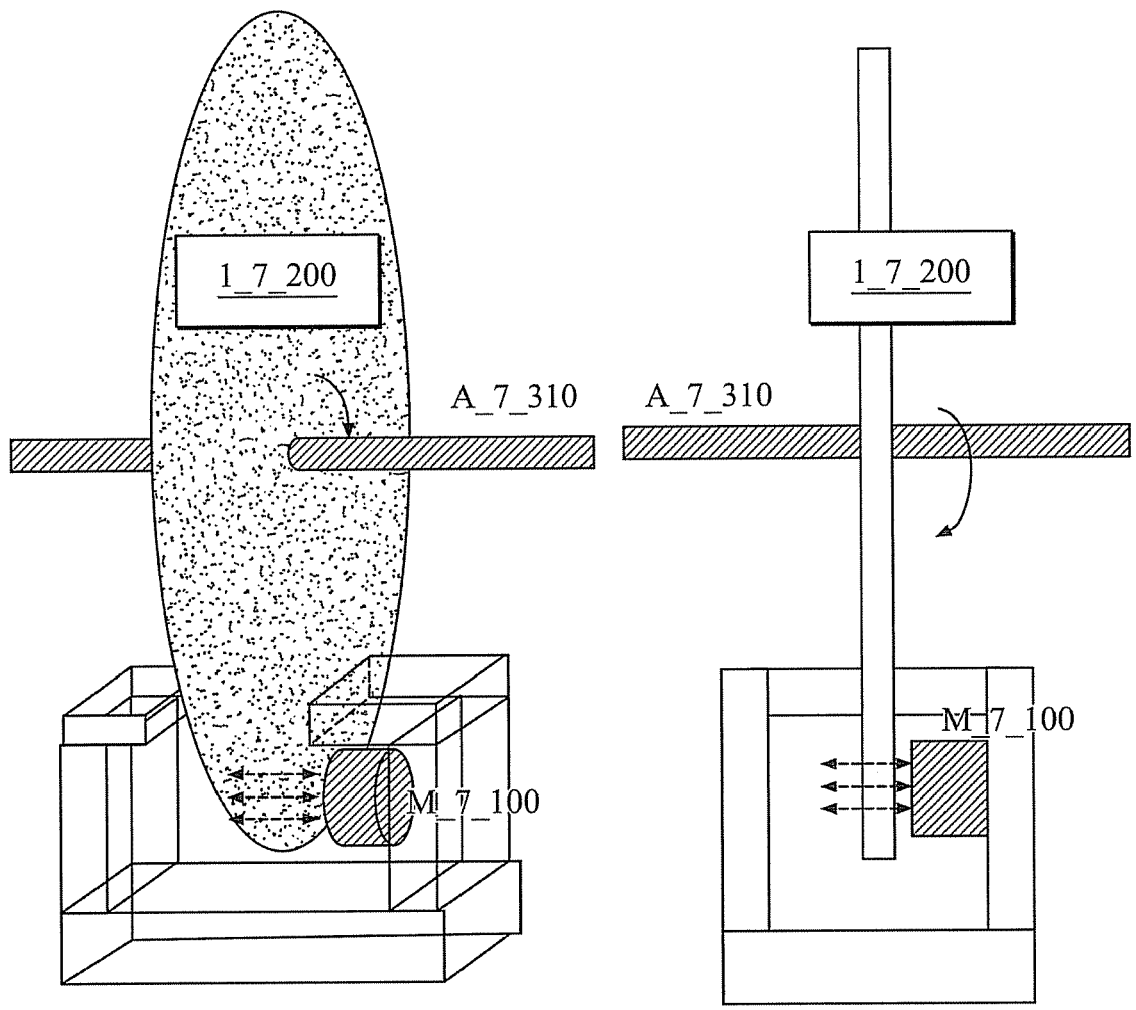
FIG. 7: Induction Disk, Magnet, and Contacting Bearing (a) 3-D View (b) Axial Cross Section.

A preferred low-cost embodiment of these ideas in our invention, applicable when the induction member moves and the magnet is stationary, is the structure shown in FIG. 7 (showing the Load Control structure of FIG. 14, below). FIG. 7 shows a single magnet M_7_100 near an induction member R_7_200, applying induction torque to the induction member, rotating on axle A_7_310. In addition, the structure holding the magnet is further extended towards the inside of the induction member, to form a low-friction contacting bearing for the induction member (disk in this case). The bearing ensures that disk axial vibrations are minimized, resulting in a substantially constant position of the induction member with respect to the magnet M. This helps keep the induction forces and hence speed constant (note that the bearing is low-friction). Changing the speed can be achieved by either radially or axially moving the entire assembly, using apparatus not shown (as shown later in Section D on Load Control).

Figure 11:
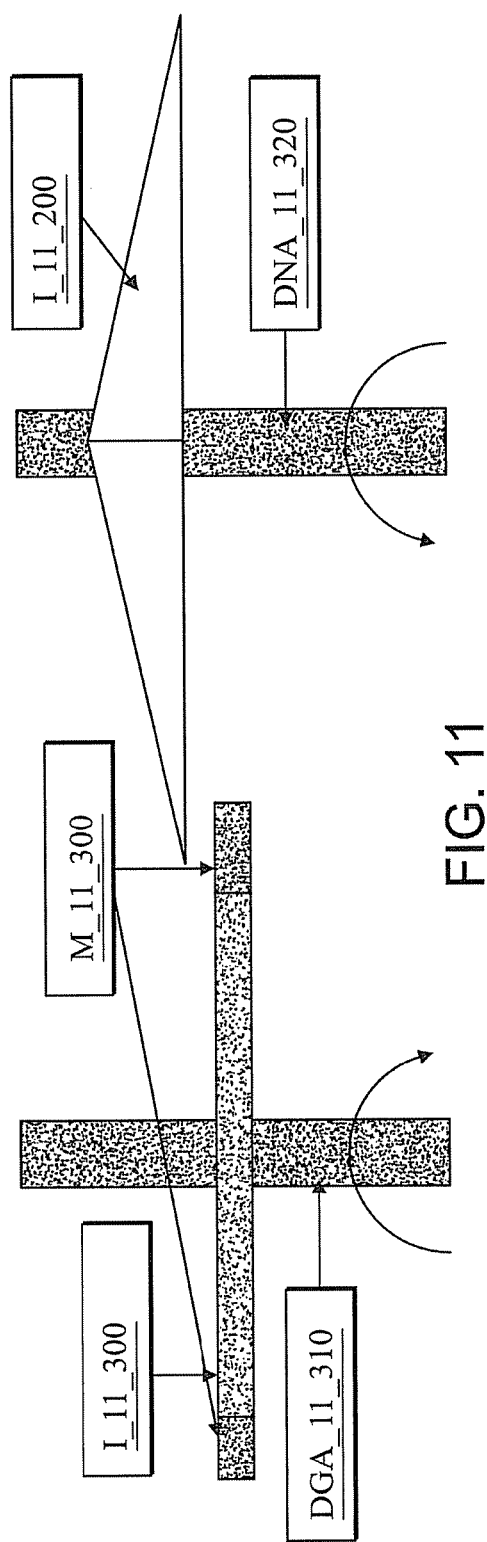
FIG. 11: Gear Train with customizable speed-torque characteristics (axial cross-section view). Force/torque is transmitted from driving axle DGA_11310 to driven axle DNA_11_320, using customizable induction/hysteresis force generated in induction/hysteresis member 1M_11_200 by relative motion of magnets M_11_100 with respect to IM_11_200.
Figure 12:
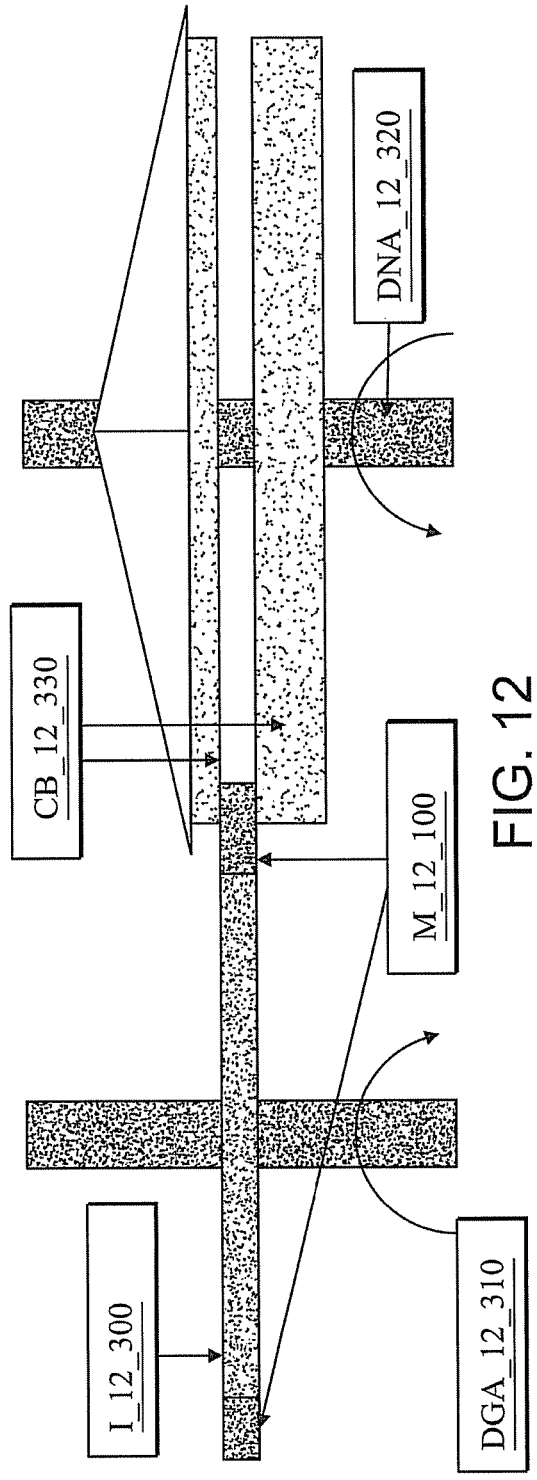
FIG. 12: Gear Train with customizable speed-torque characteristics, with contacting bearing CB_12_330.

The technique can be used when both the induction member and the magnets move (e.g., the induction gear of FIG. 11). The contacting bearing is attached to any stationary portion of the mechanism and provides support for the moving members at or near their interaction region. For the induction gear of FIG. 11, this is shown in FIG. 12.

This method of providing bearing support for the induction/hysteresis member or members and/or magnet or magnets, at or near their interaction region, can be extended in many ways, with different kinds of bearing structures, possibly involving balls and/or rollers also, B. Power Control: Physically Changing Motor Geometry/Dimensions The speed of a motor is changeable by changing the intensity of the field interacting with the rotor (field-weakening speeds up the motor at low torque and slows it down at high torque). Classical techniques exploiting this behavior typically deal with wound field coils, whose current can be controlled to generate the desired field. Unfortunately, these methods are not applicable for very-low-cost apparatus operating off one or two batteries, as they assume some kind of powered control circuitry, together with power MOSFETS. Even for general apparatus, the ability to avoid electronic control is intrinsically useful.

Figure 8B:
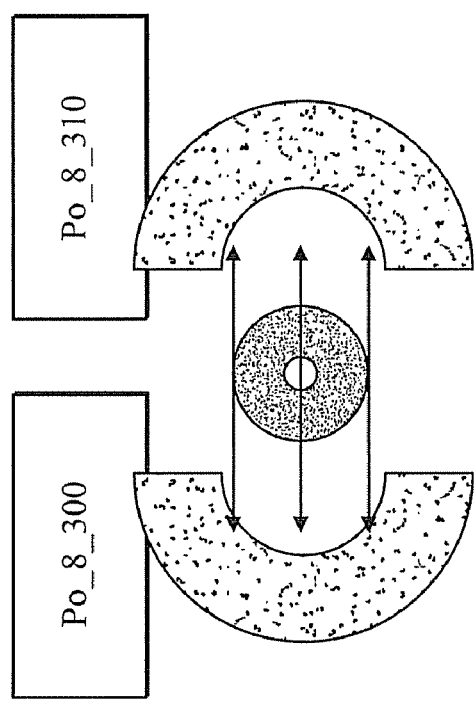
FIG. 8: Field weakening by changing the relative distance between pole pieces (a) Strong Field, since Pole Pieces P_8_300, P_8_310 are close together (b) Weak Field, since Pole Pieces P_8_300, P8_310 are far apart. Both (a) and (b) are views looking axially directly at the rotor. The physical motion of the pole pieces can be replaced by alternative means as outlined in Section A.
Figure 8A:
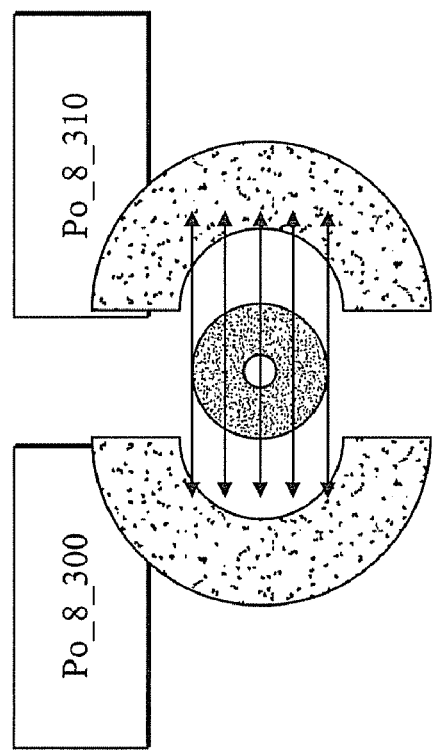

This invention can achieve the control of motor-delivered power, by varying the physical geometry of the motor flux path, resulting in one or more of the following:

1. Change in the field strength, by increasing the reluctance of the flux path. The stator pole pieces P_8_300 and P_8_310 are moved further apart in FIG. 8(*b*) compared to FIG. 8(*a*), weakening the field. Field-weakening can, also be accomplished by applying any of the variant methods in Section A (e.g., changing the auxiliary air-gap Ag2_5_310 in FIG. 5).

2. Change in the position of the field relative to the rotor. In FIG. 9(*b*), the rotor R_9_300 is partially outside the field area, compared to FIG. 9(*a*), lessening the interaction between the field and the rotor. The required motion of R_9_300 is done by mechanical means well known in the state-of-art.

3. In general, a change in the "effective" strength of the interaction of the field and the rotor.

Figure 10A:
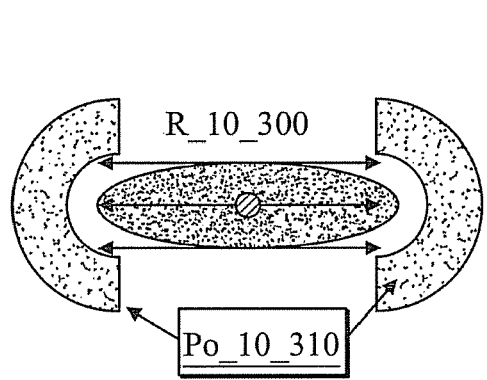
FIG. 10: Modified Motor with torque which changes within a single cycle, useful for timing control. (a) Rotor R_10_300 aligned with pole pieces P_10_310: Low airgap, High flux, High torque & speed (b) Rotor R_10_300 perpendicular to field: High airgap, Low flux, Low torque & speed (c) Cylindrical non-ferromagnetic rotor R_10_320, with effective magnetic field similar to (b), due to ferromagnetic insert F_10_400 at right angles to main flux path. This is a low Torque configuration. (d) Cylindrical non-ferromagnetic (with ferromagnetic insert F_10_410) rotor R_10_330, with asymmetric magnetic field, and variable speed/torque due to dissimilar pole pieces.
Figure 10B:
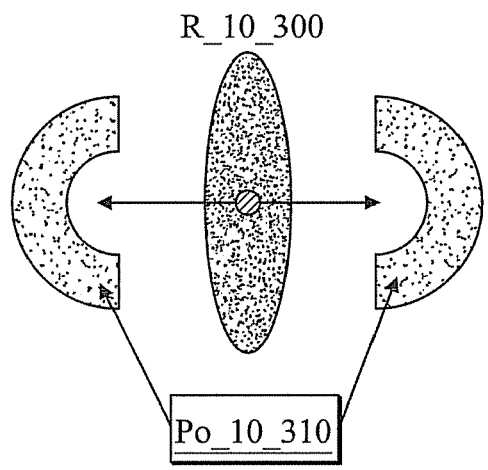
Figure 10C:
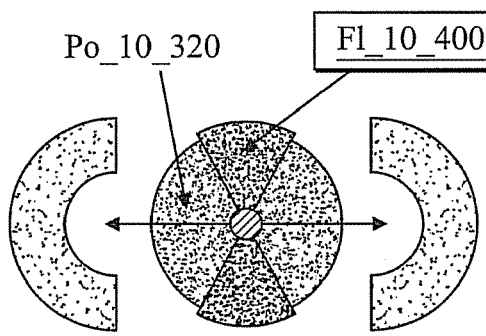
Figure 10D:
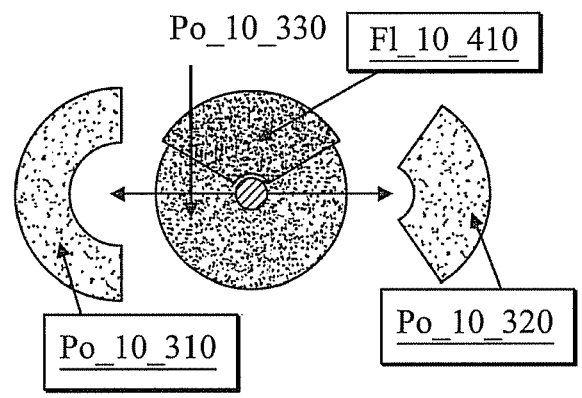

The motor-delivered power can be changed within a single cycle by making the flux and rotor geometry deliberately asymmetric. For example, the stator-rotor air-gap can be modulated within a single cycle by using a rotor that is an elliptical cylinder. In principle, any desired variation of torque with rotor angular position can be generate & FIG. 10 shows such a modified motor, with windings omitted for clarity, but assumed to be on the rotor (both the rotor and the stator are assumed to be ferromagnetic as per the state-of-art). The torque changes within a single cycle, which is useful for timing control. In FIG. 10(*a*), a high-torque configuration is shown, with the rotor R_10_300 aligned with its long ellipse axis parallel to the field generated by the pole pieces P_103_10 resulting in a low effective air-gap and high magnetic field. In FIG. 10(b), the torque is low, due to the rotor R_10_300 being aligned perpendicular to the field, resulting in a high air-gap and low field. In FIG. 10(c), the rotor R_10_320 is made cylindrical of non-ferromagnetic material, but has ferromagnetic inserts at right angles to the flux path, to offer a flux path similar to FIG. 10(b). In FIG. 10(d), a similar cylindrical non-ferromagnetic rotor with inserts R_10_330 is used, but with dissimilar pole pieces P_10_310 and P_10_320. This creates an asymmetric magnetic field and allows even more control of speed/torque. Torque/speed is high only when the ferromagnetic insert is close to the larger pole piece. Torque/speed is intermediate when the ferromagnetic insert is close to the smaller pole piece, and smallest when the inserts are perpendicular to the flux path. The positioning of these inserts can be made at the time of usage of the invention, enabling customizability of the torque with respect to angular position (similar to that depicted in the Load Control of FIG. 24). Additionally, mechanical counterweights, etc., can be provided to minimize the vibrations due to the asymmetric structures involved. The method clearly generalizes to electromagnetic actuators used in general mechanisms with non-cylindrical geometries (see Section E).

All this enables sophisticated variation of torque with respect to angular position and time, at far lower cost compared to microprocessors, sensors, and servos. The design of the magnetic circuit can be made based on well-known electromagnetic and electrodynamic computational methods, which can estimate flux/force/torque for a complex geometry, at certain angular positions, using possibly finite-element and/or boundary-element methods.

This issue is explored in greater detail in timing control using Load Control (Section D, which uses the methods of Section A, especially see FIGS. 20-24), as well as in Section E on general mechanisms.

C. Power Transmission Control

Electromagnetic force transmission is utilized in eddy-current and hysteresis clutches, well known in the state-of-art. n is also well known (see Section A) that the transmission of force using induction/hysteresis is dependent on the geometry, dimensions, "texture" (solidity/slottedness/perforatedness), and material properties of the flux-generating and induction/hysteresis members. Exploitation of this property enables us to control the transmission of force/torque between a driving and a driven apparatus, in any desirable fashion. This is illustrated by the example of a gear train, using induction force, whose "effective gear ratio" can be changed, but whose resultant speed-torque characteristics are not necessarily in inverse proportion.

In FIG. 11 (an axial cross-section view), a driving axle DGA_11_310 has one or more magnets M_1_100 (as per Section A) inducing force on an induction disk IM_11_200, on a driven axle DNA_11_320. Details of the magnets and their design are described below in the section on Load Control. Unlike mechanical gears, force is induced only if there is a "slip" between the driven axle and driving axle. The thickness (or other property modulating inductive force) of induction disk IM_11_200 is more at the center. Hence, as the magnets approach the center of the driven axle, the transmitted force increases and can be arranged to cancel out the reduction in lever arm partially, fully, or even more. Hence, modulating the thickness enables any desired speed-torque profile to be achieved, as "gear-ratio" is changed. In a variant, the two axes can be perpendicular (see FIG. 13). In another variant (FIG. 12), a contacting bearing, attached to driven axle DNA_12_320, minimizes the effect on the force/torque of random vibrations of the disk DM_12_300, as per the discussion in Section A.

This yields a new apparatus, a continuously adjustable electromagnetic gear train whose speed-torque transmission characteristic can be designed to suit, by modulating induction-member properties (the "effective conductivity" as per Section A), and derived new apparatus comprised of multiple electromagnetic gears forming a chain, whose speed-torque characteristics can be similarly designed to suit.

The transmitted torque can be made to vary in a single rotation cycle of either the driving axle DGA or driven axle DNA, by making the induction-member properties change as a function of angular position. Slower, possibly aperiodic variations of torque can be made using auxiliary mechanisms changing the flux, the position of the applied force relative to the axis, etc. (see the discussion of the electromagnetic CAM in FIG. 47(c). This issue is discussed in Power Control (FIG. 10) and in Load Control (Section D, which uses the methods of Section A).

Figures 13A, 13B:
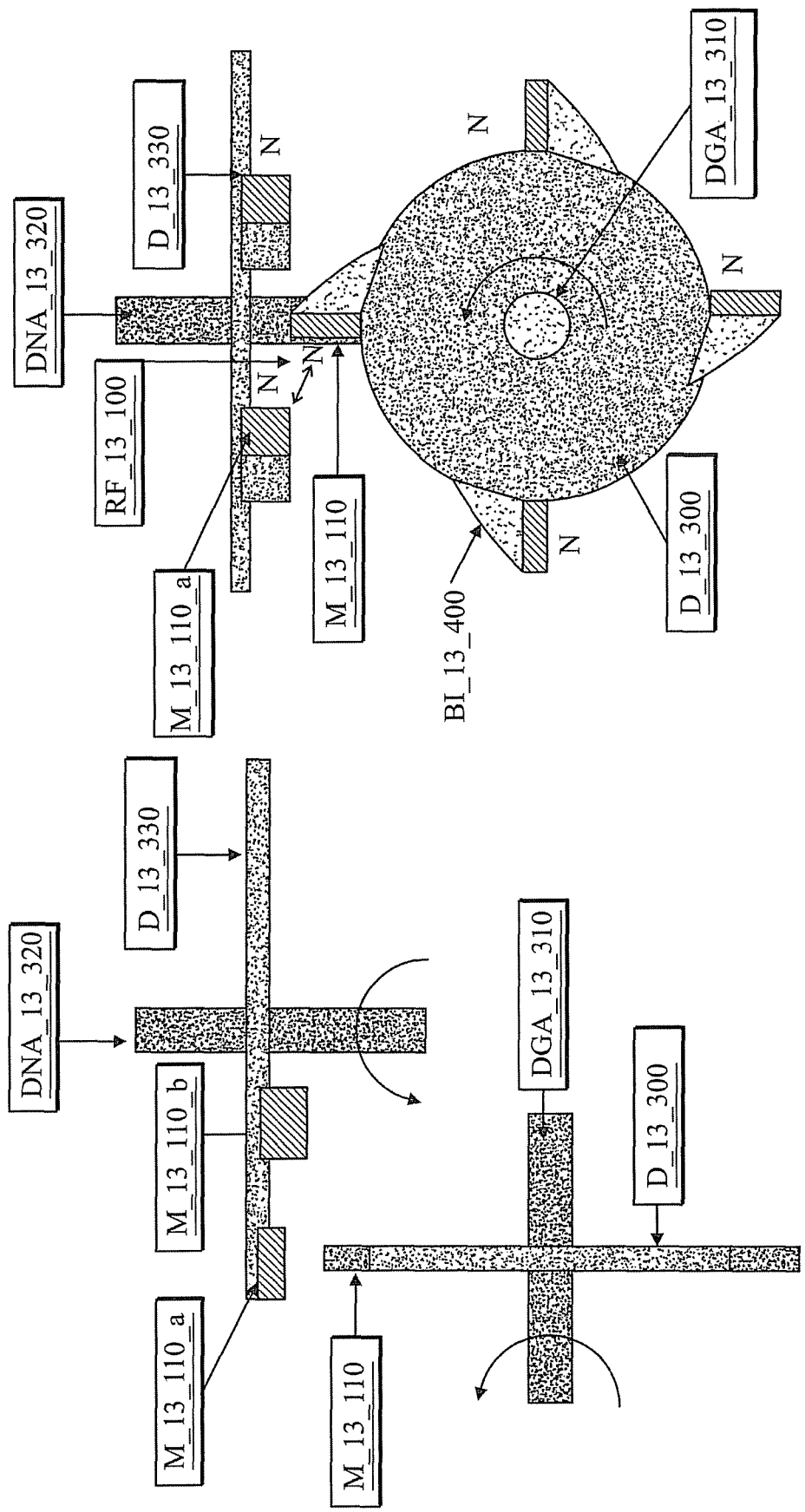
FIG. 13: Gear Train with customizable speed-torque characteristics, using magnetic force transmission due to autonomously magnetic members. Repulsive force between like (North) poles pushes driven axle forward (a) Side View (b) Front View looking on axle DGA_13_310 (Large Magnets M_13_110_b omitted from (b) for clarity).

FIG. 13 shows a variant, where the force transmitted is due to magnetic repulsion between like poles (N). Here, the driving axle DGA_13_310 is perpendicular to the driven axle DNA_13_320, DGA_13_310 rotates a set of magnets M_13_100 on disk DM_13_300, whose north poles face in the same angular direction (FIG. 13(b)), and whose south poles are enclosed by back-iron 131_13_400 as shown in FIG. 13(b). Similar magnets M_13_110_a and M_13_110_b (larger) and back iron are mounted in a manner to have north poles facing the magnets M_13_100, on a disk DM1_13_330 on driven axle DNA,_13_320. Magnet M_13_110_b is larger than magnet M_13_110_a. As DGA_13_310 rotates counter-clockwise (FIG. 13(b)), the repulsive force between magnets M_13_100 and M_13_110a causes DNA_13_320 to rotate. As "gear-ratio" is changed by bringing DM_13_300 inwards towards M_13_110_b, the maximum repulsive force increases, because M_13_110_b is larger than M_13_110_a. This increase can partly, completely, or more than completely cancel out the reduction in lever arm, as DM_13_300 is brought inwards. Any given speed-torque profile can be configured by appropriately designing the sizes and shapes of all the magnets. The direction of rotation can be reversed by having unlike poles face each other, thereby using magnetic attraction instead of repulsion. Force transmission is dissipationless in this variant.

This Power Transmission Control technique generalizes to general mechanisms, in which case, the transmission of motive force or torque can be made an arbitrary function of transmitted speed ratio, by suitable design of the intermediate force/torque transmission mechanism. The required electromagnetic force is generated by suitable design of the induction/hysteresis members and/or magnets/other flux-generating members. We note that such mechanisms have the property that the connection between the different members is not rigid and can accommodate unexpected disturbances, constraints outside its kinematic design, etc., in a fail-safe fashion.

D. Load Control (Powered and Unpowered Devices)

Load Control involves applying a controllable electromagnetic force/torque, possibly produced by magnetic attraction/magnetic repulsion/induction/hysteresis, to an apparatus, leading to change in apparatus speed/timing/force. The apparatus may be unpowered (e.g., powered by means other than a motor/IC engine, such as human power) or may have a prime mover.

In FIG. 14, we show an induction member shaped as a rotating conducting disk R_14_200 with a magnet M_14_100 positioned, with possibly some air-gap (not shown) near it. This induction member is attached to the apparatus to be driven, which is external to FIG. 14 and not shown. The apparatus is either unpowered or is rotated by a prime mover such as an electric motor, which is external to FIG. 14. As described in Section A, the magnet M_14_100 may be replaced by an arbitrary magnet assembly. M_14_100 may be used singly or in combination with a plurality of similar or dissimilar magnets, on just one side of the disk or on both sides, with flux possibly being connected by back-iron. When more than one magnet is used, the poles can be opposed to each other (north facing north) or complementary (north facing south).

The position of magnet or magnets M_14_100 with respect to the axis A can be varied, using some mechanism external to FIG. 14, with FIG. 14(a) being the closest and FIG. 14(d) being the farthest. By principle of magnetic induction, the induced eddy-currents are least in FIG. 14(a), since the relative velocity of the magnet with respect to the induction member is the smallest. As such, the induced forces are smallest in FIG. 14(a). The torque is relatively even smaller, due to the small distance of the small force from the axis. This leads to a high rotation speed. The magnet M_14_100 (or other flux-generating device) is successively moved radially outwards in FIGS. 14(b) and (c). This causes increased velocity between the magnet M_14_100 (or other flux-generating device) and the induction member, increased eddy-currents, and hence increased torque, resisting motion. This causes the apparatus to operate slower in FIG. 14(b), and slowest in FIG. 14(c). In FIG. 14(d), the magnet is partially outside the induction member, causing the apparatus to speed up due to reduced overlap of the field and the induction member. Hence, speed control is achieved by adding a controlled amount of inductive/hysteresis load, while the prime mover is possibly (but not necessarily) continuously producing a constant amount of torque. The motion is smooth, since at low speed the high-inductive load dominates any stick-slip that may be present, while stick-slip reduces, and inertial forces increase, at higher speeds. Based on the methods of flux control discussed in Section A, alternative embodiments of the invention are available, and sortie are described below.

FIG. 15 shows speed control by moving the position of the magnet or magnets M_15_100 axially away from the induction member R_15_200, reducing the flux, while maintaining the same radial position. This has the advantage that the distribution of eddy-current in the induction member R_15_200 is roughly invariant from FIG. 15(a), FIG. 15(b), and FIG. 15(c), potentially improving control linearity.

Figure 16:
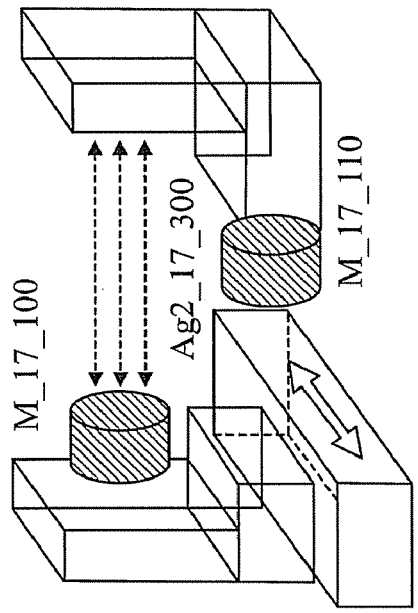
FIG. 16: Induction Disk showing multiple magnets, with flux return paths.
Figure 17B:
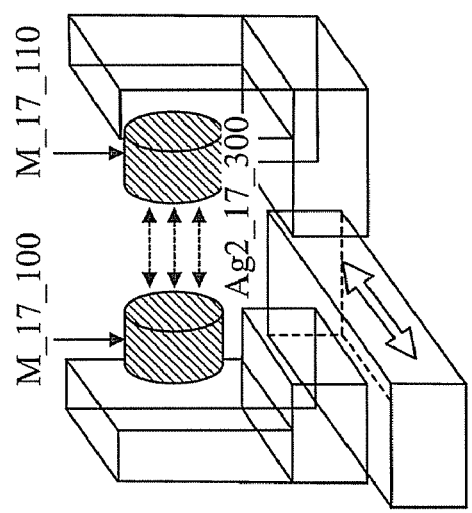
FIG. 17: (a) Magnets facing each other with controllable airgap (b) One magnet in reluctance circuit, but not in air-gap of induction disk. Induction disk not shown (see FIG. 16).
Figure 17A:
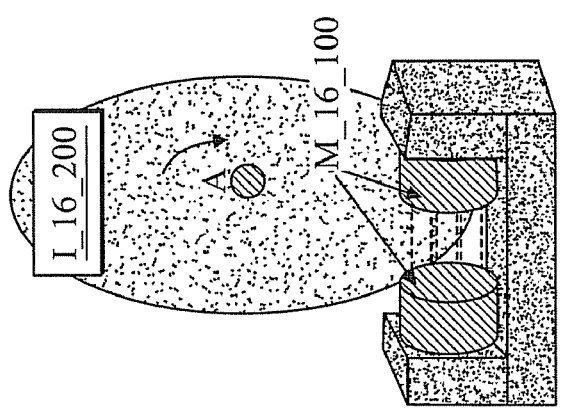

FIG. 16 shows a magnet assembly, with one or two magnets being used, together with ferromagnetic flux return paths, to form a partially closed magnetic circuit. The position of the assembly relative to the axis of the induction member can be varied, and/or the flux return-path reluctance can be varied by varying an auxiliary air-gap in the flux return path. This is further illustrated in FIG. 17, where an air-gap Ag2_17_300 is shown in the middle of the flux return path, whose dimensions can be altered by moving ferromagnetic insert P_17_310 as shown. The magnet(s) M_17_100 and M_17_110 can be on the faces of the flux return paths as in FIG. 17(a) or somewhere else in the flux path as in FIG. 17(b).

Figure 18:
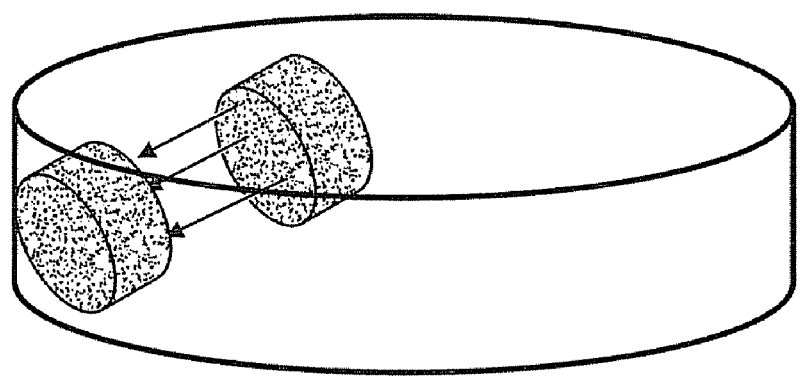
FIG. 18: Induction Drum with Magnets/Magnet Assemblies.
Figure 23:
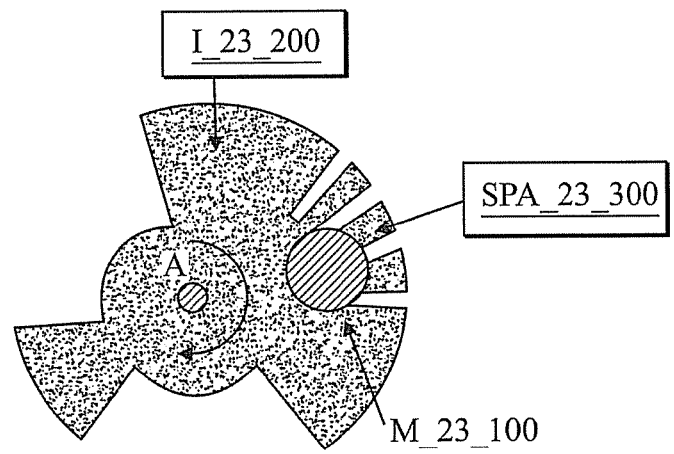
FIG. 23: Timing Control Induction Disk with Slotted/Perforated Area SPA_23_300. Braking Force/Torque intermediate between full cutout and solid area.

Many alternative geometries for the induction member are possible, e.g., an induction drum as shown in FIG. 18. Here, the magnets are positioned such that the field crosses the induction drum. Inductive force and hence torque can be varied by varying the air-gap, the overlap of the magnetic field with the induction drum, or similar means, exactly analogous to the description for the induction disk above.

In the exemplary illustrations, we have shown magnets at one position of the induction member, This creates an unbalanced force in general, which can cause the apparatus to move/shake, etc. This unbalance can be eliminated by placing several magnets, e.g., symmetrically at equal angular positions from each other, producing a zero net force, but nonzero torque.

In all these cases, the induction force depends on the relative position of the induction disk and the magnet or magnets used. As described in Section A[6], a contacting bearing (FIG. 7) can be used to reduce the impact of random disturbances, where the configuration of FIG. 15 is shown. This method can also be used with the configuration of FIG. 17, with an auxiliary air-gap Ag2_19_300 and similar modifications (FIG. 19). If, in the configuration in FIG. 19, the two magnets M_19_100 and M_19_110 have complementary poles facing each other (north of one magnet facing south of another), then the flux is roughly constant in the gap between the magnets. This reduces but does not eliminate the impact of axial vibrations on the induced force/torque. If the poles are opposed, however, then the flux impinging on the induction disk is greatly dependent on the position, and the contacting bearing helps keep this constant with respect to vibrations.

Our techniques work for induction members and magnets of any geometry that has an overlap of the magnetic field with the induction member. While the discussion has been in terms of fixed magnets and moving induction members, the invention applies equally to moving magnets and fixed induction members, and similarly to cases where both move. The invention applies equally to the use of hysteresis members and to the use of multiple, autonomously magnetic interacting members (with the modifications outlined in Section A[4], A[5]), either singly or in conjunction with the other techniques.

[1] Load Control: Embodiments Performing Timing Control by Changing Speed in One Cycle The discussion so far has centered on controlling uniform motion of rotating apparatus, by controlling the relative position of one or more magnets (permanent or electromagnets) and/or one or more induction/hysteresis-embers. This section extends the scope of the invention to control non-uniform motion, allowing sophisticated timing to be generated, at far lower cost compared to microprocessor-controlled servos. In all the discussion, the same apparatus referred to in FIGS. 14 through 19 is considered, but with modified means of motion control.

In FIG. 20, a disk R_20_200 with one sector which has been cutout is used as the induction member. Henceforth, we shall use the term "cutout" to both denote the action of removing material, as well as the portion of the disk where material has been removed. A nonconductive material may or may not be added in the cutout portion, based on a variety of considerations (not shown). As such, the inductive force/torque produced is now angular-position-dependent and is maximum when the magnet M_20_100 (or magnets M_20_100 in any of the configurations as per Section A) is over the conducting/non-cutout sectors of the induction member (FIG. 20(a)). This inductive force/torque is lower when the magnet is at the periphery of the induction member cutout sector (FIG. 20(b)), and close-to-zero when the magnet M is over the cutout/nonconductive portion (FIG. 20(c)). This varies the speed within a single rotation, with maximum speed with the magnet over the cutout portion and minimum speed with the magnet over the conducting portion, allowing sophisticated timing control. Note that this control can be used singly or in conjunction with moving the radial position of the magnet, changing the air-gap, etc., as outlined previously (Section D). When used in such a manner, the speed variation has a component corresponding to variation within each cycle due to the cutout and a general possibly aperiodic variation due to the other control exerted (see the discussion of the CAM in FIG. 47).

Multiple cutouts can also be used, resulting in multiple locations of high speed, as shown in FIG. 21, where three cutouts are shown.

As discussed in Section A, the structures illustrated in FIG. 20 and FIG. 21 have a magnet assembly only in one position, possibly generating a net shaking force to the apparatus. The net force can be eliminated by using symmetric induction members and multiple magnet assemblies equally angularly spaced. If K (equally angularly spaced magnet assemblies are used, the cutout structure determining the timing is replicated K-times over the circumference of the disk. For example, FIG. 22 shows a symmetric version, R_22_200 of FIG. 21 with six cutouts instead of three, each half as big in angular extent as those of FIG. 21, along with two magnets spaced half a revolution apart, M_22_100 and M_22_110. We can repeatedly slot/perforate the disk to partially but not completely lower the induction force/torque, as shown in the slotted/perforated area SPA_23_300 in FIG. 23, As long as the slot/hole pitch is small, the high-order harmonics of the force/torque are filtered out by the inertia of the apparatus, allowing us to vary the induction force/torque in a continuous fashion, exactly analogous to pulse-width modulation systems.

In general, all the methods of controlling force/torque in Section A can be used. These include:

1. Changing the induction member (disk) thickness, with maximum thickness at those positions where more force (minimum speed) is desired.

2. Using higher-conductivity material at positions where more inductive force is desired (e.g., a copper sector in an aluminum disk, etc.).

3. Using an induction member with varying degrees of material thickness slottedness, perforatedness, etc., or any means that effectively modulate conductivity.

4. Using induction members of different geometry, e.g., induction drums, and members of other geometry well known in the state-of-art. The induction-member geometry can change in different positions, e.g., a disk having a raised cylindrical flange, which occupies only part of the disk circumference.

5. The same applied to the magnets, whose geometry, dimensions, material, number, etc., can be analogously chosen to suit and can be dynamically varied during an operation cycle. For example, the disk with cutouts R_23_200 in FIG. 23 can be a (large) magnet, and the magnet M 23 100 becomes a small induction disk instead.

6. Dynamically changing the magnetic field by changing the field path in any mariner, including changing the flux return path, the distance of magnet (or magnets) from induction disk, etc.

7. Dynamically changing the shape of the magnets themselves to selectively engage induction members.

8. Using multiple magnets and induction members, possibly of different geometry, dimensions, and material properties, e.g., conductivity. For example, two disks can be used with a magnet for each (possibly at different positions). The resultant force/torque is the sum of the individual force/torques, and offers additional flexibility in the timing/force profile.

9. The air-gap between the magnets and the induction/hysteresis disk can be changed to change speed at all positions simultaneously (flux control, Section A).

10. All of the above using induction effects, hysteresis effects, and/or multiple autonomously magnetic interacting members, solely or in combination. In the case of the last two, the emergence of preferred rest positions of the apparatus enables the apparatus to offer functionality not previously present (Section A[4], and A[5]).

The functionality of timing control is present in all these variants, and these variants are therefore within the scope of this invention. While the description discusses one or a few variants, extension of the invention to include all the variants is implied. Additionally, the resultant timed motion can be put to several uses, for example, playing musical tones, passive anti-lock braking systems (due to the pulsating forces induced in a slotted induction member), etc. The scope of the invention includes all such variants.

The period of rotation or reciprocation of an interaction (induction/hysteresis) member may be different from the period of motion of the apparatus, with auxiliary mechanism being used to initiate changes in electromagnetic interaction intensity based on the current position of the apparatus in its period. An example is a turntable driven by an electric motor through a gearing mechanism. The current position of the turntable platform can (through an auxiliary mechanism) change the position of a magnet relative to an induction member mounted on the motor shaft. This changes the induction/hysteresis/magnetic forces with a relatively long period, while retaining the high forces/torques due to the high speed of the motor shaft.

[2] Load Control: Embodiments where Timing can be Changed During Use

The invention can be further enhanced to provide user customizability by making the induction member properties changeable at the of use. These properties include but are not limited to changing the geometry of the device, its effective dimensions, effective conductivity, magnetic reluctance path, etc. In all the discussion, the same apparatus referred to in FIGS. 14-23 is considered, but with modified means of motion control.

One embodiment of this invention is shown in FIG. 24. Instead of a solid disk, we show a frame FR_24_310 with slots SL_24_300 for induction members IM_24_200, IM_24_210 of various types. Magnets M_24_100 and M_24_110 (or a general assembly M_24_100, as discussed in Sections A and D) are positioned above and below the frame FR_24_310. The magnets M_24_100 and M_24_110 can be in other suitable positions so as to create a magnetic field interacting with the frame FR_24_310. The design of the slots can be of various types well known in the state-of-art, and the slots can be fully enclosing, partially enclosing, or any other kind of attachment. The slots can also be non-conducting, partially conducting, or fully conducting themselves. At the time of usage of the apparatus, the user can selectively insert induction members of various types as discussed in Section A. This introduces user programmability into the timing control, with lower speed at the places where the induction members are inserted and higher speed where they are not This extension of the invention admits of the following variants:

1. Each type of induction member I_24_200/IM_24_210 attached to a slot in the frame applies a certain force/torque to the rotating induction disk, when the magnet/magnets M_24_100/M_24_110 is positioned over it, resulting in a specific speed. The number of these slots, frames, and attached induction members IM24_200/IM_24_210 can be varied, all the way from a single (small or large) frame with one slot for an insertable induction member, to multiple frames, each with multiple slots for induction members. The sizes and thickness of the slots and corresponding induction members IM can be varied. Multiple induction members can be inserted into one slot, for even more control. In general, all the variants of induction members described in Section A can be used.

2. Instead of a frame shaped like a disk, a frame shaped as an induction drum (or other geometry) can be used, following the discussion in FIG. 18, with an appropriate arrangement of slots for inserting induction members.

3. Instead of an induction disk/drum, a hysteresis disk/drum can be used. In general, any user-changeable geometric structure (e.g., a cone whose angle can be varied) with overlap between magnetic fields produced by one or more magnets and/or one or more induction/hysteresis members, causing electromagnetic force/torque, can be used (refer the discussion in Sections A, A[4], and A[5]).

In closing, we mention two preferred embodiments of motors, where Power Control, Power Transmission Control, and Load Control are used together:

1. An induction/hysteresis member, together with magnet M (magnets M) for Power Transmission Control and/or Load Control can be separately attached to the motor axle.

2. The induction/hysteresis member together with magnet M (magnets M) of Power Transmission Control and/or Load Control can be co-located with the rotor windings/rotor magnets of the motor, and both the powering field and the inductive/hysteresis forces varied together.

E. Embodiments of the Invention Forming General Mechanisms Able to Control Linear, Angular, and/or Possibly Multi-Degree of Freedom Motion Power Control, Power Transmission Control, and Load Control can be generalized to general mechanisms, such as 4-bar, Geneva, etc. possibly including angular displacements, multiple degrees of freedom, e.g., 3-axis translation+3-axis rotation, etc. Our definition of a general mechanism includes apparatus whose parts may be partly or completely unconstrained (e.g., the carom board of FIG. 58) with respect to each other.

(a) Power Control; This refers to control at the source of the power. In motors, the magnetic flux path geometry or properties of the induction/hysteresis interaction members are physically changed, achieving modulation of the magnetic field and/or inducted currents and/or forces/torques inside the machine. In general mechanisms, additionally, multiple powering sources (rotary or linear motors) are present, which are controlled in a co-operative manner to achieve desired motion. The state-of-art in field control, typically changes the current exciting a field coil. The state-of-art of modulation of permanent-magnet field has not been applied to a low-cost electric motor for controlling speed. One key idea here is varying the design parameters of the machine to achieve motion control, and can be applied to all kinds of prime movers. For example, an IC petrol engine can be controlled by varying the length of the stroke, using an appropriate mechanism.

(b) Power Transmission Control: This refers to control in the power transmission chain. In rotating systems, the electromagnetic force transmission is controlled by varying the magnetic flux path and/or induction/hysteresis member geometry, and is a generalization of electromagnetic clutches. In general mechanisms, additionally, force/torque can be transmitted through multiple portions of the mechanism, and the mechanism is designed to make these multiple transmitted force/torques to be complementary.

(c) Load Control: The force produced by the interaction between one or more magnets and/or induction members and/or hysteresis members of suitable properties (Section A) can be exerted at various states (positions) in the mechanism, using possibly multiple magnets and/or multiple induction/hysteresis mechanism of suitable properties (Section A) and suitably located. This will lead to the mechanism load and hence speed being modulated at these selected states, allowing arbitrary timing to be generated, even with the application of a constant driving force or torque (for simplicity, this is not necessary) to the whole mechanism. Note that the interaction between two magnets is a dissipationless force. Energy is stored in the magnetic field in unstable states of the mechanism and returned when the mechanism moves to stable rest states.

The combination of power control, power transmission control, and load control enables new methods of designing mechanisms to satisfy desired path, timing, and loading characteristics. The design of the mechanism can be based on kinematic principles primarily, with the mechanism paths (for the constrained portions) being used to develop the constraint surfaces. (Dynamic issues like force/moment balancing have also to be addressed, but can be substantially decoupled from the timing of the mechanism, simplifying design.) Timing along the mechanism paths, as well as force exerted by the mechanism on the prime mover or to the external environment in general, can be changed as desired at low cost using magnetic and/or inductive/hysteresis force/torque applied and/or coupled at various positions, possibly in a programmable fashion. When multiple magnets are used to generate force/torque, the presence of rest states enables energy storage at arbitrary states of the mechanism and energy return at other states in a dissipationless manlier to control timing. Energy from external prime movers can be stored at those states of the mechanism wherein the force/torque is best absorbed by the mechanism. These states can be determined from design of the mechanism, e.g., based on the position function p(x(t)) described below, etc. Stored energy is used to continue to drive the mechanism at states wherein the force/torque is either not generated from the prime mover or not absorbed by the mechanism (e.g., see the internal combustion engine of FIG. 36). The use of induction/hysteresis members enables damping forces with a customizable velocity-force profile to be applied as desired.

In general, let x(t) represent the desired time trajectory (with multiple components representing all possible linear and angular degrees of freedom) of an arbitrary point on some link/part (member) of the mechanism. For example, in a reciprocating mechanism, x(t) can be a point on a reciprocating shaft RS of mass M. Newton's law applied to the member (RS) results in Equation (1) as follows:

$$x''(t) = f(x(t))M \quad (1)$$

where $f(x(t))$ is the net force exerted on the member by the prime mover (we initially assume a single prime mover for simplicity) through other portions of the mechanism and the electromagnetic load (possibly due to magnetic attraction/repulsion and/or induction or hysteresis) at position x(t). In the case of rotation, we have torque instead of force and moment of inertia instead of mass in the above equations.

We reiterate that $f(x(t))$, the net force (or torque for rotational members) on the member exerted through the mechanism, depends on the position function $p(x(t))$ and the presence of force elements including masses acting under gravitational forces, springs, electromagnetic forces due to magnets, hysteresis/induction loads, etc. These forces can themselves be multiplied by ratios of lever arms and/or gears present in the mechanism. The forces can also be modulated by the angle of contact of various constraint surfaces (which generate reaction forces to impose the constraints), etc.

Let us assume that Power Control, Power Transmission Control, and Load Control are all present. If; using Power Control, fp(x(t)) is the force generated by the prime mover, ft((x(t)) is the percentage of force transmitted through the mechanism using Power Transmission Control, including any magnetic/induction/hysteresis coupling present, and fl(x(t)) is the force due to Load Control, including any frictional losses and electromagnetic load (possibly magnetic, induction, and/or hysteresis), we get Equation (2) as follows;

$$f(x(t))=fp(x(t))*ft(x(t))-fl(x(t))=Mx''(t). \qquad (2)$$

Note that, with the use of hysteresis and/or autonomously magnetic members, fl(x(t)) can be negative due to energy stored in the mechanism in state x(t)—see the discussion on rest states below. For a desired time trajectory x(t), we can find fp(x(t), ft(x(t)), and fl(x(t)) to satisfy Equation (2), provided certain regularity conditions like energy conservation are satisfied. There are clearly multiple ways this can be done.

(a) Load Control Only: Here fp(x(t)) and fi(x(f)) are constant or not controllable for unpowered devices. Then, the amount of force required to be exerted due to Load Control is given by Equation (3) as follows:

$$fl(x(t))=fp(x(t))*ft(x(t))-Mx''(t)-ff(x(t))=[\text{could not find correct symbol}]fp(x(t))*ft(x(t))-Mx''(t), \qquad (3)$$

where ff(x(t)) is the frictional force, assumed be small due to the use of bearings, etc. This force can be used to determine induction/hysteresis member geometry and/or the strengths of the magnets used, etc. One major advantage of Load Control is the lack of any stick-slip at low speeds, since both the load and force applied are much higher than the static/dynamic friction. Control using inductive/hysteresis members (not that depending on magnetic attraction/repulsion) is dissipative.

(b) Power Control Only: We have Equation (4) as follows:

$$fp(x(t))=(Mx''(t)+fl(x(t)))/ft(x(t)) \qquad (4)$$

Appropriate power control can enhance mechanism energy efficiency.

(c) Power Transmission Control Only: We have Equation (5) as follows:

$$ft(x(t))=(Mx''(t)+fl(x(t)))/fp(x(t)) \qquad (5)$$

If the structures used to implement power transmission control are similar to clutches, this has the advantage that maximum force transmittable is limited, enhancing safety.

(d) Any two or all three taken together.

The presence of rest states with both multiple autonomously magnetic interacting members and hysteresis members is equivalent to energy minima being present. The presence of these energy minima (and complementary maxima) provides additional degrees of freedom for motion control, by making available releasable stored energy or equivalently negative loads in the mechanism.

Once fp(x(t)), fl(x(t)), and fl(x(t)) have been determined, electromagnetic parameters of the Power Control, Power Transmission Control, and Load Control apparatus can be determined using standard techniques of electromagnetics and dynamics.

By suitably designing Power Control, Power Transmission Control, and Load Control, any desired time trajectory can be designed. For example, if x(t) is oscillatory without control, then an appropriate combination of controls can convert a purely sinusoidal x(t) to one having a large number of harmonics, which is very useful in many kinds of applications, e.g., vibration benches for stress-testing equipment.

$$x(t)=A\cos(\omega t)=>x(t)=\Sigma[A_1\cos(\omega t)+B_j\sin(\omega_j t)]. \qquad (6)$$

An appropriate choice of controls using magnetic and/or induction/hysteresis force changing continuously with position, can generate a broad spectrum of motion, with a close-to-continuous spectrum X.(ω).

$$x(t)=A\cos(\omega t)=>x(t)=\int X(\omega)e^{(-j\omega)}d\omega \qquad (7)$$

In both these cases, the controls can also be applied in reverse, converting motion/force/torque from a multi-frequency (possibly continuous spectrum) exciting source to a motion/force/torque having a single frequency (possibly zero). This can be exemplarily applied to smooth out fluctuations from prime movers, e.g., the pulsating gas force from an internal combustion engine can be converted to a close-to-constant external force, utilizing electromagnetic attraction/repulsion and/or induction/hysteresis forces, and without necessarily using a heavy flywheel, e.g., as in Equation (8) as follows:

$$x(t)=\Sigma[A_1\cos(\omega_i t)+B_i\sin(\omega_j t)]=>x(t)=A\cos(\omega t) \qquad (8)$$

So far, the discussion has treated a single prime mover and a single load. The generalization to multiple prime movers and multiple loads is straightforward, as in Equation (9) as follows:

$$f(x(t))=\Sigma fp_i(x(t))*fti(x(t))-fli(x(t))=Mx''(t), \qquad (9)$$

where the $i^{th}$ prime mover generates force $fp_i(x(t))$, which is transmitted at the rate of $ft_i(x(t))$ to the member of interest and an portion of the total load $fl_i(x(t))$ is "assigned" to this prime mover. Note that other forces like inertia/gravitational forces due to other masses, springs, etc., are assumed to be incorporated in one or more $.fp_i(x(t))$'s, where details are omitted for simplicity. We only note that, at different positions, different prime movers can be powered, for example, only those for which the force transmission ratio is high. This can help prevent excessive internal reaction forces in the mechanism. See the Power Control discussion of the three-link mechanism of FIG. 30 for more details.

Rest states of the apparatus (if hysteresis and/or multiple autonomously magnetic interacting members are used) can be determined by (1) determining the electromagnetic energy as a function of mechanism position and (2) finding the minima. Dynamics between states can be determined by solving the mechanism dynamic equations, accounting for any electromagnetic forces present. To synthesize an apparatus having given rest states, nonlinear optimization techniques can be used to determine the positioning of hysteresis members and/or multiple autonomously magnetic interacting members (magnets).

The description below is quite general and covers many different embodiments of the present invention. An embodiment of PC, PTC, and LC for a general mechanism is described and is followed by several major illustrative examples.

Motion Control of General Mechanisms: Structure of an Embodiment

From one point of view, our work can be regarded as generalizations of both electric machines and general mechanisms to yield a new class of devices hereafter called electrical mechanisms. We further elucidate these ideas below.

Mechanisms are described in the state-of-art as composed of rigid links and connections between them (joints or pairing elements—higher or lower pairs). Mechanisms composed only of lower pairs are known as linkages (planar or spatial).

The invention applies to mechanisms having tower and/or higher pairs. All the forms of the invention—e.g., Power Control, Power Transmission Control, and Load Control—can be applied to general mechanisms. We shall first describe enhancement of the mechanism's constituents in their unpowered state (Load Control), and then discuss enhancements of traditional arrangements to Power Control and Power Transmission Control.

Generalization of Load Control

The invention adds to rigid links, members either generating or interacting with magnetic flux (magnets and/or induction members and/or hysteresis members as per Section A). These members may be fixed at time of manufacture or can be removably attached at the time of usage of the apparatus, similar to the programmable timing control disc with slots of FIG. 24. In certain preferred embodiments, the aforesaid members can be positioned close to a joint J on a link 1 and interact with other members positioned close to the same joint J on another rigid link to which link 1 is joined at joint J. In such cases, we use the terminology that joint J has been enhanced by the addition of the aforesaid members. When the mechanism is assembled, the mutual interaction of the aforesaid members determines rest positions and dynamics. There can be multiple rest positions, yielding monostables, bistables, as well as multi-valued mechanical logic. Such mechanisms can be cascaded together to form logic functions, analogous to electronics.

Enhancement of Rigid Links

Figure 25:
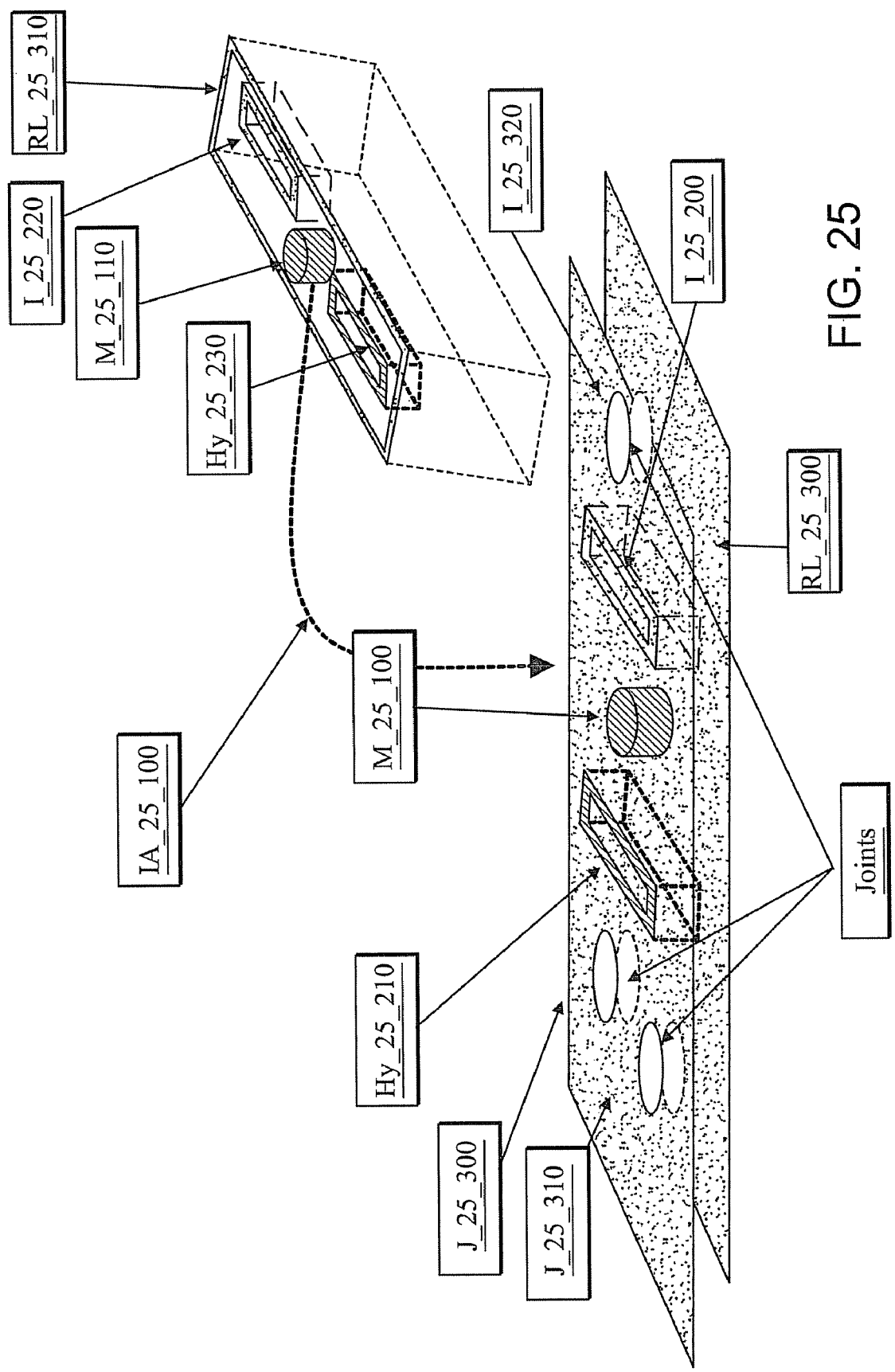
FIG. 25: Rigid link R_25_300 is enhanced by magnetic and/or induction and/or hysteresis members and has electromagnetic interaction with another similar but not necessarily identical rigid link R_25_310. Rigid link R_25_300 is connected by three revolute joints to other links. Rigid Link R25_310 is connected to R_25_300 at revolute joint J_25_320 on R_25_300 (all details in R_25_310 are not shown). Electromagnetic force results from interaction between R_25_300 and R_25_310.

The invention attaches magnets and/or induction members and/or hysteresis members as per Section A to some or all of the rigid links. FIG. 25 shows an exemplary embodiment for a rigid link R_25_300 with three revolute joints, one of which is J_25_320. J_25_320 is attached to another rigid link R_25_310. Link R_25_300 is enhanced with one magnet assembly M_25_100 in the middle, and on M_25_100's left (per FIG. 25) by a hysteresis member H_25_210 and on M_25_100's right by an induction member I_2_200. The electromagnetic interaction between rigid links R_25_300 and similar but not necessarily identical link R_25_310 will partly determine mechanism rest positions (statics) and dynamics. R_25_310 has a magnet assembly M_25_110, a hysteresis member assembly H_25_230, and an induction member assembly I_25_220. Depending on the orientation of the poles of M_25_100 and M_25_110, R_25_300 and R_25_310 will attract/repel each other, and speed of motion will be determined by aforesaid attractive/repulsive forces, together with the inductive/hysteresis forces generated on R_25_300 and R_25_310 by the magnet/magnets M_25_100/M_25_110. Note that the number per link, shapes, sizes, positions, and magnetic properties (strength, spatial distribution of field, etc.) of the magnet assemblies and induction/hysteresis members may differ from that shown in FIG. 25.

Enhancement of Joints (Pairs/Pins)

Figure 26:
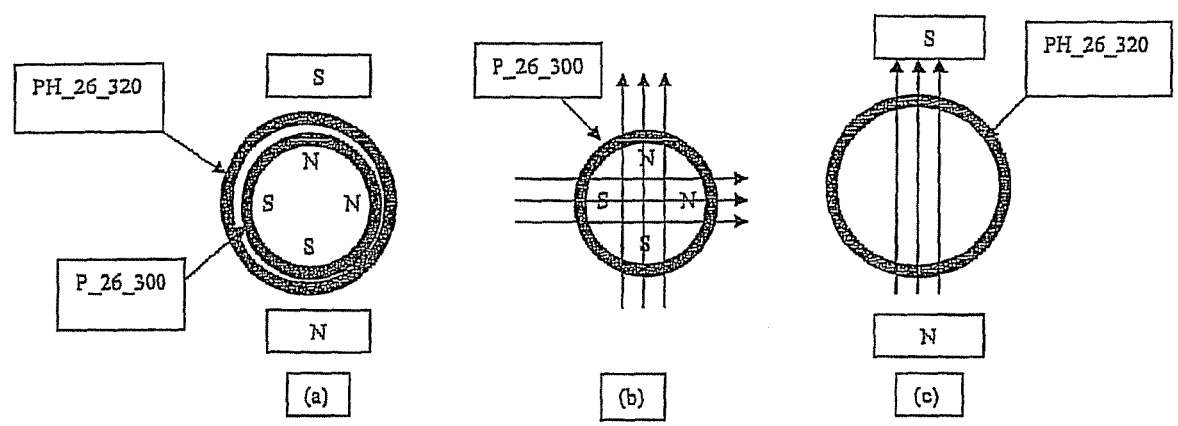
FIG. 26: Exemplary Revolute Joint enhanced by the invention. (a) Pin and Housing together Pin P_26_300 is attached to Link 1_26_310 (not shown). Pin Housing PH_26_320 is attached to Link 2_26_330 (not shown). (b) Magnetization of exemplarily hollow pin P_26_300 (c) Magnetization of Housing PH_26_320. In general poles need not be equally spaced, and pin and housings need not be concentric in general.
Figure 27A:
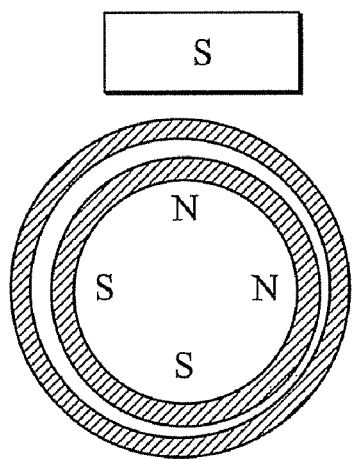
FIG. 27; Two stable (a), (b) and two unstable (c), (d) positions of magnetic pin P_26_300 and pin housing PH_26_320, offset by one quarter revolution each.
Figure 27B:
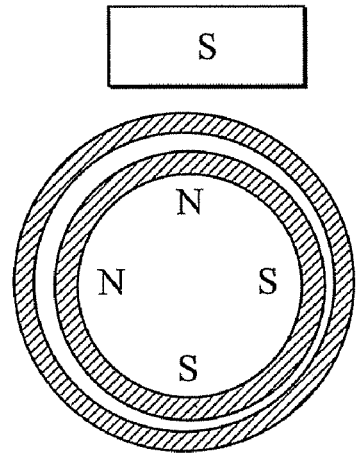
Figure 27C:
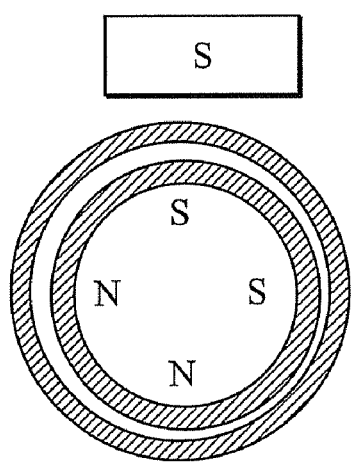
Figure 27D:
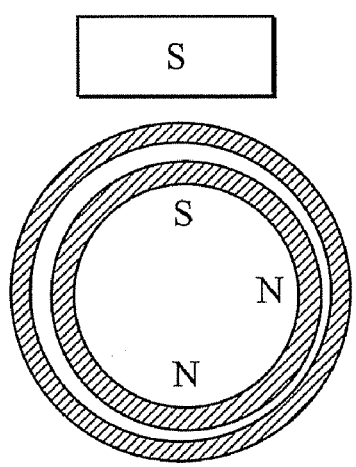

As mentioned above, in certain embodiments, the magnets/hysteresis members/induction members on one link are close to those on another link to which it is joined, in which case, we say that the joint is enhanced. The invention allows enhancement of some or all the standard joints used in mechanisms with electromagnetic forces—due to attraction/repulsion and/or induction and/or hysteresis. Exemplary embodiments are shown for each one of the joints below:

(1) Revolute Pair: A preferred embodiment makes the revolute joint pins and their housing magnetic (FIG. 26). The air-gap between the pin and the housing may or may not change as the pin rotates relative to its housing during motion of the mechanism. The magnets may be attached to circular disks attached to the pin and the housing to obtain more torque due to the larger radius. In general, one or more induction members, hysteresis members, multiple autonomously magnetic interacting members, magnet/induction/hysteresis members of different geometry, etc., can be attached to the pin and/or its housing as per Section A.

FIG. 26(*a*) shows a (hollow) pin P_26_300 connected to a first link link1_26_310 (not shown), rotating in a housing PH_26_320 connected to another link link2_26_330 (also not shown). Note that a ball/roller bearing may be present between P_26_300 and PH_26_320. The pin P_26_300 is magnetized as shown in FIG. 26(*b*) with two north and two south poles, while the housing PH_26_320 has a single north and a single south pole as shown in FIG. 26(*c*). These poles need not be equally spaced in angle, may be of unequal strength, can generate a general magnetic flux distribution, and can be more in number than as shown. This magnetization may be realized by (1) attaching magnetic material to the pins themselves, (2) making the pin of hard magnetic material and magnetizing it, or (3) other means well known in the art. Additionally, there may be (a) an auxiliary sleeve of non-magnetic material enclosing pin P_26_300 to prevent it from sticking to the housing due to magnetic attraction or (b) other means (e.g., the aforesaid bearing) of preventing excessively close physical contact between the magnets on pin P_26_300 and those on pin housing PH_26_320.

The operation of such an enhanced joint is described as follows, FIGS. 27(*a*) and (*b*) show the pin and its housing in two stable states, where the north pole of the housing impinges on a south pole of the pin, and FIGS. 27(*c*) and (*d*) show two unstable states, where the north pole of the housing is close to a north pole of the pin. All these states are offset by one-quarter revolution in this embodiment (in general, the stable/unstable states may be unequally spaced). Hence, in the mechanism, link1_26_310 and link2_x_330 would tend to occupy those relative positions resulting in P_26_300 and PH_26_320 occupying either the positions of FIG. 27(*a*) or (*b*). The exact positions occupied will typically depend on other portions of the mechanism.

Figure 28:
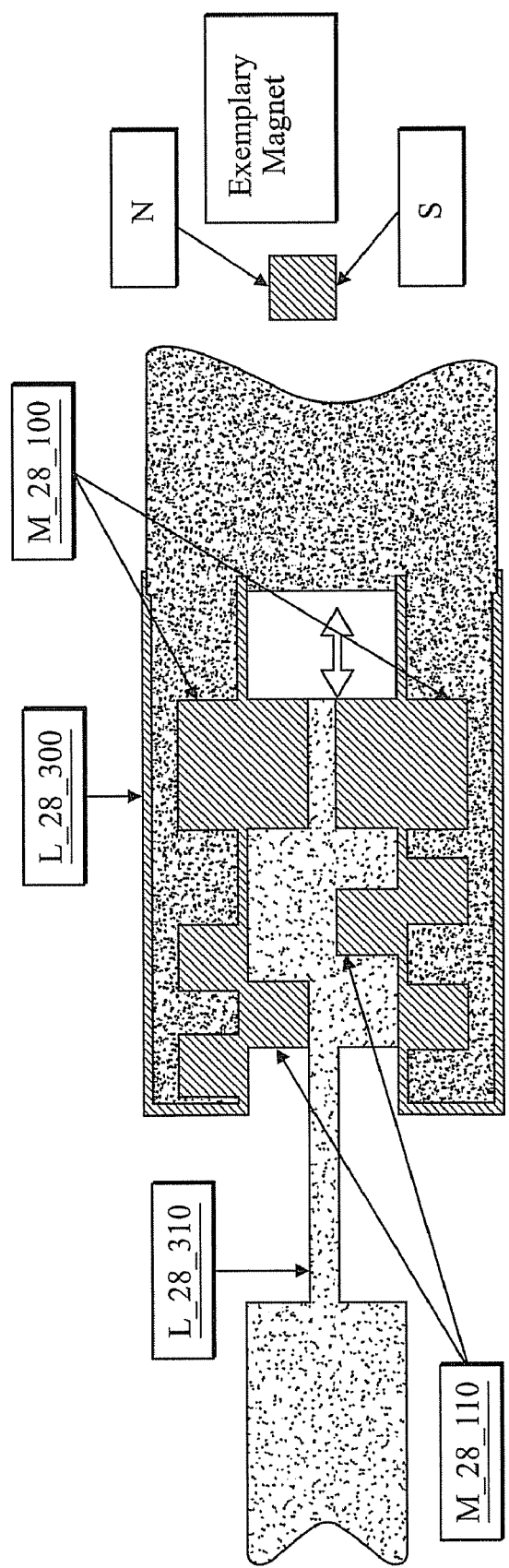
FIG. 28: Prismatic pair with magnetic interaction. Induction and/or hysteresis members can optionally be used on either Link1_28_300 and/or Link2_28_310. The spacing between magnets and/or induction and/or hysteresis members need not be uniform. The electromagnetic energy at any of the maxima/minima need not be the same. An exemplary embodiment of these ideas is the Extendible Tether of FIG. 59.

(2) Prismatic Pair: An exemplary, prismatic pair (sliding joint) with magnetic interaction between first link Link1_28_300 and second link Link2_28_310 is shown in FIG. 28. A set of magnets (or assemblies as per Section A) M_28_100 on Link1_28_300 interacts with another set of magnets M_28_110 on Link2_28_310 creating electromagnetic maxima and minima (rest states). The number of magnets/assemblies on M_28_100 and M_28_110 need not be the same, and these assemblies need not be equally spaced, any may occupy one or both sides of the sliding joint. All energy maxima or rest states need not be equally spaced or have the same energy.

Induction and/or hysteresis members can be added to this pair, modulating the dynamics between any two states. Reciprocating motion of frequency less than a bandwidth, B depending on the strength of the induction/hysteresis, will be transmitted between Link1_28_300 and Link2_28_310. B, the 3 dB bandwidth of motion transmission, can be calculated by well-known techniques of electromagnetics and dynamics. An exemplary embodiment of these ideas is the Extendible Tether of FIG. 59.

Screw Pairs, Cylindrical Pairs, Spherical Pairs, Planar Pairs, Higher Pairs

The invention similarly enhances these pairs with magnets and/or induction and/or hysteresis members.

Figure 29:
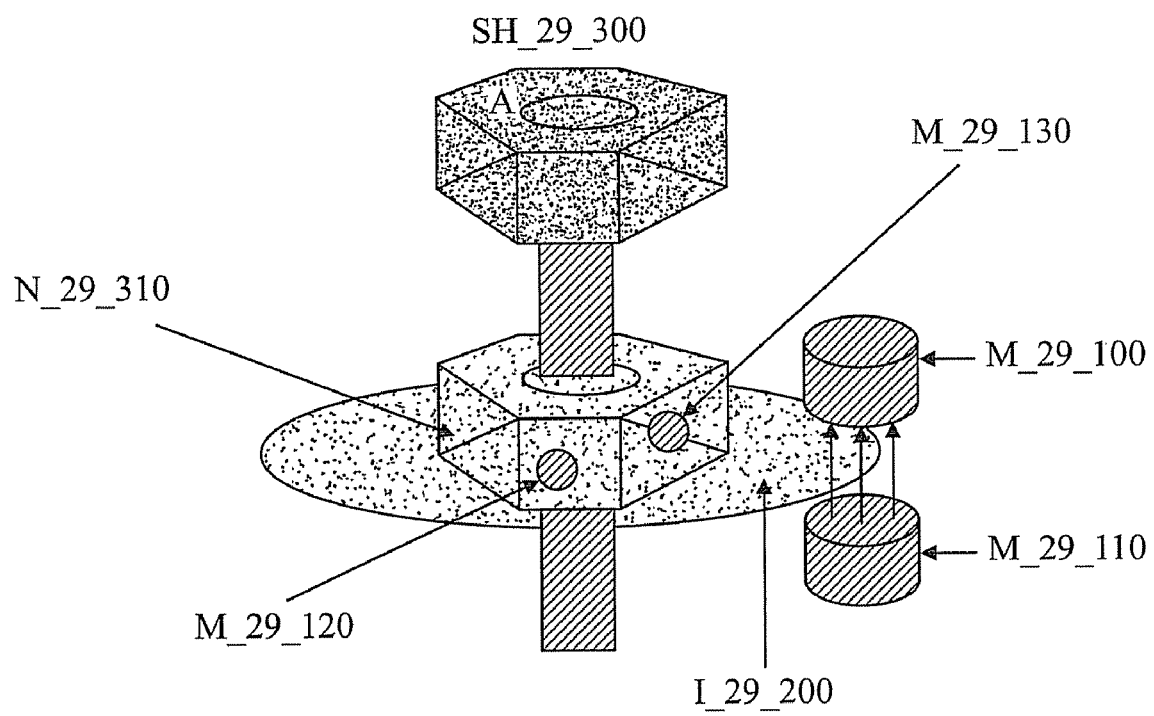
FIG. 29: Screw pair with controllable rest positions and possibly non-uniform damping torque. M_29_100, M_29_110 are attached to SH_29_300 by means not shown.

(a) Screw Pair: The exemplary screw mechanism in FIG. 29, converting rotary motion into translational motion and vice versa (in some cases), can exhibit (1) rest states, possibly non-uniformly spaced, either in angle or linear position along the screw and (2) arbitrary customizable dynamics between one state and another through the use of one or more magnets and/or induction and/or hysteresis members attached to either or both of the screw or the nut follower. Specifically, the rest states of nut N_29_310 are determined by the interaction of magnets M_29_100, M_29_110 (attached to screw SH_29_300), and M_29_120, M_29_130 (attached to nut N_9_310 by means not shown), and dynamics between these states determined by a combination of the aforesaid magnetic interaction and induction forces induced in I_29_200 interacting with the above-mentioned magnets.

(b) Cylindrical Pair: This can be regarded as a combination of revolute and prismatic pairs, with both translation and rotational motion, and the same considerations apply.

(c) Spherical Pair: This is a generalization of revolute pairs to three dimensions. Rest states can be arranged at arbitrary azimuth and altitude angles, and dynamics between one state and another can be controlled using one or more magnets and/or induction and/or hysteresis members.

Figure 58:
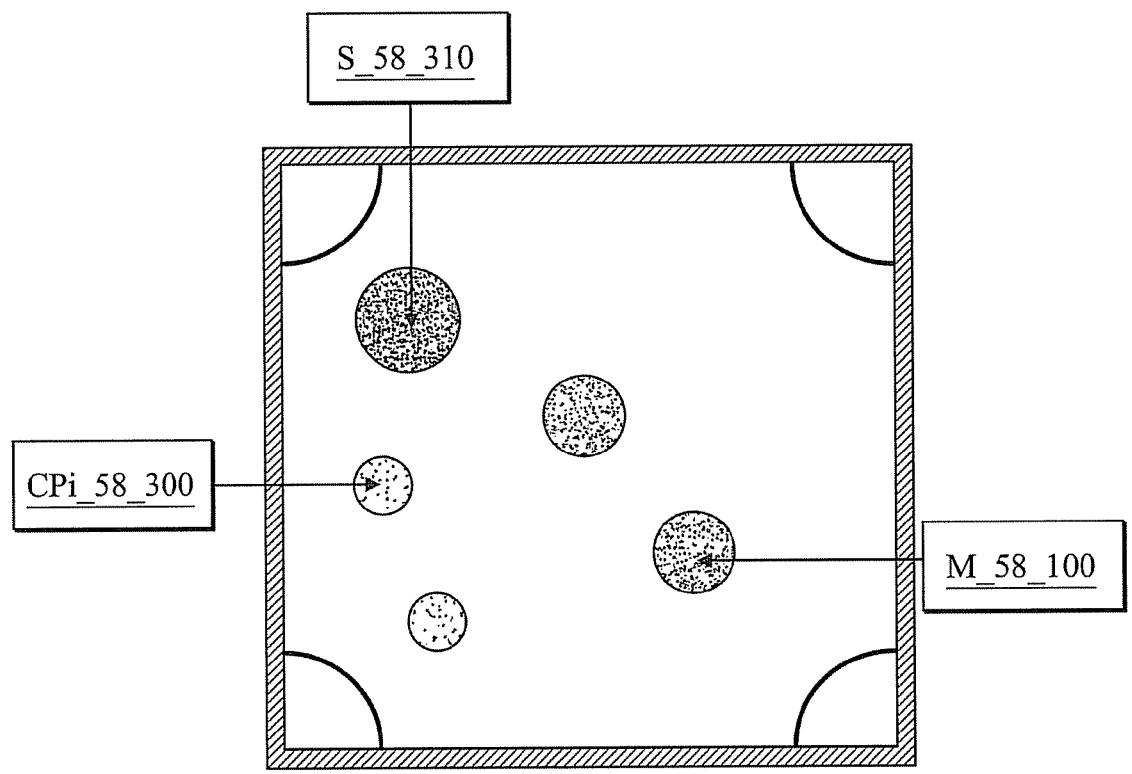
FIG. 58: Top View of Carom Board, showing magnets M_58_100 beneath board, and induction members i—the striker S_58_310 and/or pieces Pi_58_300.

(d) Planar Pair. The carom board of FIG. 58 is an example of a planar pair, where the striker and pieces (constituting the first rigid link) can move only on the board surface (constituting the second link). Enhancement of the board and/or striker and/or pieces with magnets and/or induction and/or hysteresis members as per Section A enables the customization of apparatus rest positions and/or dynamics.

(e) Higher Pairs: In pairs that have point contact, poles can be placed on or near a set of contacting points on the pairing members. Induction/hysteresis members can be placed on other positions of the pair, modulating dynamics. For example, the pieces in billiards and snooker have a point contact between one member and the board surface, and the enhancements similar to those of the planar pair apply. In pairs with line contact, poles can be placed on or near a set of contacting lines. For example, the rollers in a roller bearing can be magnetized to preferentially occupy certain positions relative to the two shafts coupled.

In certain mechanisms constructed according to the invention, some or all of the links and/or joints can be thus enhanced. It is not necessary that all joints or even all joints of a certain type be enhanced in the same manner. The interaction of all the magnetic and/or hysteresis forces will determine the rest position of the apparatus. The sizes of these forces can be controlled by suitable design and magnetizations of the magnets, induction, and hysteresis members on the links and the two constituents of some or all joints (pin and its housing for a revolute joint) as per Section A. Suitable design and orientation of such magnetized links and joints can be used to realize any desired rest positions of the mechanism. If there are K desired rest positions for the apparatus, then the magnets in the pairs/joints will have O(K) poles.

In an exemplary design for a mechanism with one degree of freedom with only revolute joints (pins and housings), only one pin is magnetized with K north-south pole pairs, the housing has a single NS pair, and the rest are non-magnetic. A simple algorithm to determine the pole locations is to place a N-S pair on the pin, aligned with the S-N field on the housing in each desired rest state. In general, the resulting N-S pairs may be close together, in which case, multiple pins can be magnetized with each pin having rest positions at a subset of the rest states of the whole mechanism. The selection of these subsets can be made in a manner as to optimize criteria such as maximizing holding force, positioning accuracy, etc. Exemplarily, to maximize positioning accuracy of any point on a link of the mechanism, the pin most sensitive to changes in the aforesaid point's position can exemplarily have a rest state corresponding to each desired location of the aforesaid point. Multiple pins/housings may be magnetized at the same desired locations, possibly yielding higher holding forces for both single-degree-of-freedom mechanisms and multiple-degree-of-freedom mechanism. The number of N-S pairs in each pin/housing may in general differ. In general, the magnetic strengths of the N-S pairs can differ.

In general, dynamic motion between two states can be controlled by any of the variants using possibly induction/hysteresis effects, multiple autonomously magnetic interacting members, induction/hysteresis members of different geometry, etc. as per Section A. Exemplarily, these forces can be used to slow down "ratcheting" between states, e.g., as in the ejector/latch of in FIG. 50.

Connecting links and joints/pairs enhanced in the aforesaid manner as per the invention, enables creation of mechanisms of arbitrary complexity ranging from 4-bar linkages and its variants (including quick-return mechanisms), Geneva Mechanisms, the Watt Chain, the Stephenson Chain, and Chebychev's walking mechanism (exemplarily, here the rest states can be designed to fold the legs in a crouching position), etc. An advantage of this invention is that the motion between the states is noiseless, unlike ratcheting alternatives well known in the state-of-art.

Generalization of Power Control

From one point of view, the invention is a generalization of well-known stepper motors to create stepper mechanisms (especially if there are powered coils in addition to permanent magnets on the pins). Changing the coil excitation "steps" the mechanism through its different rest states, which can be chosen to be on an appropriate, possibly non-uniform grid for one or more points in the mechanism.

Figure 30:
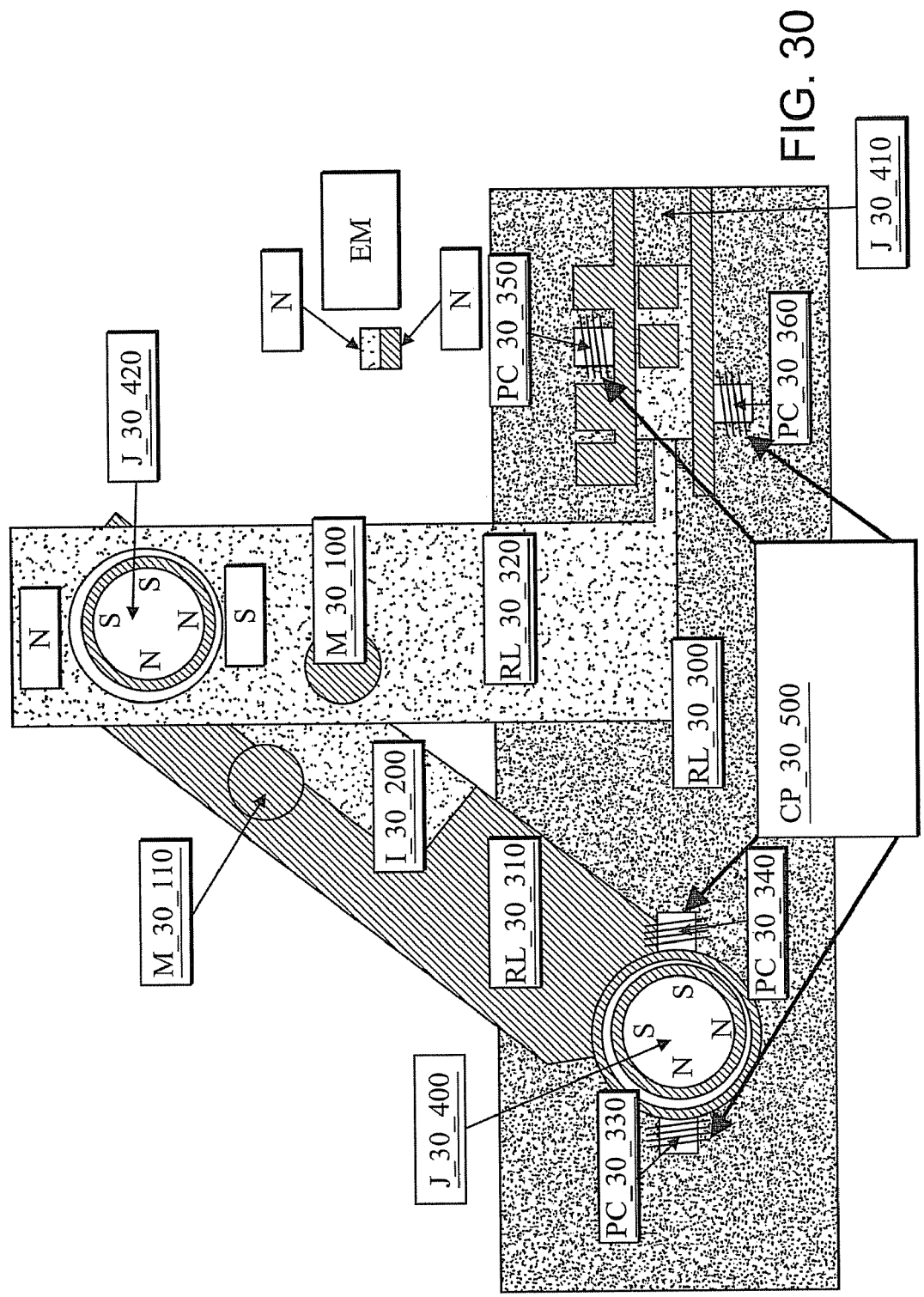
FIG. 30: Stepper Mechanism with Powered Pins and links. The sequencing of the powered coils is under the influence of the control circuitry and/or the mechanisms motion itself, analogous to brushless motors and commutated motors. In this illustration, the powered coils are all on link R 30300, but this is not necessary in general. Drawing might not be to scale.

FIG. 30 shows an exemplary three-link mechanism (this is actually a 4-bar linkage with one infinite link) composed of rigid links R_30_300, R_30_310, R_30_320, with a revolute joint J_30_400 connecting R_30_300 and R_30_310, another revolute joint connecting R_30_310 and R_30_320, and a prismatic joint J_30_410 connecting R_30_300 and R_30_320. Depending on (i) the relation between the lengths (between the joints) of R_30_300, R_30_310, and R_30_320, and (ii) the extent of travel allowed by joint J_30_410, the mechanism may or may not allow complete rotation of R_30_310. Some or all joints are enhanced as per the invention with magnets and/or hysteresis and/or induction members, possibly with varying shapes, sizes, materials, texture, etc. as per Section A. In addition, magnet M_30_100 and induction member I_30_200 interact to produce an inductive braking force.

Powered coils PC_30_330 and PC_30_340, attached to R_30_300 (or R_30_310), cause motion at joint J_30_400. Powered coils PC_30_350 and PC_30_360, attached to R_30_300 (or R_30_320), cause motion at joint J_30_410. The coils can be on more than one link in general and are constructed with ferromagnetic cores, as is well known in the state-of-art. The flux produced by the aforesaid powered coils can vary with angular position of J_30_400 and linear position of J_30_410, similar to the discussion on motors with an ellipsoidal rotor (Section B). An appropriate design of the joints (position, number, energy level of the rest states, etc.), together with sequencing and control of the electrical excitation to the aforesaid coils from control circuitry CP_30_500, will make the mechanism step between states, exactly analogous to stepper motors taking steps.

The Invention Distinguishes Itself from the State-of-Art in Several Ways.

(a) In FIG. 30, the set of links forms a closed loop, and the amplitude and sequencing of the excitation to the different joints has to be chosen to generally (but not always) to avoid opposing each other. This is unlike cinematically chained powered robotic arms, where the excitation to the different actuators can be substantially independent, the only constraint being the desired path of the kinematic chain.

(b) In addition, the set of powered coils PC_30_330, PC_30_340, PC_30_350, PC_30_360 need not form the windings for one complete rotary motor and one complete linear motor, but are placed so as to optimize a desired criterion, e.g., power delivery, fineness of control, etc. If power delivery is the criterion, coils PC_30_350 and PC_30_360 are placed and controlled so as to apply force in the middle of the travel of prismatic joint J_30_410, since the mechanism cannot be moved by a linear force, when rigid link R_30_310 is exactly in line with R_303_20 and joint J_30_410 (this happens at extremities of travel). Even if the mechanism does not allow R_30_310 to perfectly align with R_30_320, the effectiveness of the linear force is reduced at the extremities of travel of J_30_410. Powered coils PC_30_330 and PC_30_340 are placed and controlled to apply force at those positions of revolute joint J_30_400, which positions correspond to the mechanism having prismatic joint J_30_410 at its extremities, so as to compensate the lack of drive from PC_30_350 and PC_30_360. They can be unpowered or designed to not apply any force/torque at other states of revolute joint J_30_400. This control can be driven by the mechanism's motion itself, opening and/or closing switches, generalizing the action of commutators in electric motors. Essentially, the apparatus of FIG. 30 is a "hybrid rotary-linear motor," and all powered coils and flux paths have to be jointly optimized.

(c) A variant of this apparatus uses another magnet M_30_110, with its poles arranged so as to repel M_30_100 near its extreme right (per FIG. 30) position. This provides a sideways force to R_30_310 in the extreme right position, causing it to move. Essentially energy is stored when M_30_110 and M_30_00 come near each other and released when they separate towards their rest state. This separation occurs exactly when the force exerted by PC_30_50, PC_30_360 is at a minimum. No power needs to be provided to PC_30_330 and PC_30_340, and they can possibly be omitted. In general, embodiments of the invention, by introducing magnetic fields in a general mechanism, introduce energy storage in the mechanism. This stored energy function e(x(t)) of the mechanism's current state x(t) can be cost effectively designed with minima/maxima to offer control of mechanism dynamics significantly decoupled from kinematics. In addition, the invention offers additional control by having the ability to inject power at multiple places, appropriate controlled and sequences.

The ideas of powering at multiple joints (each possibly having rest states) can be applied to any mechanism with other kinds of joints (lower and/or higher pairs). Effectively, the mechanism is driven by multiple prime movers, each directly moving different parts of the mechanism, over possibly different portions of the cycle of the mechanism. Since the percentage of power transmitted from one joint to a desired link, fineness of motion control, etc., varies depending on the state of the mechanism, the joints and their powered coils can be so selected and powered in sequence to respectively maximize the power transmitted to the output in all positions, improve fineness of control, etc. Exemplarily, states where no power is transmitted to the output can be eliminated (so-called "dwell states"). In addition, the ability to selectively power different joints allows us to reduce peak forces and associated stresses internal to the mechanism. This flexibility can, minimize heavy reaction forces from the constraint surfaces, caused by actuation from a powered coil at a joint/link whose force is minimally transmitted to the output link in the current mechanism state.

Generalization of Power Transmission Control

A generalized clutch is defined as a device causing transmission of force causing relative motion to occur through any one of the joints in mechanisms (e.g., the six lower pairs or higher pairs). Transmission of force through a revolute pair is a classical clutch well-known in the state-of-art (for non-oscillatory transmission only). The invention generalizes this to transmission of possibly oscillatory force from one link to another connected through a general mechanism having any of the lower/higher pairs as joints. This has already been discussed. For an example, force transmission using induction members and magnets is depicted in FIG. 33 below When reciprocating motion is transmitted by such generalized clutches, the motion transmission drops off at high reciprocating frequencies, beyond the bandwidth of the transmission of the magnetic/hysteresis/induction force, which can be calculated by standard techniques of electromagnetics and dynamics (Section E). Design of apparatus using the aforesaid generalized clutches has to properly account for such effects.

Applications of this invention are many, including but not limited to:

Motion control in low-cost apparatus (SAs): The invention offers low-cost non-uniform speed/timing/force/torque/position control in mechanisms, compared to electronic techniques based on closed-loop feedback, microprocessors, sensors, and servos. Examples include tables to hold objects in moving environments (e.g., a bottle holder for a car), read-head rest positioners in disk drives, an extendible door, etc.

Design of highly reliable mechanisms (e.g., in aircraft/spacecraft/mass transportation mechanisms/medical equipment mechanisms) due to the ability to provide cost-effective control speed of operation at all states of the mechanism without using additional complexity in the mechanism or sophisticated closed-loop control using microprocessors/sensors/servos. The latter two techniques can themselves decrease reliability due to the additional complexity involved.

Design of high-precision mechanisms, positioning devices in computerized numerical-control (CNC) machines, etc. Here, sources of error due to mechanical backlash, zero-response zones (dead-zones), etc., can be eliminated by having a high drive to the mechanism together with a high inductive load. The drive should be chosen to be much higher than minimum required to eliminate backlash (much more than the "stick-slip" threshold). An equally high induction load to the system will ensure very slow, but non-zero motion (inductive load goes to zero at zero velocity), which can be exploited to provide high accuracy.

The invention can be used in conjunction with microprocessor/sensor/servo based techniques and, in these situations, may help simplify the design of the closed-loop control system (exemplarily by reducing dynamic range, increasing response speed, reducing random disturbances, massaging the system open-loop response to be close to that desired, etc.).

F. An Extended Example: 4-Bar Linkage and Reciprocating Mechanism

As a concrete example of all these ideas, FIG. 31 shows a 4-bar linkage, using magnets (permanent or electromagnets) pined on the mechanism links/joints (as multiple autonomously magnetic interacting members). The mutual interaction of the magnets, together with any induction/hysteresis members, determines rest positions and dynamics as per the discussion above in Section E. The joints can be revolute, prismatic (e.g., sliders similar to FIG. 33 below), or general. Powered coils placed on one or more of the links/joints will enable extensive control of mechanism actuation for increased power, accuracy, etc. Force transmission between input link R 31310 and output link R_31320, modulated by rest states of the whole linkage and the induction/hysteresis members (not shown) on P_31_400, constitutes generalized clutch action. We shall further elaborate on these ideas below in the important special case of a reciprocating slider-crank mechanism.

FIG. 32 shows a reciprocating mechanism, where a reciprocating shaft RS_32_340 (sliding in guide G_32_350) is shown attached by a pin DP2_32_330 to a connecting rod CR 32_320 driven by a prime mover. The prime mover is exemplarily an electric motor, driving drive pin DP132_310 on drive disk DR 32_300 (this may be replaced by alternative means of drive).

An embodiment of Power Control as per the methods of Section B modulates the prime mover input to the mechanism. As discussed in Section B (e.g., FIG. 10), use of an elliptical rotor provides torque that varies periodically in each rotation. As such, appropriate orientation of the elliptical rotor major axis with respect to the drive pin DPI32310, enables time-varying position-specific power to be delivered to the mechanism. In FIG. 32(*a*), the position of the mechanism is such that the elliptical rotor is aligned parallel to the main flux path, maximizing torque delivered to DR 32_300 and hence force to reciprocating shaft RS_32340. A quarter rotation later (FIG. 32(*b*)), the elliptical rotor is perpendicular to the main flux path, minimizing force delivered to RS_32340. Thus, the force/speed/position/timing of the shaft RS 32_340 can be made variable by appropriately designing and orienting the elliptical rotor with respect to the mechanism. The force/torque variation can be made customizable and asymmetric at time of use by the programmable ferromagnetic inserts shown in FIGS. 10(*c*) and (*d*). Multiple prime movers can also be used, e.g., adding one or more coils on the guide G_32_350 for RS 32 340 to move RS_32_340 directly.

An embodiment of Power Transmission Control (FIG. 33) attaches magnet M_33_100 (or a magnet assembly M_33_100 as per Section A) to connecting rod CR33_320 in the vicinity of the drive pin DP2_33_340. The drive pin DP2_33_340 is omitted (or modified), and auxiliary constraints keeping connecting rod CR 33_320 in the vicinity of reciprocating shaft RS_33_330 are present. The reciprocating shaft RS_33_330 incorporates one or more magnets/induction/hysteresis members of various kinds, as per Section A. Exemplarily, a slot is cut in RS_33_330, in which DP2_33_340 can slide, yielding a prismatic joint or a higher pair. The joint between DP2 33 340 and RS_33_330 is a higher pair (line contact) unless DP2_33_340 is free to rotate around CR 33_320 with a revolute joint, in which case DP2_33_340 can slide with surface contact over RS 33 330 forming a prismatic pair. If it is a higher pair, then the slot need not be a straight line, but can be a general curve. No vertical force is transmitted through this joint. Vertical force is due to induction in RS_33_330 due to field from magnet M33_100 (or magnets 1\433_100). Note that, instead of the configuration shown, magnet M 33_100 can be on RS_33330 and the induction member can be on CR 33_320, or both the magnet and the induction member can be on, both RS_33_330 and CR_33_320.

Electromagnetic force is produced in RS_33_330 due to induction caused by slip between CR 33_320 and RS_33_330. One major advantage of inductive power transmission control is fail-safeness. If RS is prevented from motion due to an obstacle, excessive guide friction, etc., the rest of the mechanism can continue to operate. The transmitted force will increase, because the slip is maximum when RS_33_330 is stationary, but the mechanism will not stall or "jam."

FIG. 34 shows an embodiment of Load Control, which attaches an induction member IM 34 200 to connecting rod CR34_320. This induction member IM_34 200 is a conductive strip, whose geometry and dimensions (length, width, thickness, etc.) are determined to obtain the desired braking force, as per the description in Section A. The induction member IM_34_200 may be identical to the connecting rod CR 34 320 and may also be any of the pins DP1_34_310 or DP2 34340. Instead of an induction member, a hysteresis member or autonomous sources of magnetic flux (e.g. magnets) can be used, as per Section A. If magnets are used (as in FIG. 36), the load Control becomes dissipationless. That is, the load periodically absorbs and returns energy to the apparatus, while modulating speed.

At a desired position of this reciprocating mechanism, the conductive strip IM_34_200 passes over a magnet M 34_100 (or magnet assembly M 34300 as per Section A), developing opposing electromagnetic force (inductive), which slows the mechanism down. This causes the mechanism to spend more time in those positions when the strip 11/1_34_200 is over the magnet M_34_100, resulting in control of the timing of the trajectory of the whole assembly, in particular reciprocating shaft RS_34_330 (exactly analogous to the previous discussion for the timing-control induction member of FIG. 20).

Figure 35:
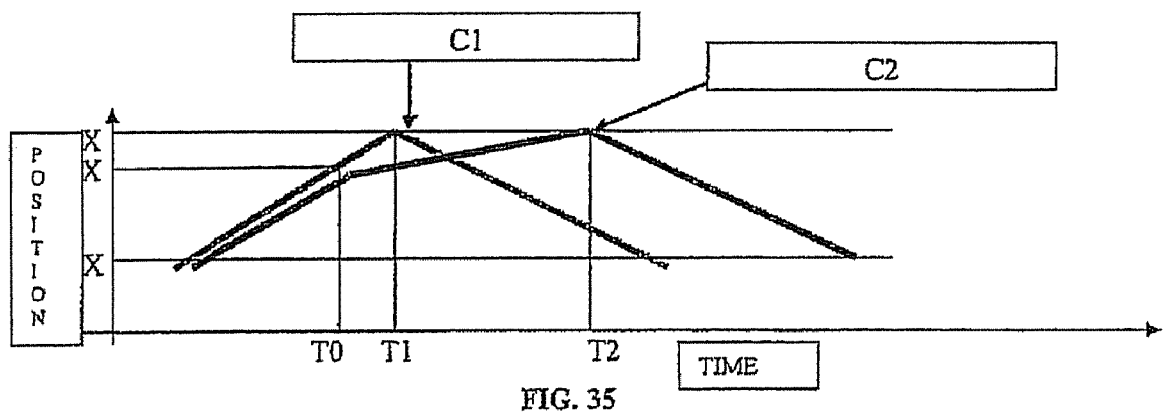
FIG. 35: Mechanism Timing Change by induction force.

FIG. 35 shows the waveform of the position of the reciprocating shaft RS_34330 over time, which periodically oscillates between positions X0 and X2, via intermediate position XL In the absence of the conductive strip IM_34_200, the mechanisms goes from position X1 to X2 in a short time between TO and Ti. In the presence of the conductive strip, the time to go from position X1 to X2 is lengthened to the interval between TO and T2 (TM 34 200 is over magnet/magnets M 34 100 sometime during this interval), thus "flattening" the waveform of position with time. Arbitrary time waveforms can be obtained using a suitable number of induction/hysteresis members like IM 34_200, a suitable number of magnets, and appropriate geometry and dimensions (length, width, thickness), material type, and material solidity, slottedness, or perforatedness as appropriate (as per the discussion in Section A). The force can be programmably generated by providing slots for both induction/hysteresis members like IM_34_200 and magnets M_34_100, so that the timing behavior of the mechanism can be changed as required.

Figure 36A:
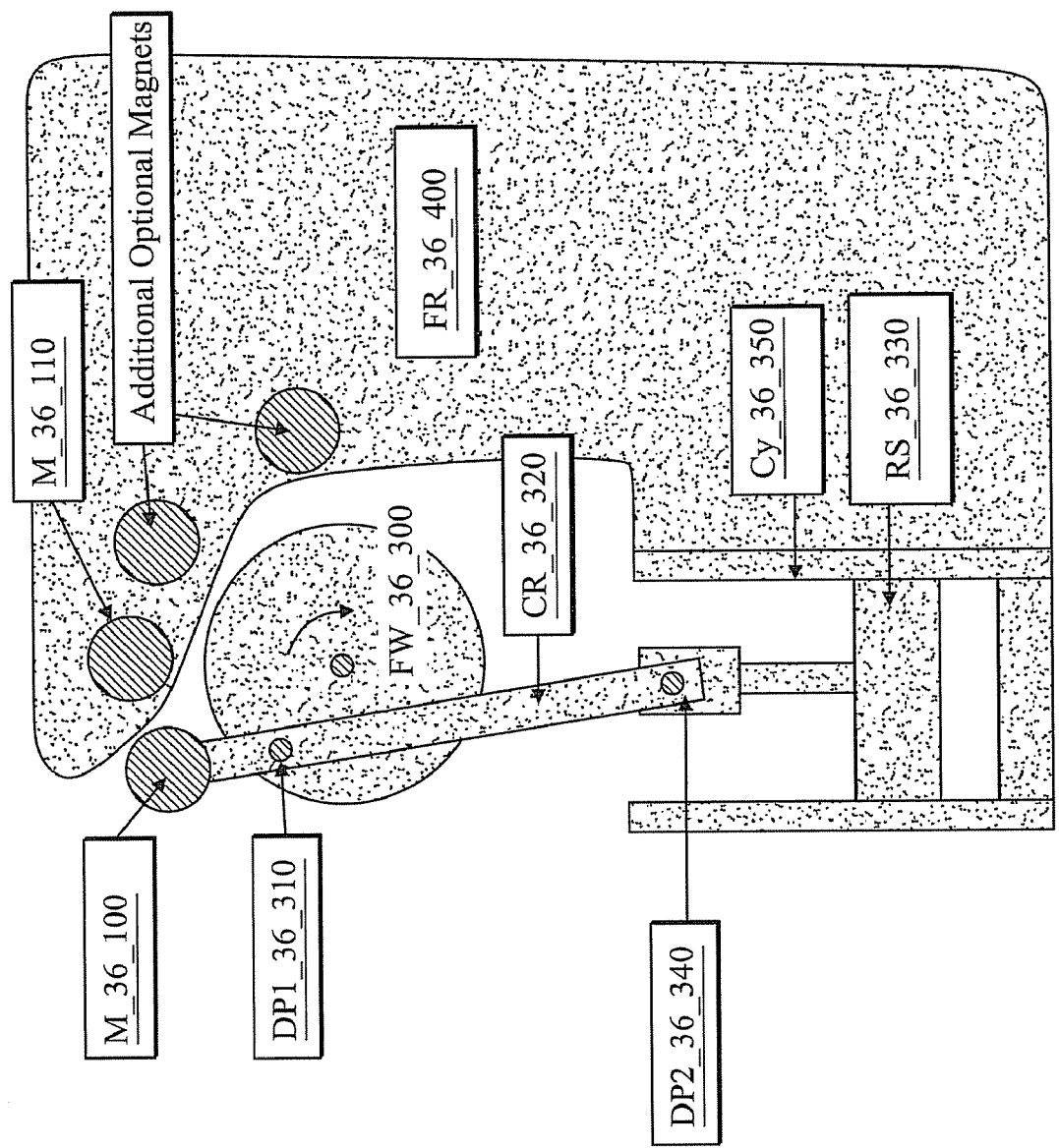
FIG. 36: Vibration Minimization using Load control using magnets for an IC-engine Magnets M_36_100 and M_36_110 (below M_36_100 on mounting MO_36_400) have like poles facing each other, and are so arranged to come close to each other at the end of the power stroke (with the flywheel F_36_300 as shown), absorbing energy from the prime mover (the gas force from the piston). During continued rotation of F_36_300, M_36_100 and M_36_110 repel each other, releasing energy, compensating for the lack of power during the exhaust stroke. The geometry of M_36_100 and M_36_110, and the engine may differ from the illustration.
Figure 36B:
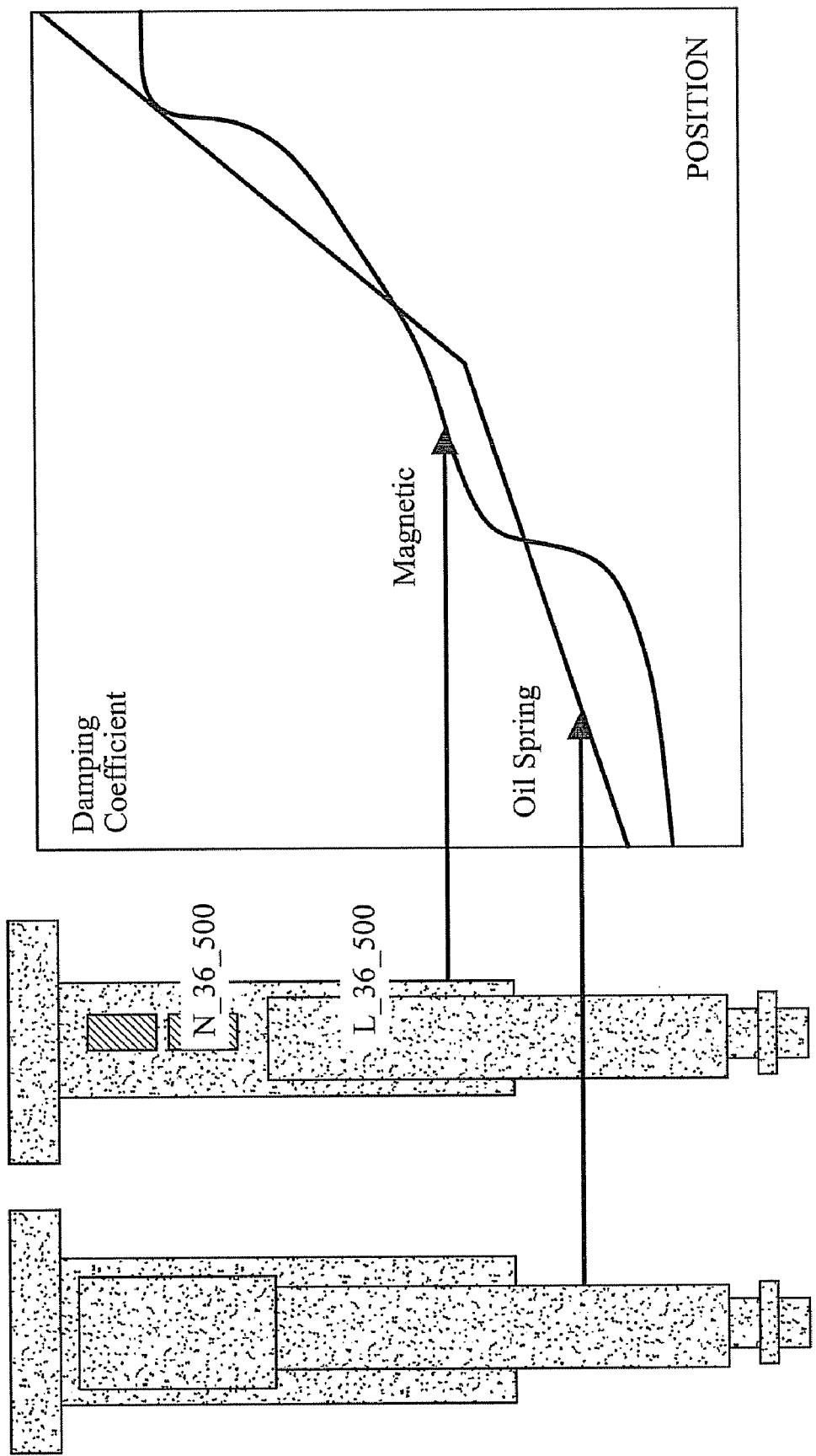
Figure 53:
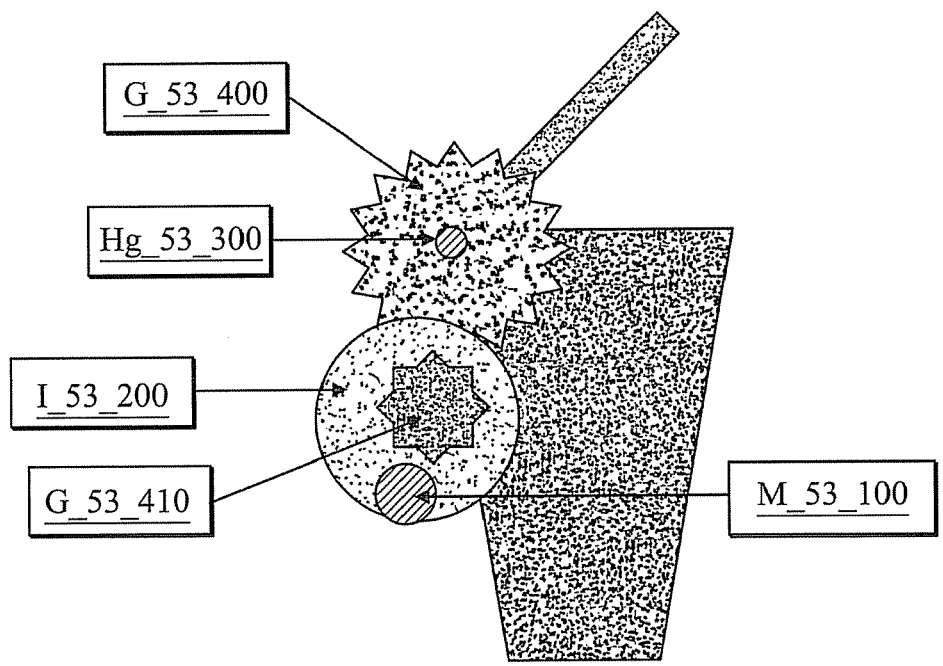
FIG. 53: Induction Speed Limiting with gear for bin lid.

A variant of Load Control is shown in FIG. 36, where, instead of the induction member, two magnets M_36_100 and M_36_110 are used. M36_100 is mounted on the connecting rod CR36 320, while M_36_110 is mounted together with the cylinder G_36350 on mounting frame M036_400 (exemplarily at a depth below M 36_100). The apparatus may be used for damping vibrations in an IC-engine. Magnets M_36_100 and M36_110 have like poles facing each other (when they come close) and are so arranged to come close to each other at the end of the power stroke (with the flywheel F_36_300 as shown), absorbing energy from the prime mover (the gas force from the piston). During continued rotation of F 36_300, M_36_100 and. M_36_110 repel each other (the rest state of the mechanism has flywheel F 36 300 one half rotation displaced from the end of the power stroke), releasing energy, compensating for the lack of power during the exhaust stroke. The geometry of M_36300 and M36 110 may differ from the illustration, and there can be multiple magnets on both the mounting M036_400 and the reciprocating mechanism, designed and arranged to minimize torque ripple (as shown on the mounting in the same figure). The Sallie ideas in vibration minimization, whether using dissipation-less magnetic attraction/repulsion or damping forces based on induction and/or hysteresis, can be applied to shock absorbers. Long lever arms or speed-increasing gearboxes can be used to increase the forces/torques. An exemplary illustration is described later for a general hinged device (see FIG. 53 showing a bin lid).

All three forms of control to this mechanism, Power Control, Power Transmission Control, and Load Control, admit of all the variants using possibly hysteresis effects, multiple autonomously magnetic interacting members, magnet/induction/hysteresis members of different geometry, etc., as per Section A. Note that, with hysteresis members and multiple autonomously magnetic interacting members, the mechanism has preferred rest positions, which have to be accounted for during design.

G. Apparatus Using the Invention

Figure 39:
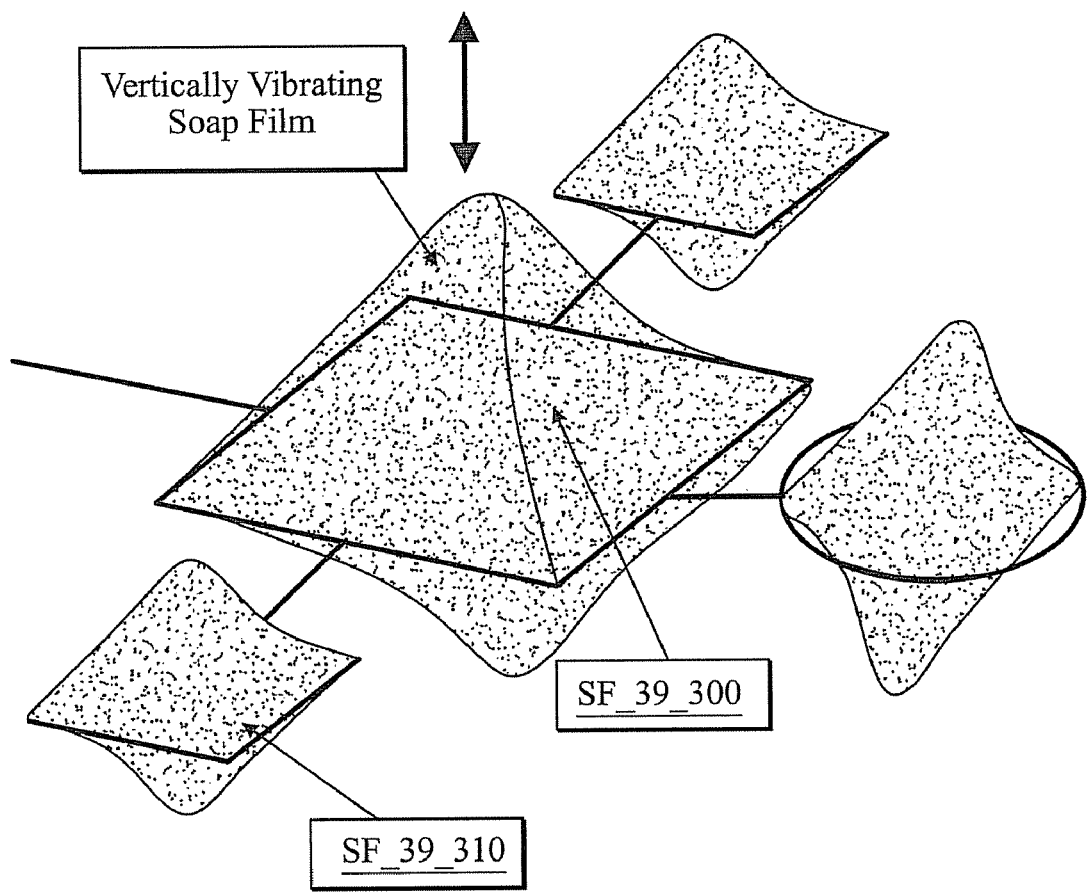
FIG. 39: Soap Film Frame Assembly having multiple sections, of different shapes and dimensions, and different resonant frequencies. Changing the vibration frequency will selectively excite different sections, changing the vibration pattern visible to the viewer.

To illustrate the wide applicability of the invention, we describe additional exemplary apparatus using the ideas outlined in Sections A-F, including uniform motion control, non-uniform motion timing control, with and/or without user programmability, and motion control in general mechanisms. The ideas can be applied in other apparatus, and the invention extends to them. Without limitation, the invention can be applied to enhance the functionality of the following apparatus:

- A bubble toy, demonstrating vibrations of minimal surfaces (e.g., FIGS. 37-39).
- A vibration bench, whose vibration velocity profile, and hence vibration spectrum, can be controlled to suit, generating harmonics as desired. This ability to generate arbitrary vibration spectra can be also applied to food processors, washing machines, agitators, etc. This same ability to control reciprocation velocity, in a dissipation-less fashion, can be used in metal-working presses for punching, forging, etc. In this case, the velocity/force exerted on the metal can be accurately controlled as a function of time or position of the stroke. The inverse-damping of vibrations can be applied to shock absorbers.
- A paper dispenser, which is enhanced to prevent excessively rapid rotation of the paper roll to prevent wastage (e.g., FIG. 40).
- A well pulley with an induction brake to prevent the water vessel from dropping excessively fast (e.g., FIG. 41).
- A display turntable, whose rotation speed can be controlled to provide best viewing to customers/onlookers (e.g., FIG. 42). The same ability can be used to control rotation speed in water sprinklers, pedestal/table fans, etc.
- A display turntable, whose non-uniform rotation-speed profile can be programmably changed by the user for best display effect (e.g., FIGS. 43-44). The same ability can be used to programmably control rotation speed and direction of action in water sprinklers, pedestal/table fans, etc.
- A lazy-Susan type device, which is enhanced to provide a smooth resistive force to prevent excessively rapid rotation of the device (e.g., figures same as display turntable).
- A rotating doll whose speed of uniform rotation can be user-controlled, or a rotating doll whose non-uniform rotation speed can be both user-controlled as well as whose non-uniformity be user-programmed (e.g., FIG. 45).
- A rotating lollipop dispenser, having speed control built in, enabling the lollipop taster to rotate the lollipop at different desired speeds relative to the tongue (e.g., FIG. 46).
- A timing CAM based on electromagnetic force principles (e.g., FIG. 47). This same device can be used in an anti-lock braking system providing pulsating braking forces whose pulse shape and frequency can be controlled as desired.
- A powered toothbrush, providing low-cost, continuously variable speed control to the user (e.g., FIG. 48).
- A toothbrush mechanism, which "automatically declutches" at excessively high load.
- A toothbrush mechanism, whose brushing velocity profile can be controlled to yield maximum user comfort.
- A toy racing car, where the resistive speed control is replaced by a continuously variable induction/hysteresis speed control using our techniques.
- A set of toy racing cars, which can co-operatively/competitively race, based on the attraction/repulsion of high-strength magnets on them. Here, the rest states of the set of cars could be convoys of cars with the north pole of one car sticking to the south pole of another car, etc.
- A set of toy racing cars, racing synchronously due to magnetic attraction/repulsion.
- A fan or electric razor, providing continuously variable speed control to the user based on the motion control techniques,
- An electric razor, providing a shaving profile that slows down when the blade is beginning to cut and speeds up after cutting, based on motion control of general mechanisms (Section E).
- A drawer, which is enhanced to prevent violently rapid opening/closure, increasing both safety and reducing wear and tear of the unit (e.g., FIG. 49).
- A CD latching/ejector mechanism, which is enhanced to eliminate excessively violent action (FIG. 50).
- Any hinged device, which is enhanced to prevent slamming (e.g., FIG. 51), including but not limited to (a) a door closer, (b) a oven door closer, (c) a toilet seat, (d) a suitcase lid, and (e) a lid for a plastic bin. in these apparatus, gear/lever mechanisms can be used to enhance force/torque (FIGS. 52-54).
- A rotating chair, which is enhanced to have an induction disk in proximity with magnets to avoid rotation "overshoot." Alternatively, the chair could have a non-uniform ferromagnetic hysteresis disk or a disk with multiple magnets, inducing preferred rest positions in the chair.
- A coat hanger and coat hanger rail, which is enhanced to include magnets in either the coat hanger and/or the coat hanger rail to prevent the coat hanger from occupying undesirable "twisted" positions the rack.
- A toilet flush tank, which has a magnet attached at the top, to enable steel napkin holders to be held firmly and not "slip-off" the tank.
- A car dashboard with a magnet attached in the middle, to enable ferromagnetic objects to be conveniently held in place and not "slip off."
- A circular pedestal with a ferromagnetic material on the surface, to which platforms can be attached at various heights/angles magnetically to hold objects, exemplarily flower pots (e.g., FIG. 55).

A pedestal with a spherical ferromagnetic surface, to which platforms/clips can be attached at various positions to hold objects e.g., pens, pencils (e.g., FIG. 56).

A magnetic shower attachment device, which has a showerhead attachment with a magnetic base attached to a ferromagnetic strip on the bathtub. This enables the showerhead to be placed at any desired height. Using a grooved ferromagnetic member projecting from the bathtub enables both the height and angle to be varied.

Figure 57:
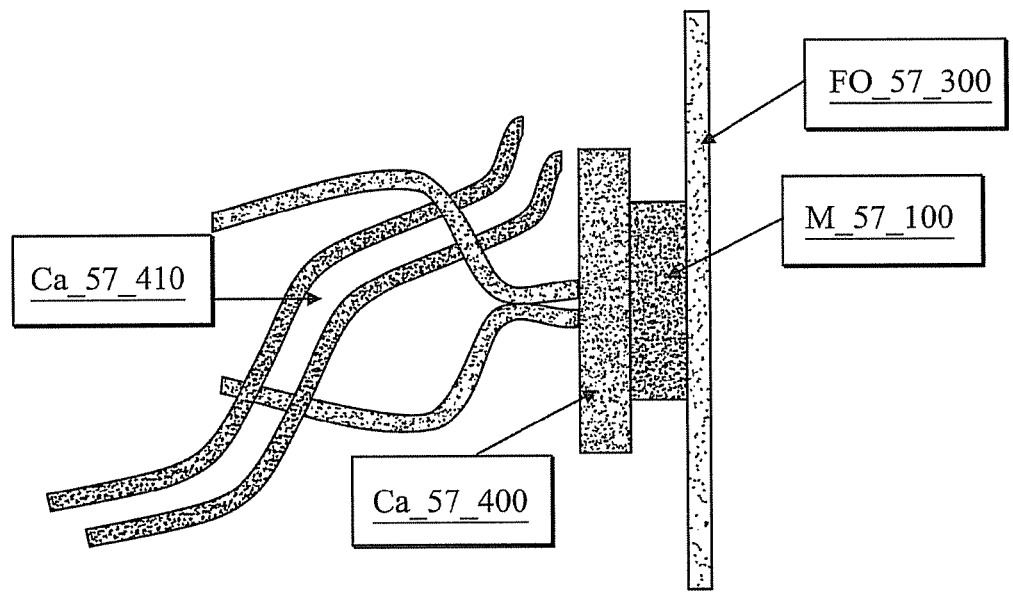
FIG. 57: Magnetic Cabling Clip holding cables to ferromagnetic object (e.g. computer cover).

A magnetic wire-clipping device, which has a clip attached to a magnetic base to enable wiring traditionally placed on the floor to be conveniently organized and routed at appropriate paths on the walls or the floor, without the necessity to drill holes (e.g., FIG. 57).

A board game (e.g., carom/billiards/snooker) enhanced by the use of magnetic/induction/hysteresis members (e.g., FIG. 58).

Figure 59:
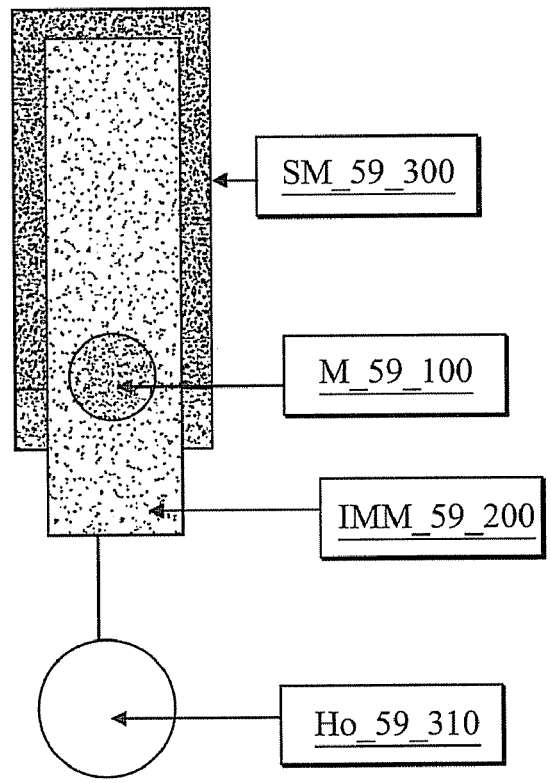
FIG. 59: Extensible Tether with Induction Braking (front view).

An extendible tether/noiseless ratcheting door with gentle noiseless operation (e.g., FIG. 59).

Figure 60:
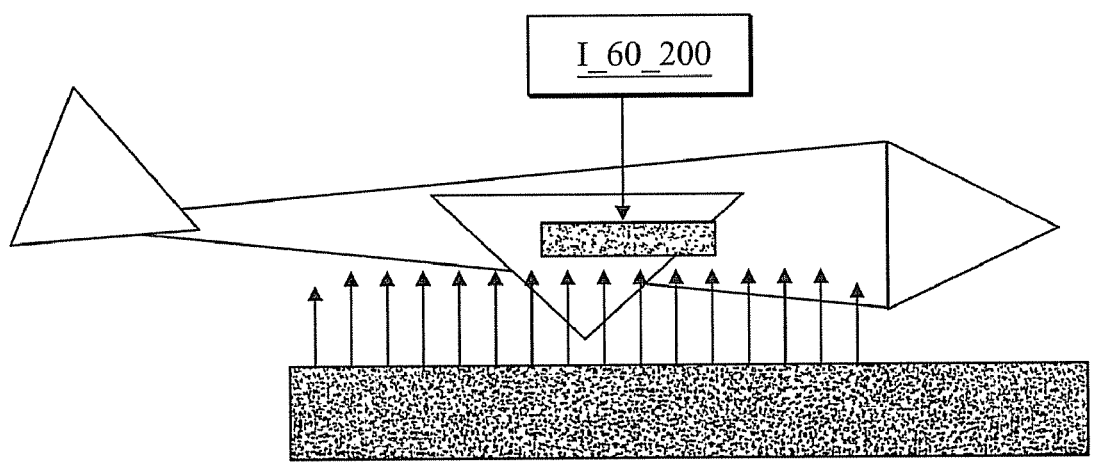
FIG. 60: Airplane with Maglev, Magnets on Ground, and Induction Member I_60_200 on aircraft, Induction Member may be inside craft, lowered out of craft during landing, or may be integrated with fuselage itself.

An aircraft taking off and landing without power (e.g., FIG. 60).

Figure 61:
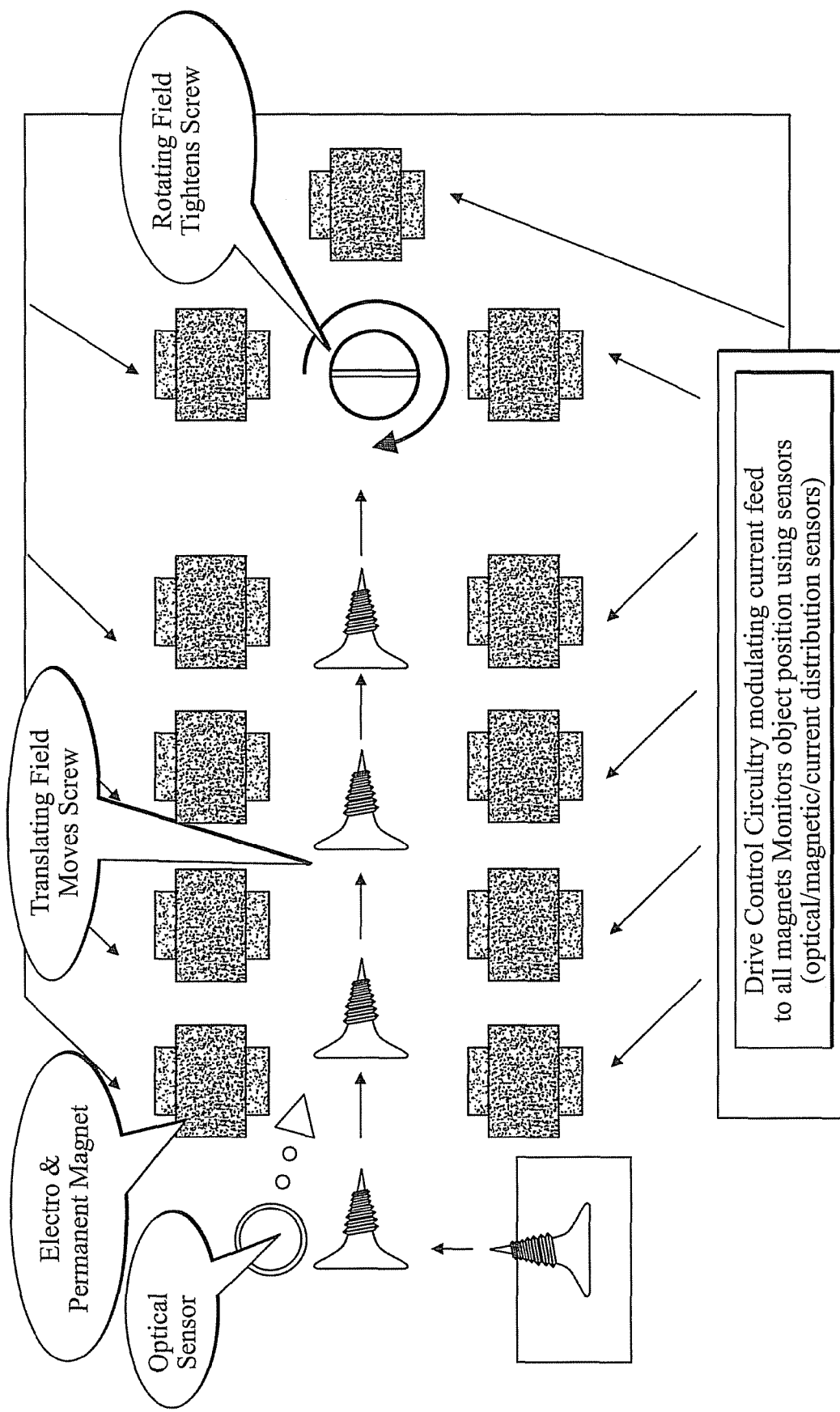
FIG. 61: Electromagnetic Manipulator lifting exemplarily screws and tightening them in object (not shown).

A contactless manipulator assembling general products (e.g., FIG. 61).

Any clothing utilizing a magnetic button and a metal backing, which enables the appropriate degree of tightness to be achieved based on the individual's current dimensions.

A field-limiting device to reduce leakage fields from affecting articles of household use.

A bearing, which has built-in induction load to reduce excessively high-speed rotor operation, as per the methods of Section D. The use of unidirectional nonlinear members like diodes in the current return path enables the bearing to exhibit speed limiting in only one direction.

A gear, whose speed-torque transmission characteristics can be user-programmed and are not necessarily in inverse proportion (e.g., FIG. 12).

A reciprocating mechanism, which does not "seize" at unexpectedly high load (e.g., FIG. 33).

A Geneva mechanism with contactless engagement (similar to the reciprocating mechanism of FIG. 33).

A robotic device, which is "fail-proof" and disengages smoothly in situations that are outside the capabilities of its kinematics (e.g., FIG. 33).

While the apparatus will be described primarily using induction forces, they admit of all the variants using possibly hysteresis forces, multiple autonomously magnetic interacting members, magnets/induction/hysteresis members of different geometry, etc., as per Section A. Predominantly, we shall use Load Control (as per Section D), but Power Control (as per Section B) and Power Transmission Control (as per Section C) can also be used for powered devices, and the invention applies equally to those variants as well.

Although certain embodiments of the invention are shown in the examples below, it should be distinctly understood that the invention is not limited thereto but maybe variously embodied within the scope of the claims specified in the claims section.

Bubble Vibration Toy, Demonstrating Vibration of Minimal Surfaces

Figure 37:
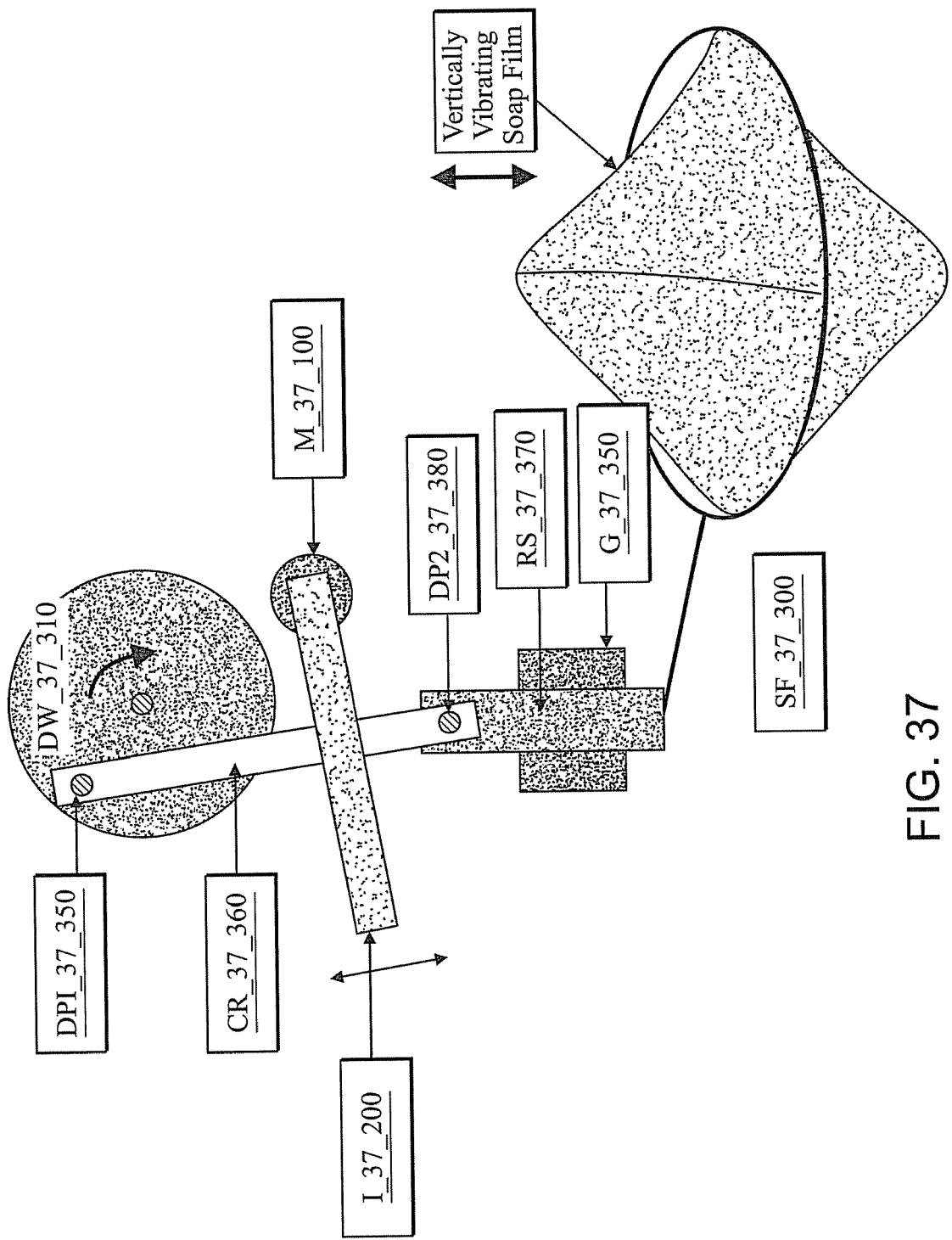
FIG. 37: Bubble Vibration Toy, with circular soap film frame SF_37_300.
Figure 38B:
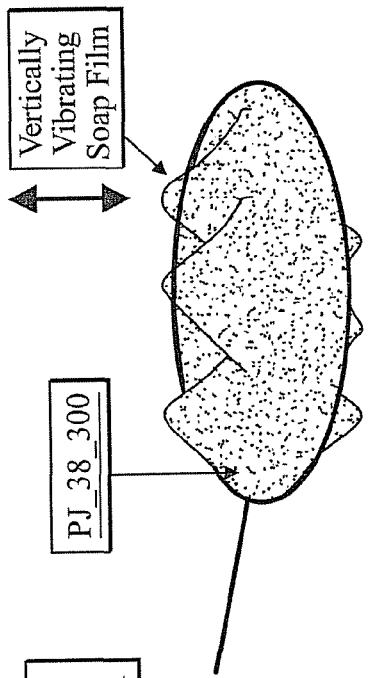
FIG. 38: Variants of Bubble Vibration toy, showing different kinds of frames, and different modes of excitation (translation+rotation), possibly using auxiliary frames. (a) Rectangular Soap Film Frame. (b) Soap Film Frame SF showing higher order modes, which are made non-degenerate by projection P_38_300 from SF, which forces a node (zero motion) and unambiguously determines the angular position of the resonant mode. (c) Cubical Soap Film Frame. (d) Soap Film Frame SF, Angularly Vibrating around axis. (e) Stationary Soap Film Frame SF, excited by auxiliary frame angularly vibrating around axis. The shape of the auxiliary frame may be different from illustration. Both frames may be excited. In general, one or more frames may be excited using one or more excitation waveforms. The resonant triodes shown in these figures are only illustrative. The modes obtained in practice may differ from those illustrated.
Figure 38D:
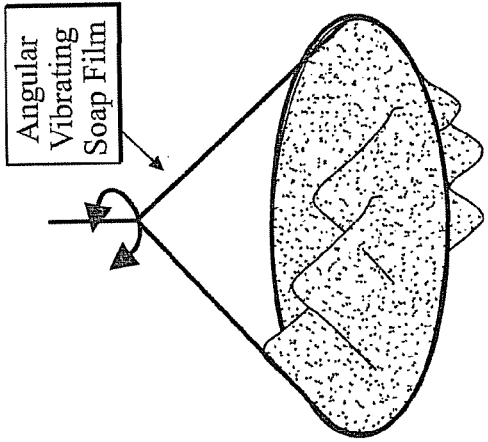
Figure 38A:
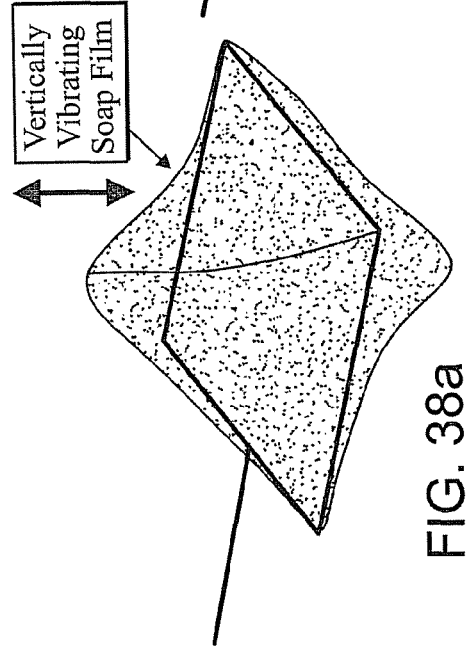
Figure 38C:
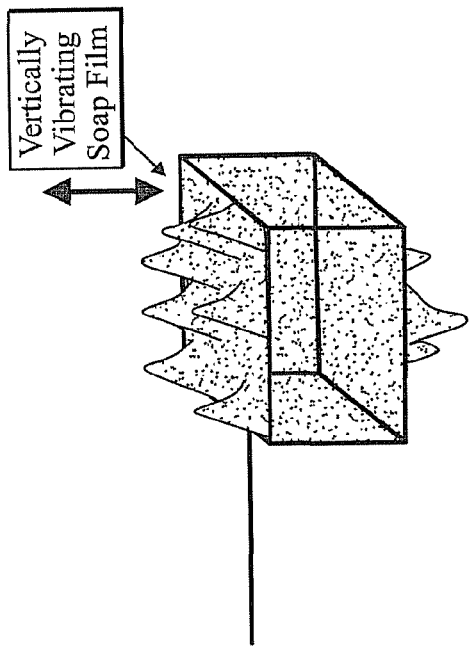
Figure 38E:
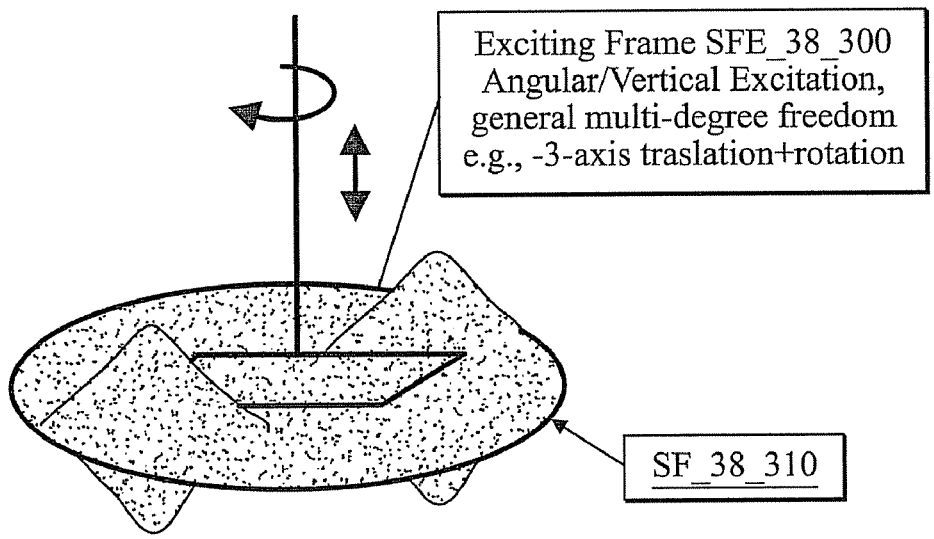

The apparatus in FIG. 37 shows vibrations of soap films, forming exciting patterns interesting to children and others. Driving wheel R_37_310 is driven by an electric motor, whose speed is controlled by magnet M_37_300 (or magnets M 37_100) interacting with induction member 1Y1 37_200, as well as possibly other induction/hysteresis/autonomously magnetic members. Driving wheel R 37_310 is connected to reciprocating shaft RS_37_370 via crankshaft CR 37 360. Soap film frame SF37_300 is attached to reciprocating shaft RS_37_370 and set into oscillatory motion by it at a rate controllable by modulating the induction force generated in induction member 1, VI_37_200 using any of the techniques outlined previously in Section A. Instead of 1M_37 200, other induction members, including an induction disk attached to the driving wheel R37_310, can be used and the force/torque controlled following the methods in FIGS. 14-19. When the oscillation rate is equal to any resonant frequency of the soap film, large vibrations can be noticed by the viewer. Instead of a rotating electric motor driving R_37_310, CR37360, and then RS37_370, a linear motor may be used to drive RS_37_370 directly. If lossless speed control is desired, then autonomously magnetic members may be used.

FIG. 37 depicts a vibration toy using a circular soap film frame, exemplarily made of thin plastic using injection molding. Other shapes are also possible, including rectangles (e.g., FIG. 38(*a*)), cubes (e.g., FIG. 38(*c*)), octahedral, other 3-dimensional, etc. The oscillations can be up-down, sideways, angular (e.g., twisting repeatedly back-and-forth as in FIG. 38(*d*)), and in general a multiple degree of freedom oscillation e.g., 3-axis translational and/or up to 3-axis rotational oscillation. The frame may have symmetry (e.g., a circle) or may have a slight asymmetry, which, in FIG. 38(*b*), is exemplarily a projection P_38_300 to break the degenerate nature of higher-order resonant modes with respect to angular position for stable viewing. The frames may oscillate or be stationary with one or more auxiliary members of arbitrary geometry attached to the same soap film oscillating. For example, in FIG. 38(*e*), E_38_300 vibrates, while SF_38_310 is stationary. If both oscillate at possibly different frequencies "standing-waves" are generated in the soap film. In general, multiple frames may simultaneously excite the same soap film, at possibly different frequencies, showing beat patterns. The frames may have multiple portions of different resonant frequency, and changing the oscillation frequency will selectively excite different portions, making the viewing interesting. For example, in FIG. 39, SF_39_310 is a smaller square than SF_39_300, and oscillates at a higher frequency. Changing the oscillation frequency from low to high will first cause SF_39_300 to oscillate at its fundamental, and then SF_39_310 will oscillate (together with the other two small frame portions). As frequency is further raised, each structure will resonate whenever frequency matches one of the resonant frequencies of the structure. Changing frequency in a "musical" manner will make different frame portions vibrate at different times, making the soap film oscillations "dance" between different frame portions.

Many variants of the soap bubble vibration toy exist, including:

The means of vibration can be a general mechanism (not just the reciprocating shaft illustrated) and may include multiple moving members, each having in general multiple degrees of freedom, e.g., 3-axis translational and 3-axis rotational motion.

The excitation need not be purely sinusoidal and may have different frequencies exciting different portions of the frame. Cost-effective methods of generating motion having arbitrary frequencies have been described in Section E.

The motion need not be rigid, with the dimensions and/or shape of the soap film frame itself varied using flexible structures for them. Exemplarily, the soap film frame can be a 4-bar linkage. This provides an excellent illustration of parametric oscillations in membranes.

The soap films can be preferably viewed in strong, possibly polarized light to illustrate the vibrations clearly.

The whole apparatus can be hand-held or arranged to be conveniently placed on tables, attached from ceilings, etc., with appropriate lighting arranged.

The diamagnetic properties of water can be exploited by bringing strong magnets (e.g., neodymium magnets) near the source of vibration, changing the shape of the vibration surface due to the exertion of diamagnetic repulsive force on the membrane. The magnets can be part of the frame structure itself, arranged in a manner to impinge strong fields on the soap films attached to the surface.

Instead of soap films, thin latex rubber membranes can be used as the oscillating structures. Alternatively, elastic cords can be used for one-dimensional vibrations. In either case, the membranes can be loaded at different points to change the resonant behavior. Moreover, the membrane can be partially and/or completely coated with a highly reflective substance to create a pleasing lighting pattern, changing with the vibrations of the membrane.

Figure 40:
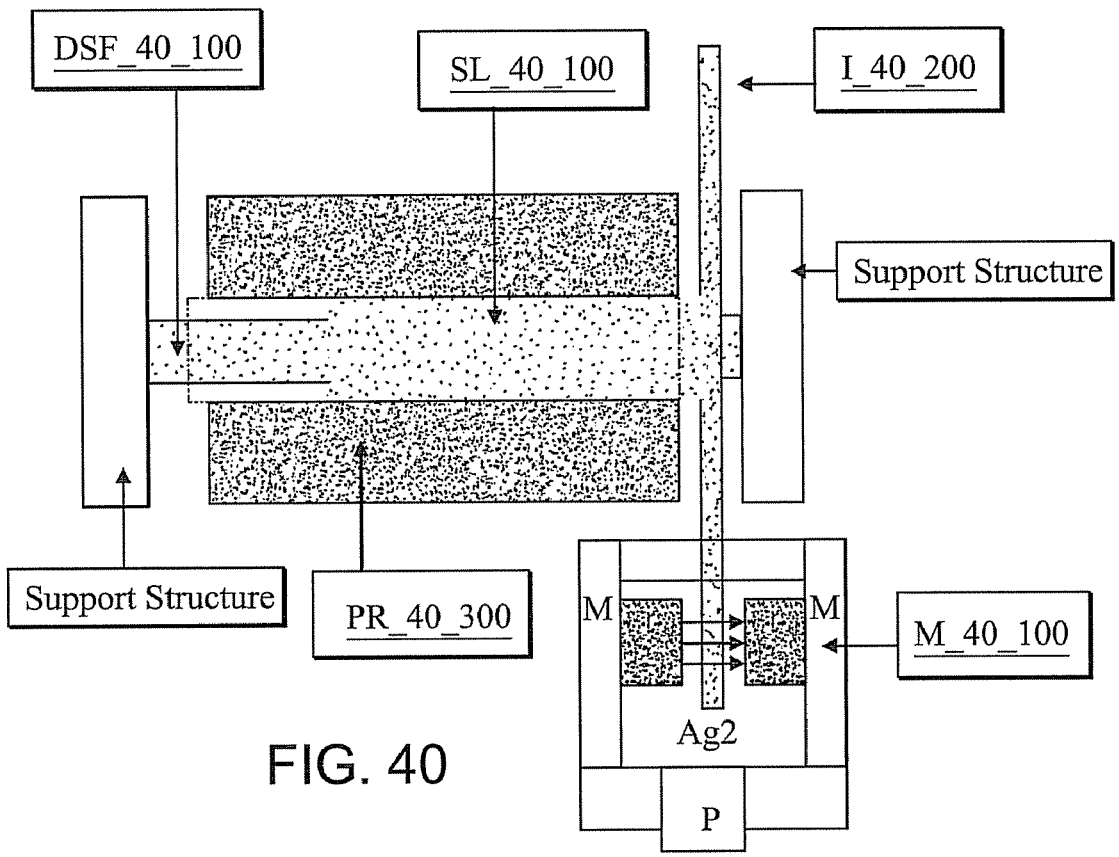
FIG. 40: Paper Dispenser with Inductive Speed Control (Exemplary Embodiment).

If, in FIG. 37, instead of the soap film frame SF37_300, we have a vibration table attached to shaft RS, a vibration testing jig is obtained, whose timing and hence vibration spectrum can be controlled. The spectrum of the vibration can be controlled at far lower cost compared to microprocessor-based servos, possibly at the expense of some accuracy and flexibility, The ideas can be applied to presses, e.g., for punching, forging, forming, etc., where the stroke force/speed profile can be accurately and predictably controlled during the entire stroke (forward, return, etc.). The same ideas can be applied to food processors, which can have their attachments display a "jerky" motion with high frequencies for improved food processing (mixing, mashing, cutting, etc.). The same ideas can be applied to washing machines, whose agitators can, be designed to have high-frequency motion components to dislodge dirt more effectively, Paper Roll Dispenser with Induction Speed Limiting FIG. 40 shows a paper roll dispenser with an induction member 140_200 revolving on a dispenser shaft having a sleeve on which the paper roll PR40300 is mounted using, e.g., a friction fit, The positioning of the magnet structurelg_40_100 with respect to the paper roll can be as desired to prevent interference to paper dispensing. Alternative structures can be used to provide inductive braking force to the paper roll. The apparatus can provide the following advantages:

A. large quantity of paper cannot be jerked out of the roll, minimizing wastage.

When the roll is spun to release the free end of the paper sheet, the risk of the roll over-spinning and releasing a large length of paper is greatly reduced.

Easier paper cutting, since the induction disk provides a restraining force.

By using an appropriate induction member, the restraining force can be changed during a cycle (as described in Section A and shown in FIG. 20). For example, the force can be increased to facilitate cutting of the paper, and then reduced to facilitate unrolling, etc.

Well Pulley with Induction Speed Limiting and/or Attached Dynamo

Figure 41:
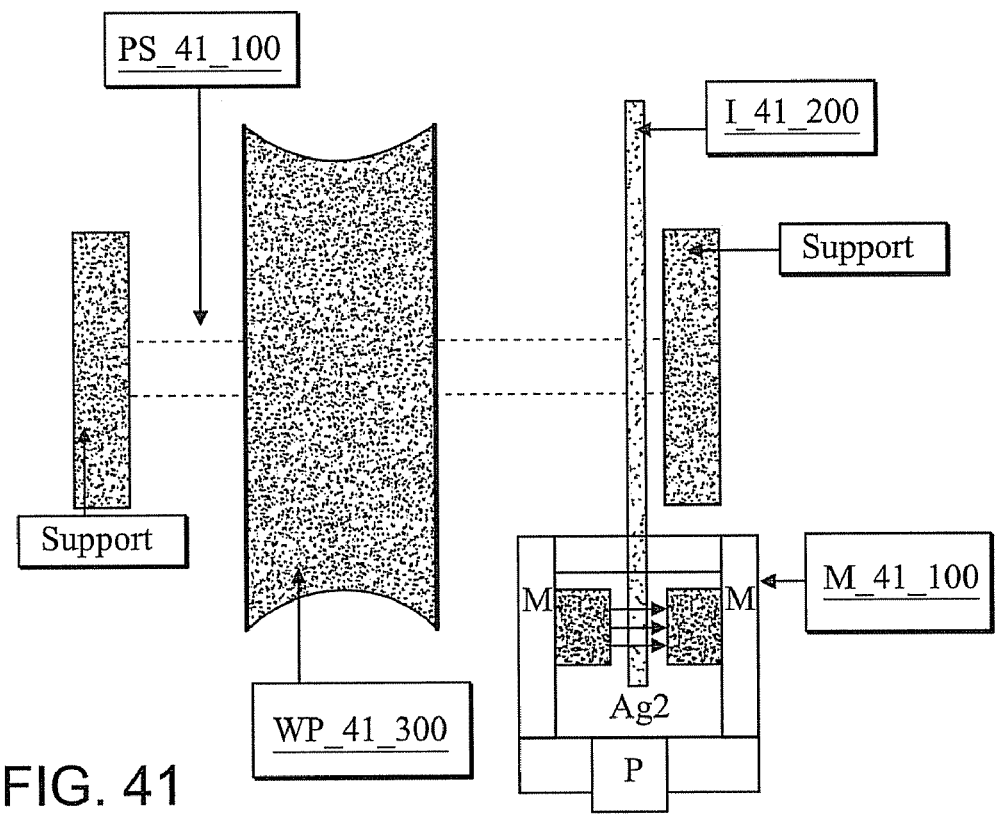
FIG. 41: Well Pulley Inductive Speed Control (Exemplary Embodiment).

FIG. 41 shows a pulley WP_41_300 for a water well, having an induction brake 1_41_200 attached to the pulley shaft. The water vessel tied to the rope (not shown for clarity) is restrained from dropping excessively fast into the well by the induction brake shown, designed as per Section A. This is especially beneficial to prevent living creatures in the well from being hurt by excessively high-speed impact of the water vessel, as well as to prevent damage to the water vessel itself by impact on rocks, etc., on the water floor, especially during dry seasons. Additionally, the potential energy of the water vessel can be harnessed by converting the induction brake into a dynamo.

Rotating Display Turntable with Variable Speed Control

Figure 42:
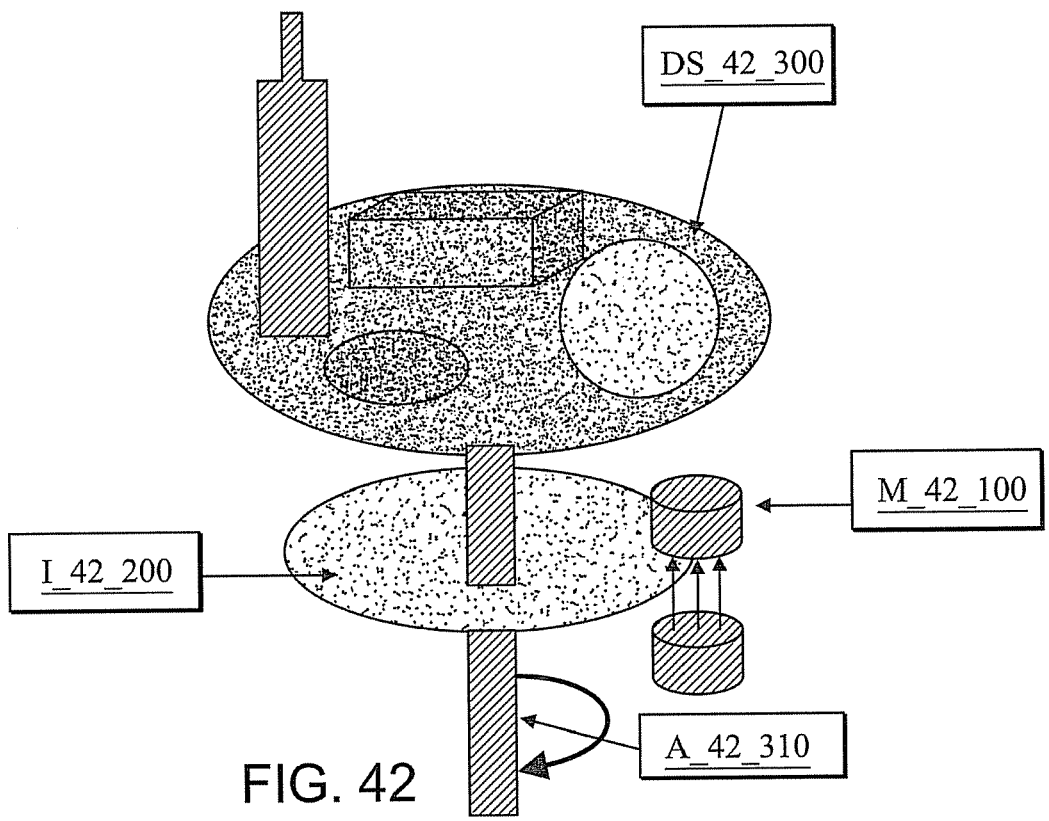
FIG. 42: Rotating Display Turntable, whose speed can be controlled using induction device.

FIG. 42 shows an exemplary display turntable, where a prime mover (exemplarily an electric motor, not shown) drives axle A_42310, possibly through a gearing mechanism. An arrangement of magnets M_42_100, inducing eddy-currents (or hysteresis effects) in induction member IM_42_200, enables the speed of rotation of the display shelf DS_42_300 to be controlled as desired. In an alternative embodiment, the prime mover drives DS_42_300 through a gearing mechanism, and the induction member IM_42_200 is located on the motor shaft, yielding high force/torque due to high speed rotation. The configuration of the induction member and magnets can be varied as described in Section A. This apparatus can provide the following advantages:

The rotation speed can be changed in a smooth trimmer, using methods outlined in Sections A-D. Indeed, the customer/viewer can be given control to vary the speed to suit.

The display can be directly driven by a motor without a gear train, provided sufficient induction force is generated by the magnets and induction member.

Without a prime mover (e.g., display moved by hand), we get a lazy-Susan turntable, and the invention applies equally to that apparatus. Instead of the display platform, if we have a water sprinkling head, we get a water sprinkler, whose speed of rotation can be controlled to suit. Replacing the display platform by a spool on which wire can be wound/rewound under, e.g., the power of a winding spring results in a cord rewinder (of use, for example, in vacuum cleaners) that can wind wire at a speed which can be set by the user. Attaching a fan to the platform enables the breeze to be swept at a desired pace through different portions of the room (the same can be done for oscillating fans, using control of speed of the oscillating mechanism as per Section E).

Rotating Display Turntable with Cutout and Variable Timing Control

Figure 43:
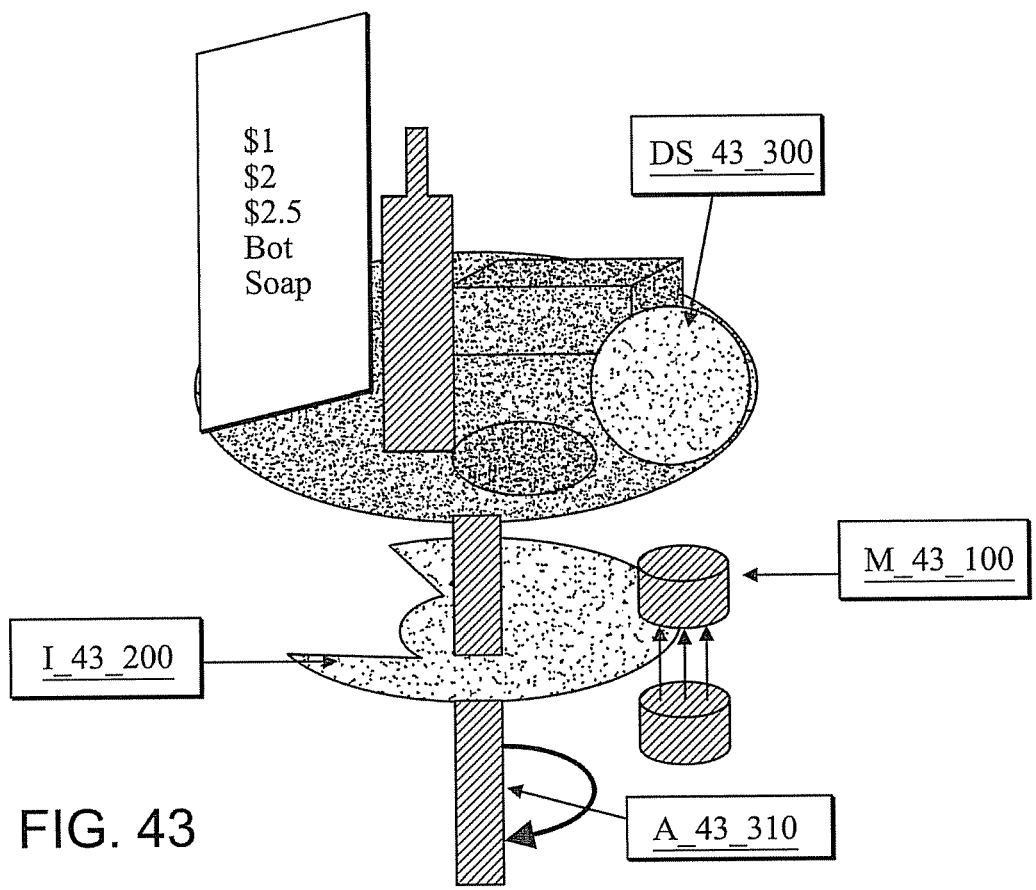
FIG. 43: Rotating Display Turntable, whose speed can be controlled using induction device, with cutout.

In FIG. 43, the display turntable has an induction member IM_43_200 with a cutout, which enables quick "return" of the display objects from positions where they cannot be conveniently viewed. FIG. 43 shows a case where we have a price sheet behind the objects. When the back of the price sheet appears in front, the display turntable turns fast to maximize the amount of time the viewers (assumed to be in front) are able to view the displayed items. The induction member can have different cutouts, possibly multiple, with varying thickness, slots, perforations, may be of different materials, etc., as outlined in Section A. In an alternative embodiment, the prime mover drives DS 43_300 through a gearing mechanism, and the induction member 114 43 200 is located on the motor shaft, yielding high force/torque due to high-speed rotation. Cutouts can be located on IM_43_200 to obtain high-frequency variations of speed, and auxiliary mechanisms can be used to move M_43_100 exemplarily either axially or radially to obtain slower control of speed (see the discussion of the timing CAM of FIG. 47(c). Several induction members and magnets of different properties can be jointly used, as also outlined in Section A.

Without a prime mover (e.g., display moved by hand), we get a lazy-Susan turntable, and the invention applies equally to that apparatus. Instead of the display platform, if we have a water sprinkling head, we get a water sprinkler, whose speed of rotation can be controlled in a non-uniform fashion to preferentially water certain areas. Replacing the display platform by a spool on which wire can be wound/rewound under exemplarily the power of a winding spring results in a cord rewinder (of use, for example, in vacuum cleaners) that can wind wire at a non-uniform speed whose average can be set by the user. Attaching a fan to the platform enables the breeze to be swept at a non-uniform pace, through different portions of the room. The average pace can be set as desired. The same can be done for oscillating fans, using control of speed of the oscillating mechanism as per Section 1F.

Rotating Display Turntable with Programmable Cutout

Figure 44:
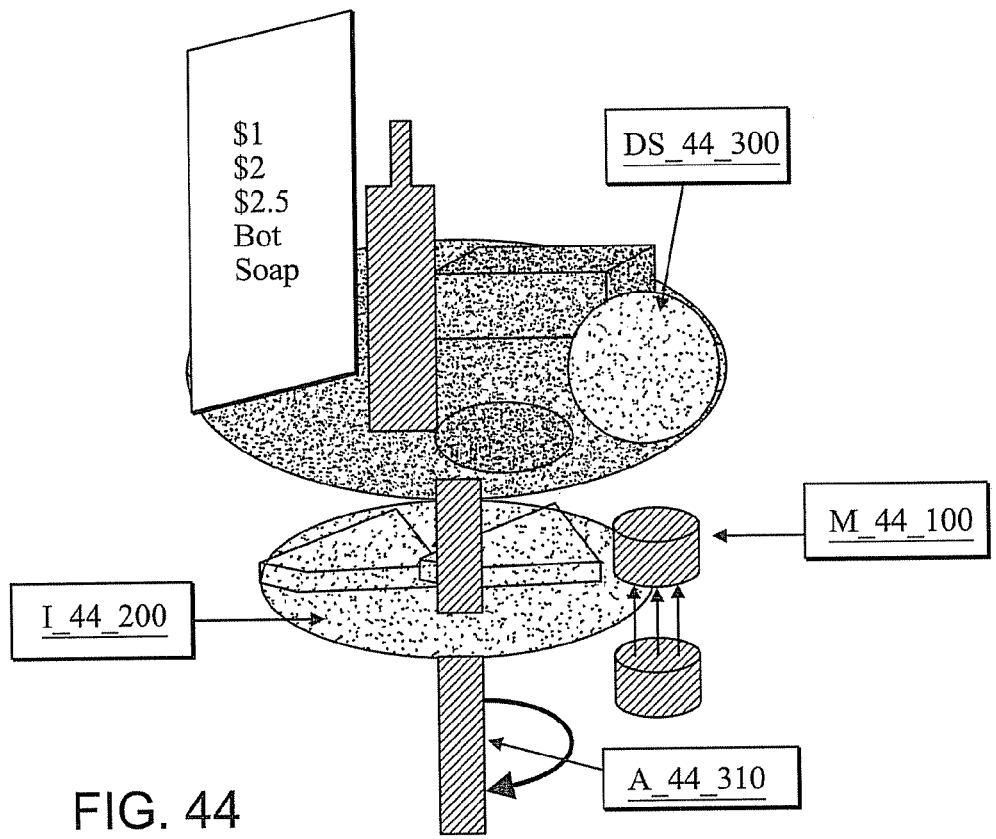
FIG. 44: Rotating Display Turntable, whose speed can be controlled using induction device, with cutout, which can be optionally programmable

In FIG. 44, the display turntable has an induction member IM44_200 with a programmable cutout as per Section A, Section D, and FIG. 24, which enables the quick-return and slow-display portions to be chosen by the user, after positioning the display objects. Thus, objects having different angular extents can each be conveniently positioned and shown for the optimum amount of time, In an alternative embodiment, the prime mover drives DS_44_300 through a gearing mechanism, and the induction member IM_44_200 is located on the motor shaft, yielding high force/torque due to high-speed rotation. Programmable cutouts can be located on IM_44_200 to obtain high-frequency variations of speed, and auxiliary programmable mechanisms can be used to move M_44_100 exemplarily either axially or radially to obtain slower control of speed (see the discussion of the timing CAM of FIG. 47(c)). This programmability can exemplarily be the ability to insert metallic members in slots (as in FIG. 24), but instead of generating induction forces, these metallic members move the position of magnet assembly M 44 100. In general, there can be multiple magnets and multiple induction members, some or all of which can be programmably changed as per Section A, Section D, and FIG. 24.

Without a prime mover (e.g., display moved by hand), we get a Lazy Susan turntable, and the invention applies equally to that apparatus. Instead of the display platform, if we have a water sprinkling head, we get a water sprinkler, whose speed of rotation can be controlled in a non-uniform user customizable fashion, to preferentially water certain areas. Replacing the display platform by a spool on which wire can be wound/rewound under exemplarily the power of a winding spring results in a cord rewinder (of use, for example, in vacuum cleaners) that can wind wire at a non-uniform speed whose time profile can be set by the user. Auxiliary mechanism (see the CAM discussion in FIG. 47(c)) can be arranged to make the entire apparatus act only at the extremities of the cord to prevent either yanking the cord out of the spool on one end, or a power plug at the other end from hitting a stop very hard. Attaching a fan to the platform enables the breeze to be swept at a non-uniform pace through different portions of the room. The detailed timing can be set as desired. The same can be done for oscillating fans, using control of speed of the oscillating mechanism as per Section E.

Rotating Doll

Figure 45:
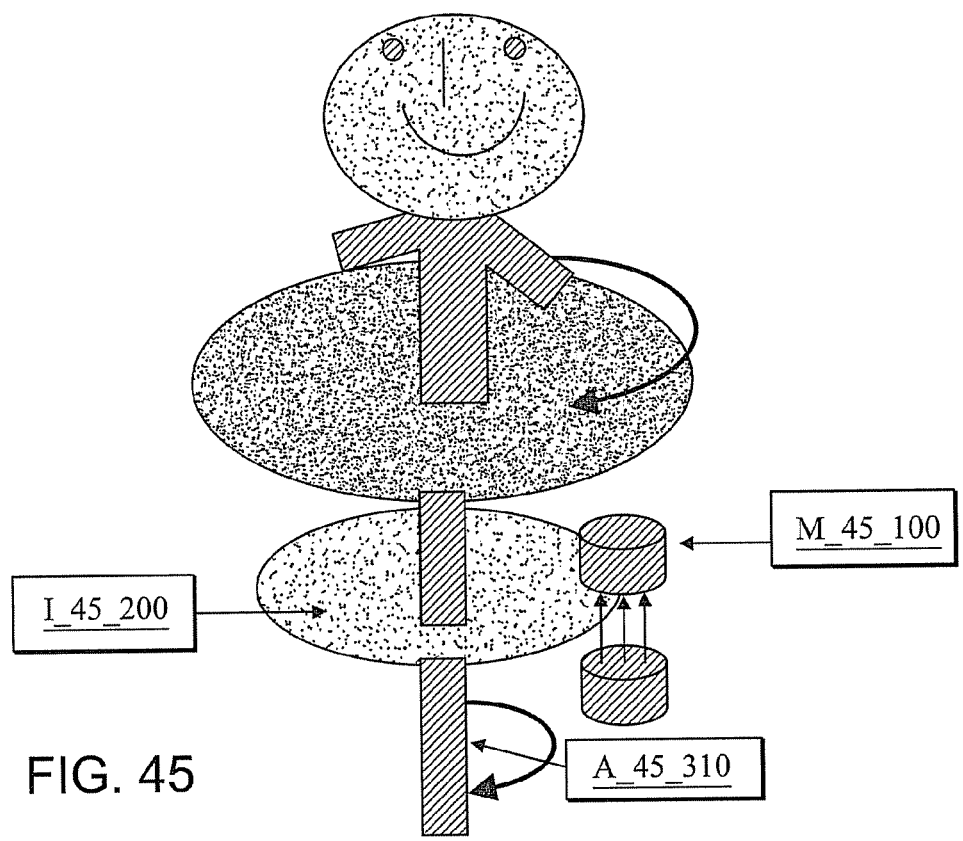
FIG. 45: Rotating Doll, with speed programmably controllable, possibly in a non-uniform fashion.

The doll of FIG. 45 rotates at a speed that can be viewer-controlled, using controllable induction force generated by an induction member IM45_200 interacting with one or more magnets M_45_100. The motion may be uniform or non-uniform, and may be optionally changeable by the user by the insertion of optional induction members in slots provided for this purpose, as discussed in Section A, Section D, and FIG. 24. Exemplary embodiments of this apparatus are:

A rotating doll, whose rotation speed can be user-controlled, with multiple viewing positions (multiple cutouts). The doll can face more than one viewer at different positions for the maximum length of time.

A rotating doll, whose rotation speed can be user-controlled, with programmable, multiple viewing positions. This doll can face an arbitrary number of viewers at different positions for the maximum length of time.

The resultant timed motion may be utilized for many purposes, exemplarily, production of musical-notes by other apparatus (not shown) attached to doll apparatus. For example, music can be played by attaching a circular tuning fork with teeth to the axle, which periodically contact a stationary hammer. A rotating switch on the axle can make lights blink, etc. In general, any timed, electrical/mechanical/acoustic waveform can be generated from the timed motion.

Rotating Lollipop

Figure 46:
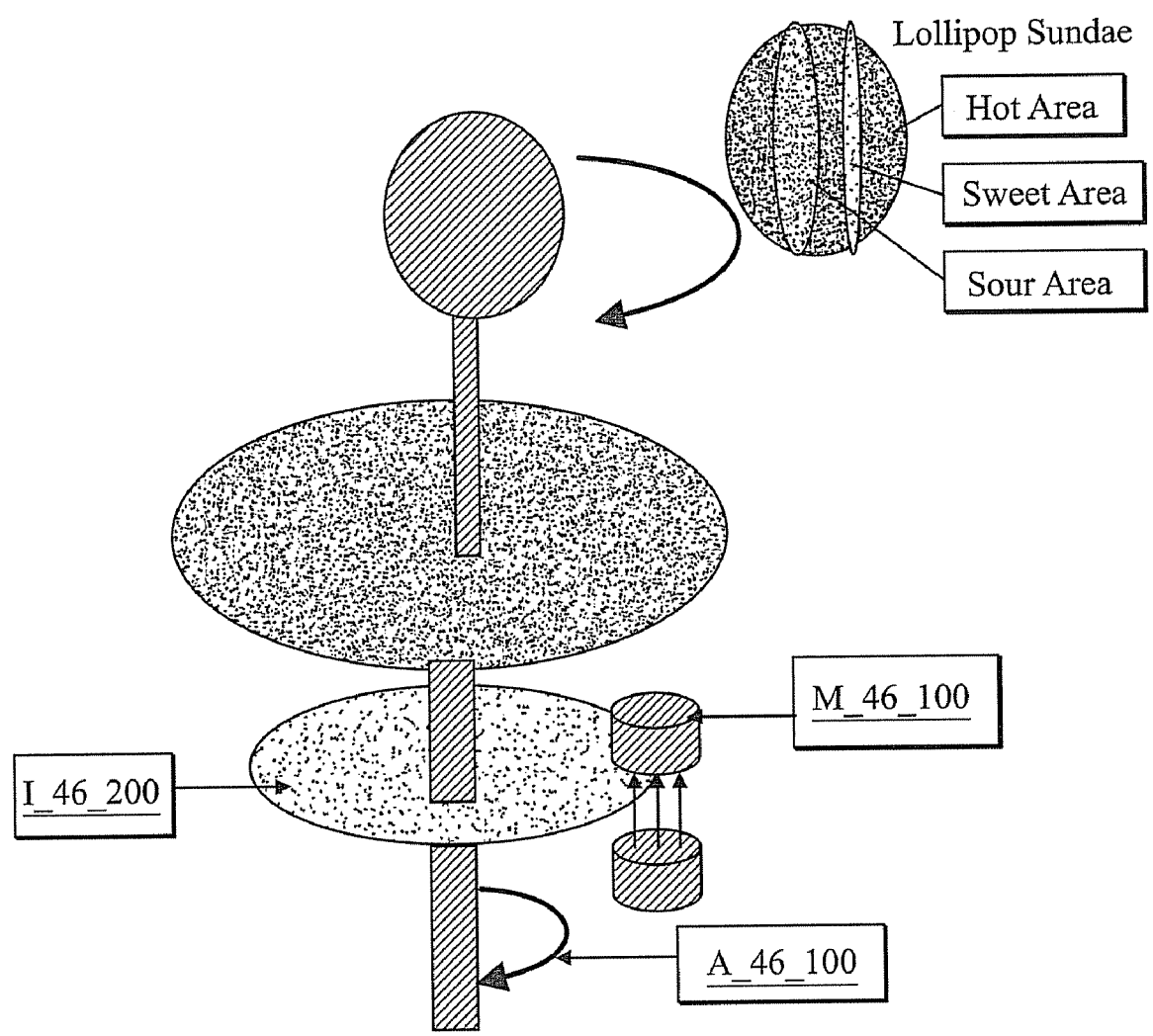
FIG. 46: Rotating Lollipop with speed programmably controllable possibly in a non-uniform fashion.

FIG. 46 shows a lollipop that rotates at a speed that can be taster-controlled, using controllable induction force generated by IM_46_200 in the presence of magnets M_46_100. Use of multiple cutouts in the induction member as discussed in Section A. Section D, and FIG. 24 enables the speed of rotation to be varied in a single cycle for more variety.

Multi-taste "lollipop sundaes" can also be made and automatically tasted (e.g., sweet 50% of the time, sour 10%, hot 40% of time). The lollipop may be different from the illustration, e.g., it can have an inner sweet core, surrounded by shells of sweet, sour, and hot, etc. The speed of rotation will determine the speed of transitioning from hot to sweet and the "dwell time" on any taste, thus adding more variety.

Magnetic Cam

The timing control disk R_21_200 of FIG. 21, rotating around axle A_47_400 can be alternatively regarded as a CAM. By driving A47_400, with e.g., a constant torque, this CAM generates any desired function of angular position of axle A47_400 over time (as in FIG. 47(b)), by appropriately controlling the braking forces/torques, as per Sections A-F. For example, the braking force in slotted area SL_47_300 is intermediate between the full cutout and the solid portion. If autonomously magnetic members are used, the timing is changed in a dissipationless manner.

Figure 47A:
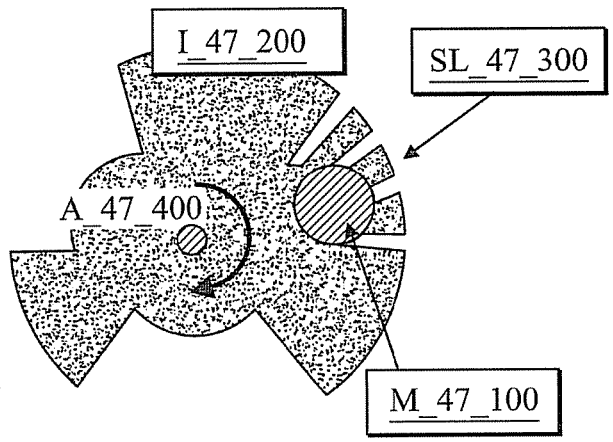
FIG. 47: a) Timing Control Induction Disk, used as a timing CAM (b) Angular Position as a function of time, for a constant position of magnet M_47_100, relative to axle A_47_400. Braking Force/Torque in slotted area SL_47_300 is intermediate between full cutout and solid area. (c) Auxiliary mechanism Me_47_500 simultaneously moving magnet M_47_100 outwards relative to axle A_47_400 (d) Angular position as a function of time resulting from the motion of (c), showing periodic variations corresponding to rotation, and a general slowing down due to movement of magnet M_47_100 (e) Pulsating Force/Torque corresponding to (d). The force/torque profile is illustrative only and the achieved force versus time profile may differ from illustration. (f) Brake turn-on time profile; and (g) CAM cross section at C_47_100.
Figure 47B:
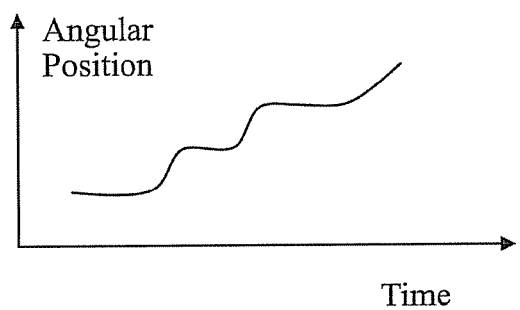
Figure 47C:
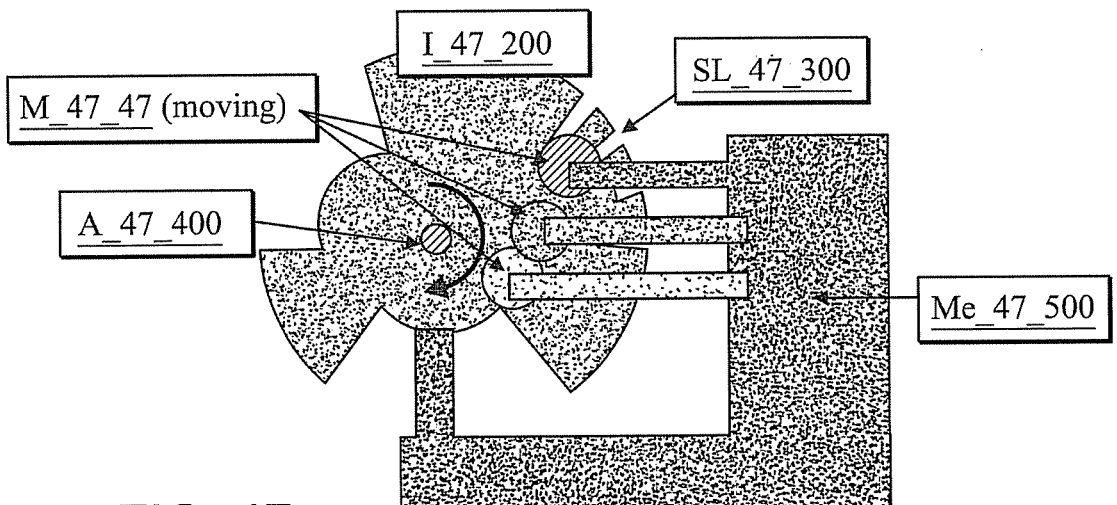
Figure 47D:
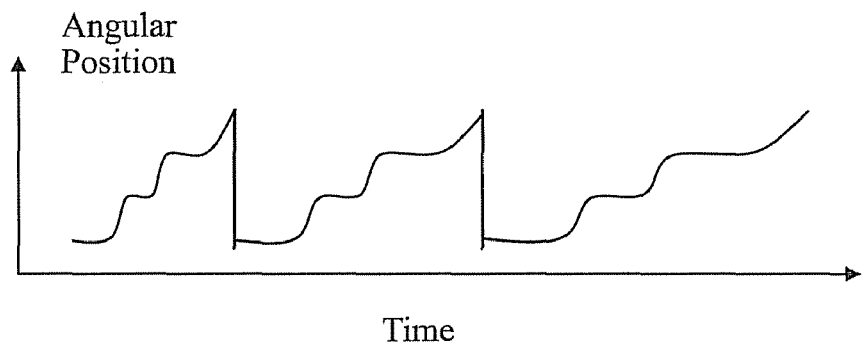
Figure 47E:
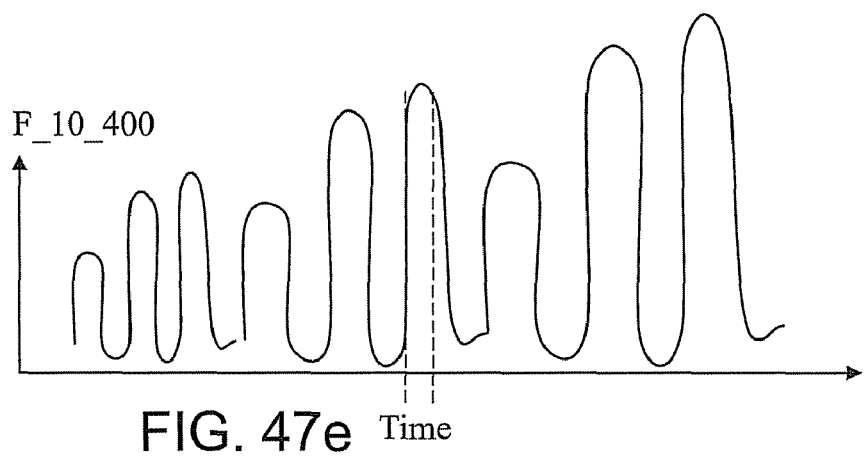
Figure 47F:
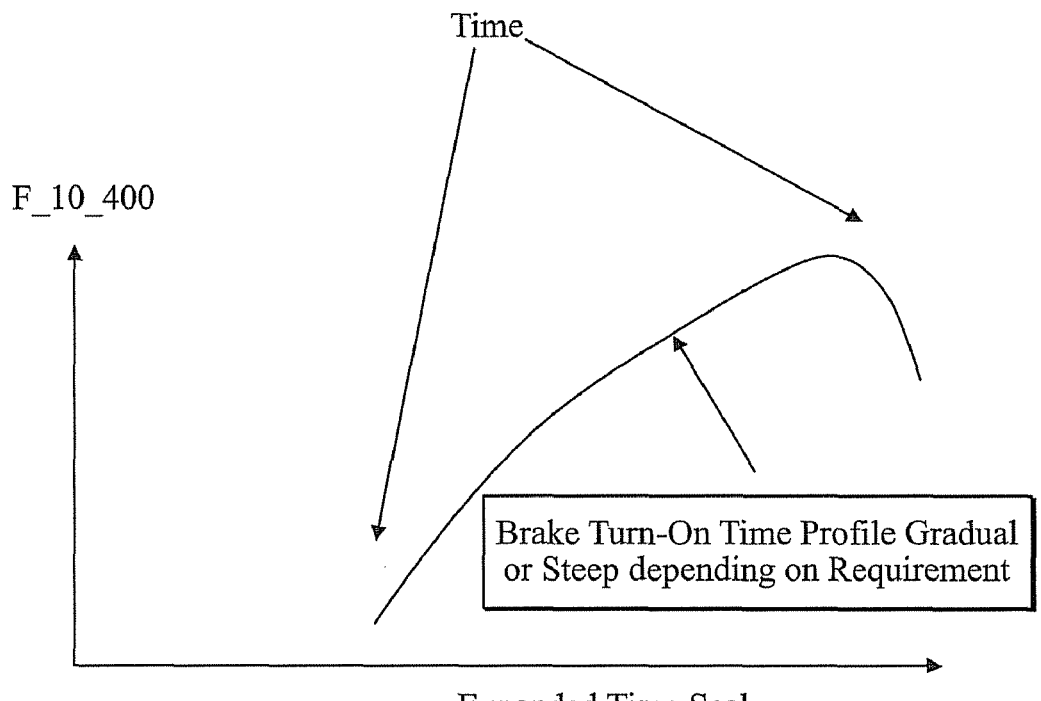
Figure 47G:
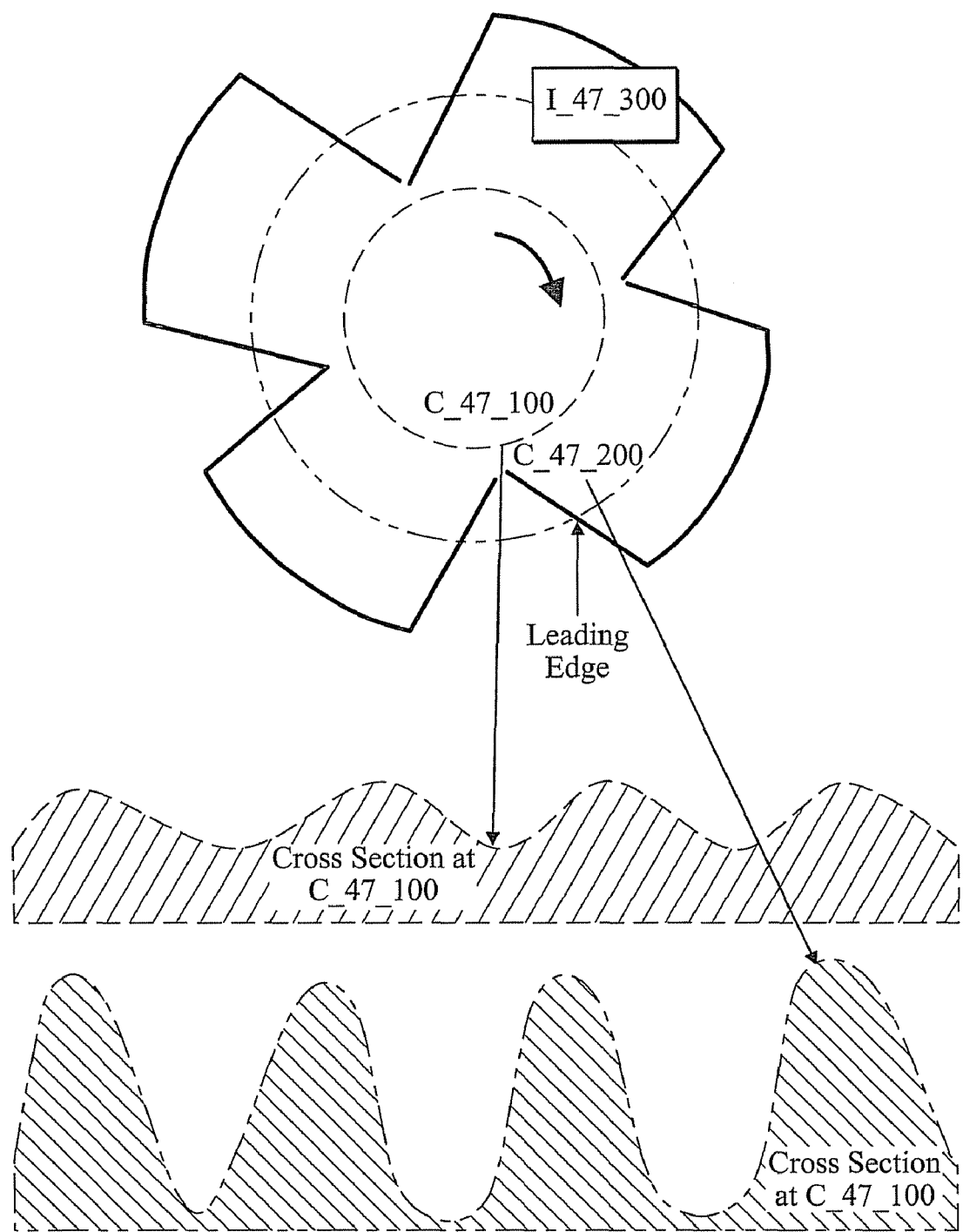

FIG. 47(c) shows a variant, where an auxiliary mechanism Me 47_500, connected to both axle A 47 400 and magnet M_47_100, simultaneously moves magnet M_47_100, for example, outwards relative to axle A 47 400. FIG. 47(d) shows the resultant angular position of axle A_47400 as a function of time. The angular position shows periodic variations corresponding to rotation of axle A_47400, and a general slowing down due to movement of magnet M_47_100, offering more timing control. The mechanism Me_47_500 can move M47_100 in a cyclic manner also (radially or axially outwards, inwards, outwards, inwards, etc.). If R 47 200 is an induction member, then it can be rotated at high speed to generate high force/torque, while average timing is changed at a slower period by the mechanism Me_47_500. FIG. 47(e) shows the resultant pulsating braking force/torque, whose average increases (assuming a constant torque drive to axle A_47_400). This ability to independently control average force and timing is very useful in many apparatus like turntables, drawers, etc., where the force required can be high and simultaneously the operation cycle is long. The ability to generate pulsating forces is applicable to automobile anti-lock brakes. Indeed FIG. 47(c) can depict an automotive anti-lock brake system, where mechanism Me47_500 is the brake control, and R 47 200 is a slotted induction disk, e.g., slotted uniformly at its circumference. Pulsating forces, whose pulse shape and magnitude as a function of wheel angular position can be accurately controlled and changed in milliseconds can be obtained for anti-lock braking, faster than existing hydraulic systems. The apparatus, since it can be used with permanent magnets, potentially offers higher reliability than alternatives using electromagnets on completely solid induction members (the two methods can be used in conjunction). The outward motion of magnet M_47_100 relative to A_47_400 can be replaced by any of the variants (e.g., axially outward motion as in FIG. 3, flux path reluctance change as in FIG. 5, etc.), and hysteresis/autonomously magnetic members can also be used, as described in Sections A-F.

Figure 48:
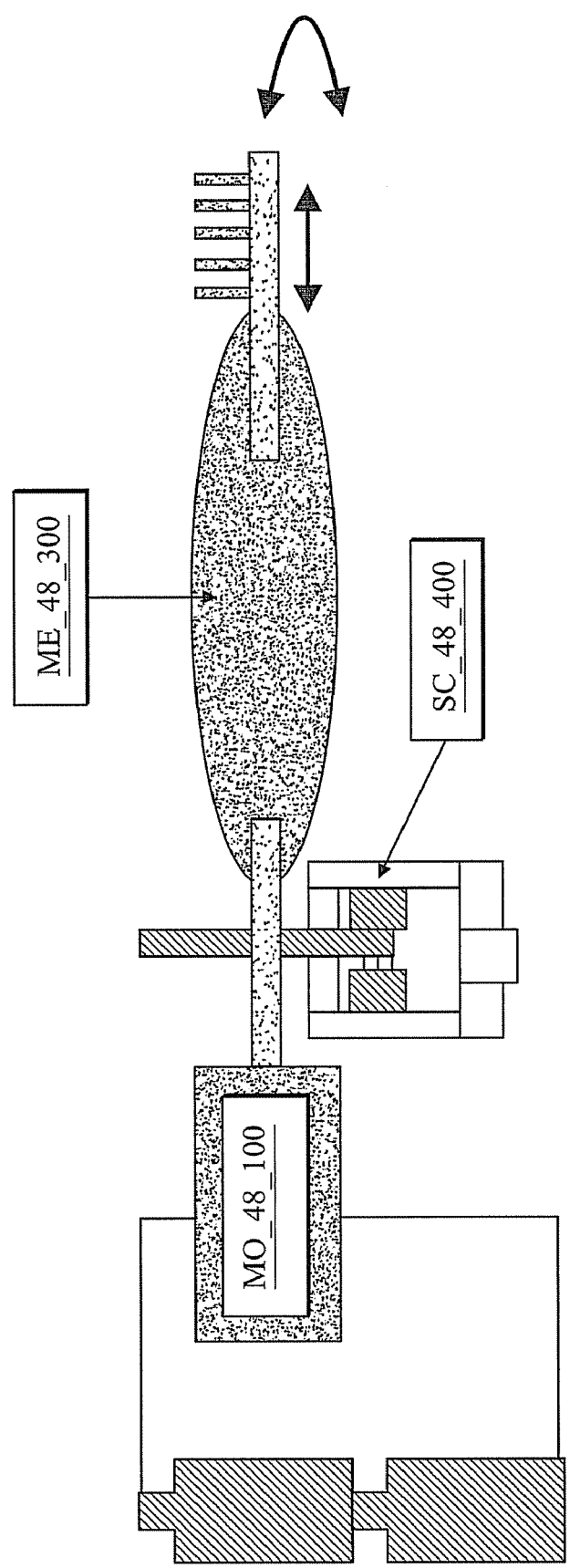
FIG. 48: Powered Toothbrush with speed control SC_48_400 using speed control as per Sections A to E. ME_48_300 is the brush mechanism, converting rotation of the motor to the brushhead's rotation/oscillation.

All this creates a new apparatus, a CAM based on magnetic attraction/repulsion and/or induction/hysteresis principles, whose timing/force profile can be designed to suit, possibly in a programmable fashion, Toothbrush with Speed Control FIG. 48 shows a powered toothbrush, exemplarily powered by 2 AA/AAA batteries. The motor rotation is converted by a general mechanism ME_48_300 to the brush-head's rotation/oscillation. Speed control is achieved by apparatus SC_48_400 following the techniques in Sections A-E. Motor (and hence brush-head) speed can be controlled in a smooth and non-stick fashion, using the speed-control techniques outlined previously, in any of its variants (Sections A-F). Various embodiments of this invention include the following:

- Using an induction disk with magnets that can be moved axially or radially using mechanical means well known in the state of art. This enables the brush speed to be controlled for best brushing comfort.
- Using cutouts in the induction disk, which enables speed to be changed at different positions of the brush head, thus increasing brushing comfort even more. If the induction disk is connected to the drive shaft of the motor, the speed periodically varies with each motor revolution.
- Using induction members and magnets in the mechanism connecting the motor shaft to the brush head, which enables the speed of the brush-head movement to be controlled in a possibly non-uniform fashion for maximum comfort. Depending on the location of the magnets and induction members, the speed variation may be periodic with each motor revolution, periodic with each oscillation/rotation cycle of the brush head (typically lower), etc. The design of the magnets and induction members, for any desired speed variation of the brush head, is as per the discussion on general mechanisms in Section E.
- Using programmable cutouts in the induction disk or induction member (in the brush-head mechanism) enables the user to customize the speed profile of his or her brush for maximum comfort.
- Use of Power Transmission Control in the form of an eddy-current clutch enables the mechanism to smoothly disengage if the brush head encounters too much resistance in the mouth, enhancing safety.
- Use of a hysteresis member or multiple autonomously magnetic interacting members can allow rest states of the toothbrush to be as desired. In one embodiment, the bristles can be magnetically "retracting" in a rest position for safety, emerging only during brushing.

While we have shown one embodiment, where the drive to the motor is directly from the battery, this is not necessary. The motor drive may itself be modulated by electronic techniques well known in the state of art (e.g., pulse-width modulation), especially at higher voltages (e.g., 3-4 batteries).

Drawer with Induction Brake

Figure 49A:
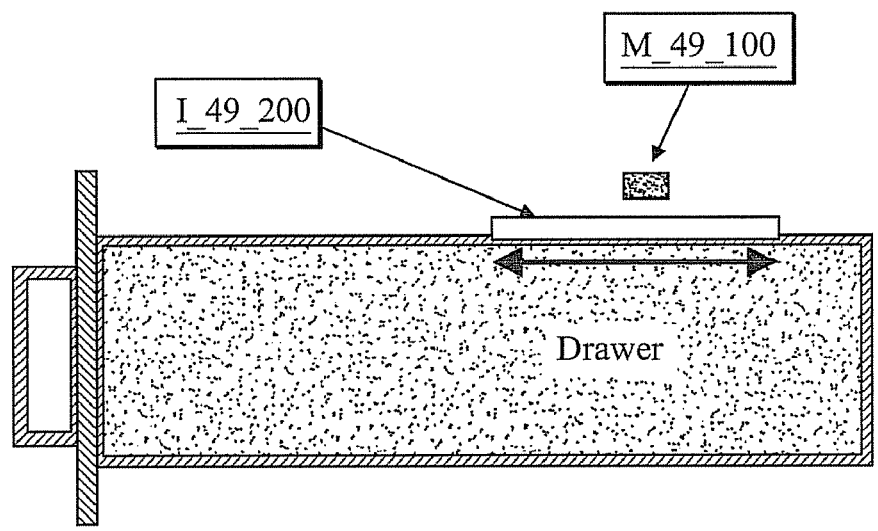
FIG. 49: Drawer with induction brake to prevent excessively violent opening/closing. (a) Top View (b) Side View of one embodiment, including gearing mechanism (gearing details not shown).
Figure 49B:
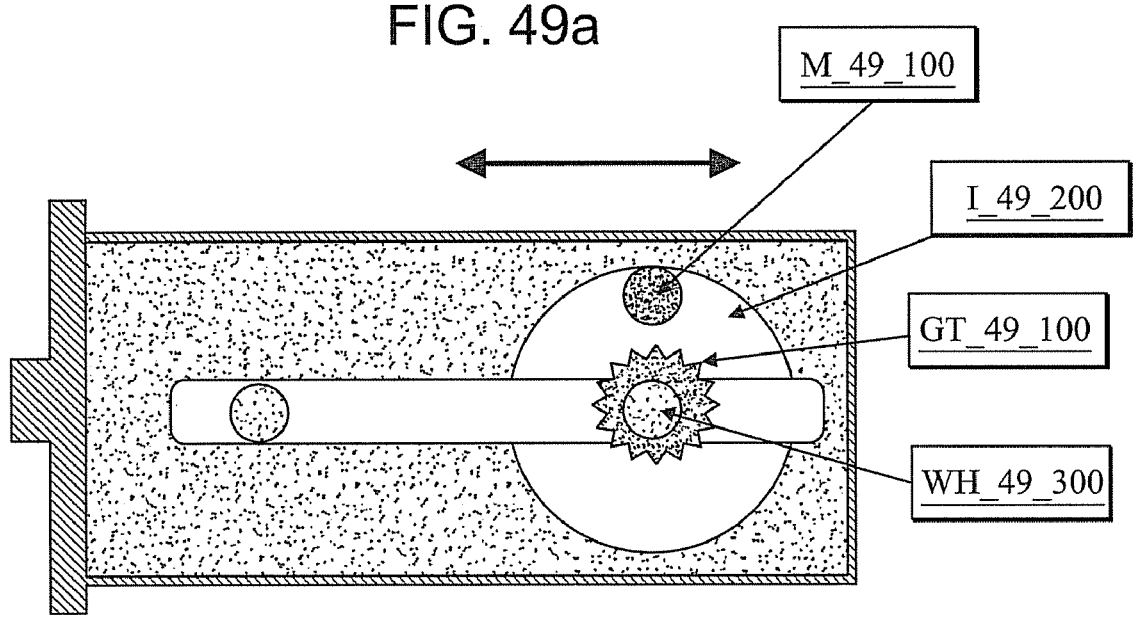

FIG. 49(*a*) shows magnet/magnet assemblies M 49_100 (attached to a table not shown) inducing eddy currents in induction member (a strip or a disk) Ilv1_49_200 attached to the side of a drawer. The generated inductive force slows down drawer opening/closing. There can be multiple induction members on the side of the drawer to generate retarding force at various desired drawer positions. Gears may be utilized to increase the relative velocity between the induction members and the magnets, as described below with regard to the hinged device. For example, in FIG. 49(*b*), the drawer glide wheel GW_49_300 is attached to a speed-increasing gear train (details omitted) driving the induction disk IM_49_200. Magnet M_49 100 installed on the drawer support generates large braking forces in those positions of the drawer that cause IM_49_200 to come near M_49_100.

For example, the drawer motion can be braked near the completely open and/or completely closed positions. Drawer opening/closing speed can be regulated using all the force control methods outlined previously (e.g., Sections A, D, and p. The stray magnetic fields generated can be reduced by magnetic shielding using back-iron, etc., well known in the state of art.

Ejector/Latching Mechanism

The invention can be applied to controlling the ejection speed in ejectors (latching speed in latches), using induction/hysteresis/forces or forces between multiple magnets. This is very useful in (1) floppy disk/CD/DVD drives to prevent floppy disks/CD/DVD's from being violently jerked out during the ejection process, (2) tape/VCR players to prevent the tapes from being violently jerked out, etc. In addition, the potential to control mechanism speed can enhance reliability of these devices.

Figure 50:
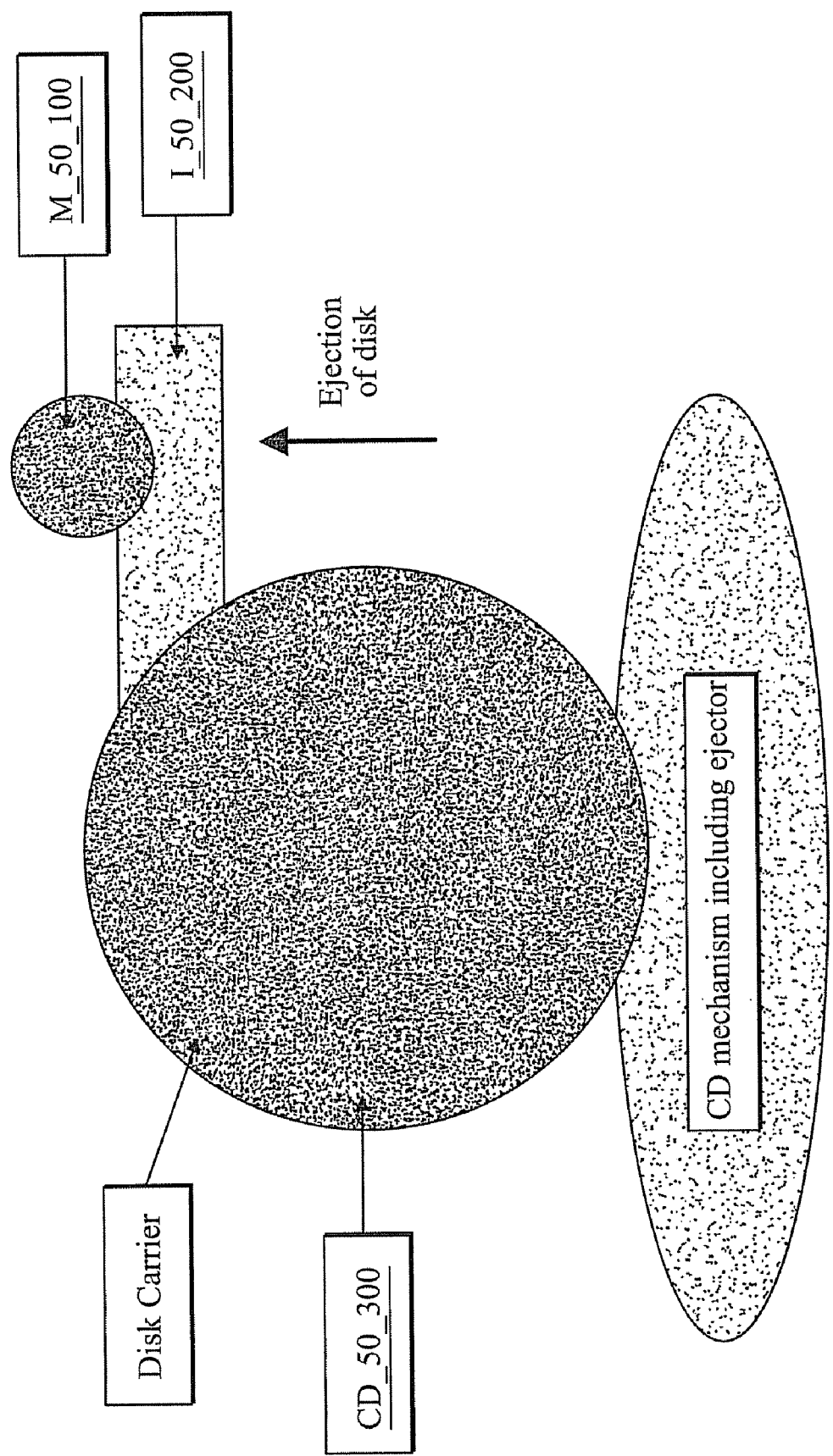
FIG. 50: CD mechanism incorporating induction braking to prevent violent ejection.

FIG. 50 shows such an embodiment, where an induction member IM 50200 in proximity with a magnet M_50_100 applies braking force to the disk or the disk carrier during ejection. Force is also applied during insertion, but that is typically much less due to the low insertion speeds. The high speed during "latching" of the CD (CD_50_300) can also be controlled using the same or additional induction members and/or magnets. For floppy drives/VCR's, the induction members can be attached to the mechanism members themselves, since carriers are not typically used for these devices. In summary, the speeds of the entire mechanism and all attachments (disks, tapes, etc.) can be regulated to enhance safety and reliability. Exemplarily, switches that do not "snap" suddenly can be designed. The same ideas can be applied to food processing items like bread toasters, where the toast will come up gently, based on the ejector mechanism being braked. Similarly, umbrellas that open slowly can be designed.

The mechanism admits of all the variants using possibly hysteresis effects, multiple autonomously magnetic interacting members, magnet/induction/hysteresis members of different geometry, etc., as per Section A.

Hinged Device

Figure 51:
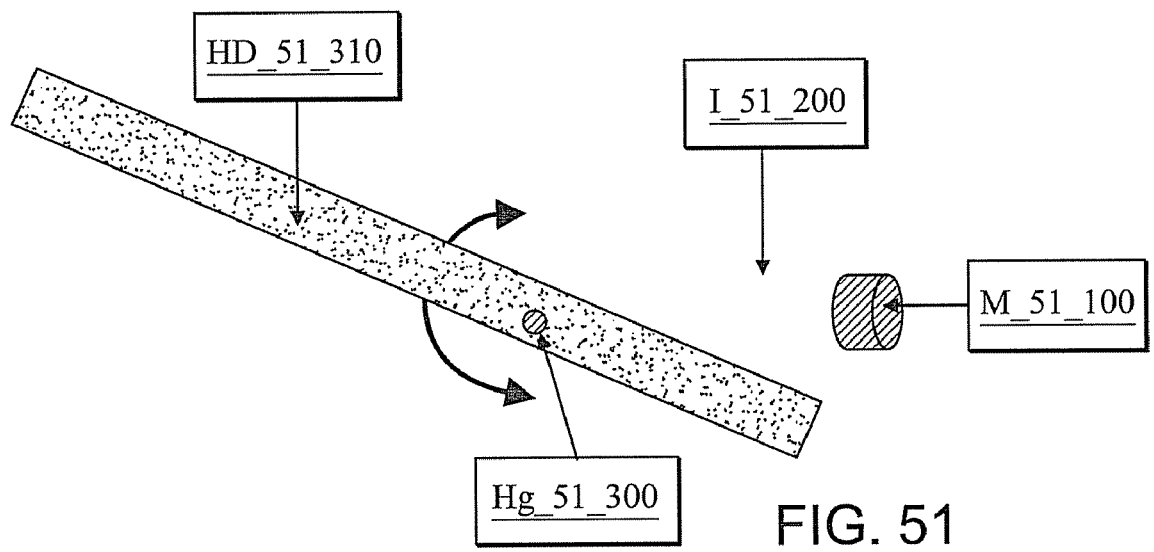
FIG. 51: Apparatus using a hinge, enhanced to reduce excessively high-speed operation.

FIG. 51 shows a hinged device HD_51_310 rotating around hinge H_51_300 being "braked" when induction member IM_51_200 is near magnet (magnets) M_51_100. HD_51_310 can exemplarily be:

(a) A door,
(b) An oven door,
(c) A car door, car trunk door, car hood, (d) A washing machine door,
(e) A toilet seat,
(f) A suitcase lid, or
(g) A lid for a plastic bin.

Additional mechanism may be present to transmit the hinged device HD_51_310's motion to the induction member. For example, a long lever arm or a gear system (with one or more gears) may be used to give a higher speed to the induction member, and hence higher force/torque (e.g., the bin lids in FIGS. 52-54). The force/torque can be non-uniform, following any of the techniques described previously (e.g., Sections A, D, and E).

Figure 52:
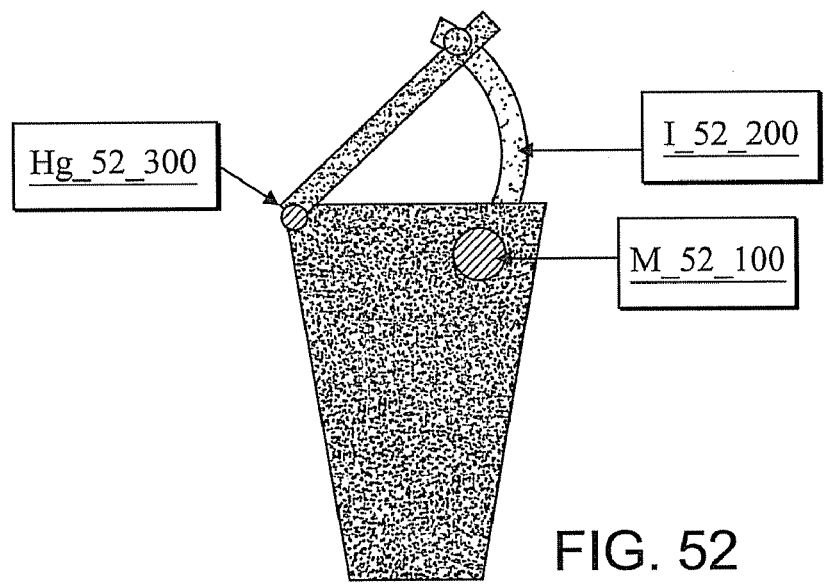
FIG. 52: Induction Speed Limiting for bin lid. Induction Member positioned near edge of lid for maximum speed.

For example, in FIG. 52, induction member IM_52_200 and magnet M_52_100 are both at the edge of the lid, resulting in higher speed, force and torque. In FIG. 53, induction member IM_53_200 is driven at higher (angular) speed than the bin lid by the use of a gear train (speed-increasing gear train). Torque on bin-lid hinge H_53_300 increases due to both (1) higher speed of induction member IM_53_200 relative to magnets M_53_100 and (2) gear train lever arm (mechanical advantage). Gears G_53_400 (large) and G_53_410 can be of any type, where spur gears are shown in the illustration.

Figure 54:
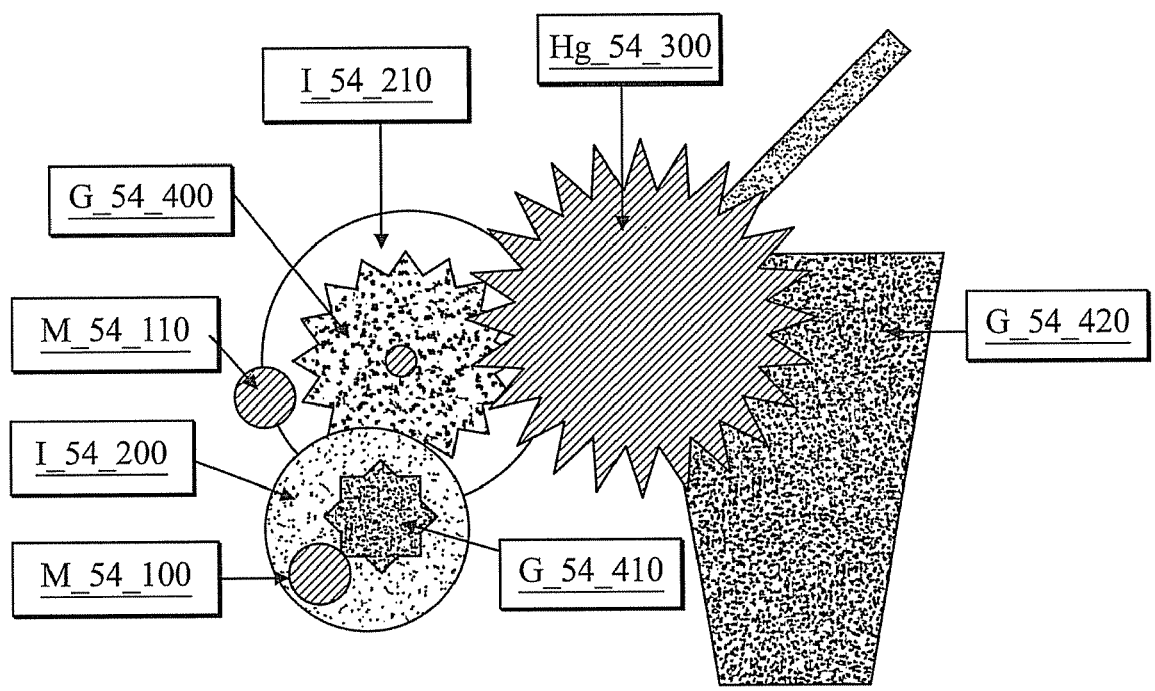
FIG. 54: Induction Speed Limiting with multiple gears for bin lid.

FIG. 54 shows a variant using multiple gears. Gears G_54_400, G_54_410, and G_54_420 are shown, along with two induction members 1IM_54_200 and IM_54_210, and associated magnets M_54_100 and M_54_110. The presence of two induction members and associated magnets allows increased control of the torque exerted by the system on hinge H_54_300, as a function of angular velocity of the aforesaid hinge H_54_300. The presence of two (in general, multiple) magnets and associated induction members enable the decrease of force at very high speeds, due to the skin effect to be compensated for. In this example, IM_54_200 rotates at a higher speed compared to IM_54_210, and hence encounters the skin-effect force reducing speed regime earlier. In this situation, the continued increase in force of IM_54_210 with respect to speed provides partial compensation for the reduction in force of IMP_54_200.

Adjustment/Angular Position Pedestal for Flower Pots and Other Objects

This is an example where undesirable motion should be prevented. FIG. 55 shows a pedestal F_55_300 with a ferromagnetic material on its surface (e.g., iron plate) and with magnetically attached platforms (with magnets and flux return paths), whose heights can be varied anywhere on the pedestal. Pots and other objects can be placed on the platforms, and the heights varied as desired. Magnetic field modulation techniques as per Section A, where pole pieces can be inserted, the magnetic flux return path changed, etc., can be used to quickly attach and/or release the magnetic platforms from the pedestal. To increase holding force, the magnets may have both north and south poles contacting the ferromagnetic pedestal surface.

Stability of attachment can be provided in several ways. Mechanical guides/slots can be provided to prevent the pots from tipping over sideways and also provide additional support to prevent the magnets from coming loose from the pedestal. In another embodiment, the surface of both the pedestal and the magnets can have matching grooves, projections, or general texture. In FIG. 56, for example, the surface of the pedestal F_56_300 can have shallow grooves into which small projections from the surfaces of the magnet/magnets M_56_100 fit snugly.

In addition to height, the angular position of the platforms can be adjusted if (1) a cylindrical ferromagnetic pedestal is used (e.g., a steel pipe) and/or (2) magnets and flux return paths having a cylindrical surface exactly matched to the pedestal (including any grooves/projections/texture) are used. The same idea can be embodied in a spherical pedestal with ferromagnetic material possibly with grooves/projection/texture on the surface providing attachment to platforms/clips, which have magnetic attachments to the surface. The surfaces of the magnets will have projections/grooves/texture matched to those of the spherical pedestal. In general, a pedestal having any desired surface contour can be used together with matching magnets.

Since the platforms are detachable, means of minimizing field leakage when the platforms are not attached can be used and can consist of ferromagnetic covers matched to the surface of the magnets.

Alternative embodiments of the same idea include a showerhead whose height/angular position can be adjusted, a tap whose height/angular position can be adjusted, etc. In general, a support with an arbitrary surface contour, capable of firmly gripping an object at a continuously adjustable height/angle I position can be created using such "textured" magnets.

Magnet Wiring Clip

FIG. 57 shows a magnetic clip for routing cabling, which has one or more clips C_57_400 and a magnetic base M_57_100 to hold the cables Ca_57_410 at any desired position in proximity with any object (e.g., a shelf) that is ferromagnetic, labeled F_57_300. Exemplarily, the clips may be attached to the sides of computers at any desired positions, and the computer cables conveniently routed.

An Unconstrained Mechanism: Carom, Billiards, and Snooker Enhanced with Magnetics The carom board shown in FIG. 58 has (a) magnets IVI58_100 placed beneath the board and (b) strikers S_58_310 and pieces Pi_58_300 optionally with induction members inserted. By suitable design (e.g., hollowing out the strikers and pieces), it is possible to have their mass be identical to that of a piece without an induction member. The collection of strikers, pieces, and magnets constitutes a mechanism with a planarity constraint (since they have to be on the carom board), and constraints imposed by the sides of the board. The forces exerted on the induction members by the magnets will influence the path of the strikers and/or the pieces and thereby add variety to the game.

Variants include placing (a) magnets on the strikers and/or pieces and (b) induction members below the board, etc. The sides of the board can also be magnetic or have induction members. Magnets and/or induction members can also be placed above the board using auxiliary supports. The positions of the magnets can, in one embodiment, be selectable by the players at the start of the play and optionally changed during play. The magnets and induction members can be of various kinds, as described in Section A. Appropriate mechanisms like strong adhesives, strong enclosed mechanical support, etc., may be necessary to make the generally brittle magnetic materials appropriate for pieces and strikers, In general, magnets/induction members/hysteresis members can be placed on one or more of the board surface (e.g., below it), striker, pieces, and sides of board. The mechanism admits of all the variants using possibly hysteresis effects, multiple autonomously magnetic interacting members, magnet/induction/hysteresis members of different geometry, etc., as per Section A.

Power control in such devices is human skill. Power Transmission Control can be applied, for example, in utilizing contactless striking by induction. In such cases, the magnetic striker does not hit the piece, but glides by it, generating inductive force to move the piece.

The same ideas can be applied to billiards and snooker, and in general any similar board game.

Extendible Tether with Induction Braking

FIG. 59 shows an extendible two-piece tether with a stationary member SM_59_300 having one or more magnets M_59_100 (together with flux return paths not shown, following Section A). A moving induction member MM_59_200 is attached to a hook H_59_310 to which a weight can be attached. Induction braking prevents excessively rapid fall of the weight. Several such tethers can be connected together by hinges to form a pseudo-elastic "cord" that extends slowly. The geometry of the stationary member SM_59_300 and moving members MM_59_200 can be other than shown, including telescoping tubes, etc. In one variant, stationary member SM_59_300 is a flexible ferromagnetic tube that is magnetic in the interior, and the moving member MM_59_200 is a rod or tightly coiled (e.g., copper) wire, which is braked by induction effects.

A variation of this is an optical workbench, which is suspended using several such tethers, together with springs to limit the maximum amount of motion allowable. The induction forces will reduce the optical bench vibrations.

The mechanism admits of all the variants using possibly hysteresis effects, multiple autonomously magnetic interacting members, magnets/induction/hysteresis members of different geometry, etc., as per Section A. With hysteresis members and multiple autonomously magnetic interacting members, rest positions emerge that can be profitably used. For example, a series of magnets on MIVI_59200 can interact with SM 59_300's magnets, creating a sequence of magnetic latching positions for the mechanism. In effect, a linear contactless noiseless ratcheting mechanism results.

Magnetic Levitation and Induction Braking for an Aircraft

FIG. 60 shows an aircraft utilizing magnetic levitation (maglev) for takeoff and landing. The system functions as a maglev device during takeoff and as an electromagnetic brake during landing. The induction member I_60_200 can be a mesh of conductive material in the fuselage itself. It can also be the fuselage itself, provided the aircraft aluminum is properly alloyed to have sufficient conductivity. The field can be generated by a set of superconducting magnets under the runway, arranged to have the field impinge on the craft above. The direction of the field will in general not be exactly vertical. In such cases, we should use only the vertical component of the field to prevent other undesirable disturbances to the aircraft. This can be ensured by choosing an induction member whose effective conductivity is asymmetric along different directions (due to choice of material, geometry, etc.) and which is oriented to direct the current perpendicular to the aircraft fuselage, roughly parallel to the wings.

If the magnetic fields can be generated over 100- to 200-meter dimensions, ultra-reliable braking can be achieved due to simplicity of operation, compared to conventional friction brakes, air brakes, etc.

Magnetic levitation principles can be used in takeoff as follows. High-strength superconduction magnets placed on the plane can induce repulsive forces in a large induction member beneath the runway, generating additional lift. A moving magnetic field on the runway, generated by sequentially exciting a series of superconducting magnets on the runway, can induce lift on the aircraft fuselage. In principle, the aircraft can take off and land without power.

A variant of this is an "invisible parachute" for an aircraft, The fuselage can be arranged to have induction members appropriately shaped and oriented. If the aircraft is to brake for any reason, an external magnetic field can be created in the aircraft's path, causing induction braking. Due to the high speed, large forces can be generated by quite modest magnetic fields, e.g., about 0.01 Tesla or less (about 200 times the magnetic field of the earth). Such low-strength fields over large regions can possibly be generated by very large superconducting magnets placed on "rescue aircraft." Note that the induction force is omnidirectional and will act even when the aircraft is losing altitude (it will act to slow down descent).

The mechanism admits of all the variants using possibly hysteresis effects, multiple autonomously magnetic interacting members, magnet/induction/hysteresis members of different geometry, etc., as per Section A.

Electromagnetic Fully Flexible Manipulator

Another application of our ideas is in electromagnetic manipulators, which (1) pick up ferromagnetic objects, (2) assemble them automatically using magnetic fields generated by possibly high-strength superconducting magnets (or a combination of high-strength neodymium magnets and auxiliary coils), and (3) move them to desired positions automatically by controlling the currents generating the fields. Translational motion can be achieved by a field that is translating in the direction, rotational motion (e.g., a screw being tightened) by fields that are rotating, etc.

FIG. 61 shows a bin with screws being picked up, moved right (per FIG. 61) by a translating magnetic field, and tightened by rotating magnetic fields, all under the control of the drive control circuitry. The major advantage of this system is that the forces exerted on the objects being moved and assembled are distributed to some extent throughout the body, minimizing stress/strain at the surface and enhancing reliability. In addition, controlled torque can be delivered while tightening, minimizing overtightening risk. Finally, the number of degrees of freedom of the manipulator is in principle infinite, since there are no mechanical joints. This can find applications ranging from assembly of small structures to assembly of high-reliability apparatus like aircraft, high-speed trains, etc.

The mechanism admits of all the variants using possibly hysteresis effects, multiple autonomously magnetic interacting members, magnets/induction/hysteresis members of different geometry, etc. as per Section A.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus, comprising:
  a first component having one or more electromagnetic elements; and
  a second component having one or more electromagnetic elements and movably coupled to the first component, wherein:
  the second component is adapted to move with respect to the first component in a cyclical manner,
  the one or more electromagnetic elements of the first component are adapted to interact with the one or more electromagnetic elements of the second component during each of one or more cycles of motion of the second component with respect to the first component such that, when a constant force profile is applied to move the second component with respect to the first component, the speed of motion increases and decreases one or more times during each cycle of motion due to different levels of electromagnetic interaction between the electromagnetic elements within each cycle of motion, and a latching or ejector mechanism, which utilizes the varying electromagnetic forces between the first and second component to make the motion profile as desired in at least one of time, exemplarily reducing jerk, improving speed constancy, and any combination thereof.

* * * * *